US011294165B2

(12) United States Patent
Deisseroth et al.

(10) Patent No.: US 11,294,165 B2
(45) Date of Patent: Apr. 5, 2022

(54) MODULAR, ELECTRO-OPTICAL DEVICE FOR INCREASING THE IMAGING FIELD OF VIEW USING TIME-SEQUENTIAL CAPTURE

(71) Applicant: The Board of Trustees of the Leland Stanford Junior University, Stanford, CA (US)

(72) Inventors: Karl A. Deisseroth, Stanford, CA (US); Sean Quirin, Palo Alto, CA (US)

(73) Assignee: The Board of Trustees of the Leland Stanford Junior University, Stanford, CA (US)

(*) Notice: Subject to any disclaimer, the term of this patent is extended or adjusted under 35 U.S.C. 154(b) by 0 days.

(21) Appl. No.: 15/939,107

(22) Filed: Mar. 28, 2018

(65) Prior Publication Data
US 2018/0284417 A1 Oct. 4, 2018

Related U.S. Application Data

(60) Provisional application No. 62/478,981, filed on Mar. 30, 2017.

(51) Int. Cl.
*G02B 21/36* (2006.01)
*G02F 1/137* (2006.01)
(Continued)

(52) U.S. Cl.
CPC ....... *G02B 21/361* (2013.01); *G02B 21/0012* (2013.01); *G02B 21/0016* (2013.01);
(Continued)

(58) Field of Classification Search
None
See application file for complete search history.

(56) References Cited

U.S. PATENT DOCUMENTS 2,968,302 A   1/1961 Fry et al.
3,131,690 A   5/1964 Innis et al.
(Continued)

FOREIGN PATENT DOCUMENTS

CN    1079464 A   12/1993
CN    1558222 A   12/2004
(Continued)

OTHER PUBLICATIONS

Google search.*
(Continued)

*Primary Examiner* — Mohammad J Rahman
(74) *Attorney, Agent, or Firm* — Rudy J. Ng; Bozicevic, Field & Francis LLP

(57) ABSTRACT

The present disclosure provides optical image acquisition methods and devices for microscopy systems that enhance the field-of-view during image acquisition. According to aspects of the present disclosure, the methods and devices for enhancing the field-of-view of a sample during image acquisition in an optical imaging system include directing an incident electromagnetic field through a plurality of polarization-selective gratings, where each of the polarization-selective gratings is configured to apply a discrete amount of angular displacement to the incident electromagnetic field in a direction transverse or axial to the optical system's electromagnetic axis, resulting in an enhanced field-of-view during image acquisition.

22 Claims, 11 Drawing Sheets

(51) Int. Cl.
  *G02B 27/00* (2006.01)
  *H04N 5/262* (2006.01)
  *H04N 5/232* (2006.01)
  *G02B 21/00* (2006.01)
  *G02F 1/01* (2006.01)
  *G02B 27/28* (2006.01)
  *G02B 26/08* (2006.01)
  *G02F 1/133* (2006.01)

(52) U.S. Cl.
  CPC ..... *G02B 21/0068* (2013.01); *G02B 21/0092* (2013.01); *G02B 27/0081* (2013.01); *G02F 1/0136* (2013.01); *G02F 1/137* (2013.01); *H04N 5/23238* (2013.01); *H04N 5/23296* (2013.01); *H04N 5/23299* (2018.08); *H04N 5/2625* (2013.01); *G02B 21/365* (2013.01); *G02B 26/0808* (2013.01); *G02B 27/286* (2013.01); *G02F 1/13306* (2013.01); *G02F 2201/30* (2013.01); *G02F 2202/022* (2013.01); *G02F 2203/07* (2013.01); *G02F 2203/62* (2013.01)

(56) References Cited

U.S. PATENT DOCUMENTS

| | | | |
|---|---|---|---|
| 3,499,437 A | 3/1970 | Balamuth et al. | |
| 3,567,847 A | 3/1971 | Price | |
| 3,804,488 A * | 4/1974 | Eden | G02F 1/292 359/316 |
| 4,343,301 A | 8/1982 | Indech | |
| 4,559,951 A | 12/1985 | Dahl et al. | |
| 4,616,231 A | 10/1986 | Autrey et al. | |
| 4,865,042 A | 9/1989 | Umemura et al. | |
| 4,879,284 A | 11/1989 | Lang et al. | |
| 5,032,123 A | 7/1991 | Katz et al. | |
| 5,041,224 A | 8/1991 | Ohyama et al. | |
| 5,082,670 A | 1/1992 | Gage et al. | |
| 5,161,039 A * | 11/1992 | Schellenberg | G02B 1/04 252/585 |
| 5,249,575 A | 10/1993 | Di Mino et al. | |
| 5,267,152 A | 11/1993 | Yang et al. | |
| 5,290,280 A | 3/1994 | Daikuzono et al. | |
| 5,330,515 A | 7/1994 | Rutecki et al. | |
| 5,382,516 A | 1/1995 | Bush | |
| 5,411,540 A | 5/1995 | Edell et al. | |
| 5,445,608 A | 8/1995 | Chen et al. | |
| 5,452,382 A * | 9/1995 | Shionoya | G01B 11/306 359/368 |
| 5,460,950 A | 10/1995 | Barr et al. | |
| 5,460,954 A | 10/1995 | Lee et al. | |
| 5,470,307 A | 11/1995 | Lindall | |
| 5,495,541 A | 2/1996 | Murray et al. | |
| 5,520,188 A | 5/1996 | Hennige et al. | |
| 5,527,695 A | 6/1996 | Hodges et al. | |
| 5,550,316 A | 8/1996 | Mintz | |
| 5,641,650 A | 6/1997 | Turner et al. | |
| 5,703,985 A | 12/1997 | Owyang et al. | |
| 5,722,426 A | 3/1998 | Kolff | |
| 5,738,625 A | 4/1998 | Gluck | |
| 5,739,273 A | 4/1998 | Engelman et al. | |
| 5,741,316 A | 4/1998 | Chen et al. | |
| 5,755,750 A | 5/1998 | Petruska et al. | |
| 5,756,351 A | 5/1998 | Isacoff et al. | |
| 5,782,896 A | 7/1998 | Chen et al. | |
| 5,795,581 A | 8/1998 | Segalman et al. | |
| 5,807,285 A | 9/1998 | Vaitekunas et al. | |
| 5,816,256 A | 10/1998 | Kissinger et al. | |
| 5,828,471 A * | 10/1998 | Davis | G02F 1/13362 359/15 |
| 5,836,941 A | 11/1998 | Yoshihara et al. | |
| 5,883,606 A * | 3/1999 | Smoot | G02B 27/017 345/7 |
| 5,898,058 A | 4/1999 | Nichols | |
| 5,939,320 A | 8/1999 | Littman et al. | |
| 6,056,738 A | 5/2000 | Marchitto et al. | |
| 6,057,114 A | 5/2000 | Akong | |
| 6,108,081 A | 8/2000 | Holtom et al. | |
| 6,134,474 A | 10/2000 | Fischell et al. | |
| 6,161,045 A | 12/2000 | Fischell et al. | |
| 6,180,613 B1 | 1/2001 | Kaplitt et al. | |
| 6,253,109 B1 | 6/2001 | Gielen | |
| 6,303,362 B1 | 10/2001 | Kay et al. | |
| 6,334,846 B1 | 1/2002 | Ishibashi et al. | |
| 6,336,904 B1 | 1/2002 | Nikolchev | |
| 6,346,101 B1 | 2/2002 | Alfano et al. | |
| 6,364,831 B1 | 4/2002 | Crowley | |
| 6,377,842 B1 | 4/2002 | Pogue et al. | |
| 6,426,811 B1 * | 7/2002 | Popovich | G02F 1/13476 359/15 |
| 6,436,708 B1 | 8/2002 | Leone et al. | |
| 6,455,861 B1 | 9/2002 | Hoyt | |
| 6,473,639 B1 | 10/2002 | Fischell et al. | |
| 6,480,743 B1 | 11/2002 | Kirkpatrick et al. | |
| 6,489,115 B2 | 12/2002 | Lahue et al. | |
| 6,497,872 B1 | 12/2002 | Weiss et al. | |
| 6,506,154 B1 | 1/2003 | Ezion et al. | |
| 6,536,440 B1 | 3/2003 | Dawson | |
| 6,551,346 B2 | 4/2003 | Crossley | |
| 6,567,690 B2 | 5/2003 | Giller et al. | |
| 6,597,954 B1 | 7/2003 | Pless et al. | |
| 6,609,020 B2 | 8/2003 | Gill | |
| 6,615,080 B1 | 9/2003 | Unsworth et al. | |
| 6,631,283 B2 | 10/2003 | Storrie et al. | |
| 6,632,672 B2 | 10/2003 | Calos | |
| 6,647,296 B2 | 11/2003 | Fischell et al. | |
| 6,661,495 B1 * | 12/2003 | Popovich | C09K 19/544 349/1 |
| 6,685,656 B1 | 2/2004 | Duarte et al. | |
| 6,686,193 B2 | 2/2004 | Maher et al. | |
| 6,721,603 B2 | 4/2004 | Zabara et al. | |
| 6,729,337 B2 | 5/2004 | Dawson | |
| 6,744,509 B2 | 6/2004 | Davis et al. | |
| 6,780,490 B1 | 8/2004 | Tanaka et al. | |
| 6,790,652 B1 | 9/2004 | Terry et al. | |
| 6,790,657 B1 | 9/2004 | Arya | |
| 6,805,129 B1 | 10/2004 | Pless et al. | |
| 6,808,873 B2 | 10/2004 | Murphy et al. | |
| 6,810,285 B2 | 10/2004 | Pless et al. | |
| 6,889,085 B2 | 5/2005 | Dawson | |
| 6,918,872 B2 | 7/2005 | Yokoi | |
| 6,921,413 B2 | 7/2005 | Mahadevan-Jansen et al. | |
| 6,969,449 B2 | 11/2005 | Maher et al. | |
| 6,974,448 B2 | 12/2005 | Petersen | |
| 7,045,344 B2 | 5/2006 | Kay et al. | |
| 7,091,500 B2 | 8/2006 | Schnitzer | |
| 7,144,733 B2 | 12/2006 | Miesenbock et al. | |
| 7,175,596 B2 | 2/2007 | Vitek et al. | |
| 7,191,018 B2 | 3/2007 | Gielen et al. | |
| 7,196,758 B2 | 3/2007 | Crawford et al. | |
| 7,211,054 B1 | 5/2007 | Francis et al. | |
| 7,220,240 B2 | 5/2007 | Struys et al. | |
| 7,298,143 B2 | 11/2007 | Jaermann et al. | |
| 7,313,442 B2 | 12/2007 | Velasco et al. | |
| 7,315,665 B1 | 1/2008 | Anderson | |
| 7,342,659 B2 * | 3/2008 | Horn | G01J 3/02 356/328 |
| 7,408,712 B2 | 8/2008 | Rouff et al. | |
| 7,414,779 B2 * | 8/2008 | Huber | G01B 9/02069 359/333 |
| 7,603,174 B2 | 10/2009 | De Ridder | |
| 7,610,100 B2 | 10/2009 | Jaax et al. | |
| 7,613,520 B2 | 11/2009 | De Ridder | |
| 7,686,839 B2 | 3/2010 | Parker | |
| 7,824,869 B2 | 11/2010 | Hegemann et al. | |
| 7,848,000 B2 | 12/2010 | Wang | |
| 7,883,536 B1 | 2/2011 | Bendett | |
| 7,889,315 B2 * | 2/2011 | Van De Kerkhof | G03F 7/706 355/53 |
| 7,988,688 B2 | 8/2011 | Webb et al. | |
| 8,386,312 B2 | 2/2013 | Pradeep et al. | |
| 8,398,692 B2 | 3/2013 | Deisseroth et al. | |
| 8,401,609 B2 | 3/2013 | Deisseroth et al. | |

(56) References Cited

U.S. PATENT DOCUMENTS

| | | |
|---|---|---|
| 8,603,790 B2 | 12/2013 | Deisseroth et al. |
| 8,696,722 B2 | 4/2014 | Deisseroth et al. |
| 8,716,447 B2 | 5/2014 | Deisseroth et al. |
| 8,729,040 B2 | 5/2014 | Deisseroth et al. |
| 8,815,582 B2 | 8/2014 | Deisseroth et al. |
| 8,834,546 B2 | 9/2014 | Deisseroth et al. |
| 8,864,805 B2 | 10/2014 | Deisseroth et al. |
| 8,906,360 B2 | 12/2014 | Deisseroth et al. |
| 8,926,959 B2 | 1/2015 | Deisseroth et al. |
| 8,932,562 B2 | 1/2015 | Deisseroth et al. |
| 8,956,363 B2 | 2/2015 | Schneider et al. |
| 8,962,589 B2 | 2/2015 | Deisseroth et al. |
| 8,982,313 B2 | 3/2015 | Escuti et al. |
| 9,055,867 B2 | 6/2015 | Fox et al. |
| 9,057,734 B2 | 6/2015 | Cohen |
| 9,079,940 B2 | 7/2015 | Deisseroth et al. |
| 9,084,885 B2 | 7/2015 | Deisseroth et al. |
| 9,101,690 B2 | 8/2015 | Deisseroth et al. |
| 9,101,759 B2 | 8/2015 | Deisseroth et al. |
| 9,146,391 B2 * | 9/2015 | Ouchi ............... G02B 21/06 |
| 9,175,095 B2 | 11/2015 | Deisseroth et al. |
| 9,187,745 B2 | 11/2015 | Deisseroth et al. |
| 9,195,092 B2 | 11/2015 | Escuti et al. |
| 9,238,150 B2 | 1/2016 | Deisseroth et al. |
| 9,249,200 B2 | 2/2016 | Deisseroth et al. |
| 9,249,234 B2 | 2/2016 | Deisseroth et al. |
| 9,271,674 B2 | 3/2016 | Deisseroth et al. |
| 9,274,099 B2 | 3/2016 | Deisseroth et al. |
| 9,278,159 B2 | 3/2016 | Deisseroth et al. |
| 9,284,353 B2 | 3/2016 | Deisseroth et al. |
| 9,308,392 B2 | 4/2016 | Deisseroth et al. |
| 9,309,296 B2 | 4/2016 | Deisseroth et al. |
| 9,340,589 B2 | 5/2016 | Deisseroth et al. |
| 9,359,449 B2 | 6/2016 | Deisseroth et al. |
| 9,360,472 B2 | 6/2016 | Deisseroth et al. |
| 9,365,628 B2 | 6/2016 | Deisseroth et al. |
| 9,394,347 B2 | 7/2016 | Deisseroth et al. |
| 9,421,258 B2 | 8/2016 | Deisseroth et al. |
| 9,453,215 B2 | 9/2016 | Deisseroth et al. |
| 9,458,208 B2 | 10/2016 | Deisseroth et al. |
| 9,505,817 B2 | 11/2016 | Deisseroth et al. |
| 9,522,288 B2 | 12/2016 | Deisseroth et al. |
| 9,604,073 B2 | 3/2017 | Deisseroth et al. |
| 9,615,789 B2 | 4/2017 | Deisseroth et al. |
| 9,636,380 B2 | 5/2017 | Lammel et al. |
| 9,671,603 B2 * | 6/2017 | Kalkbrenner ...... G02B 21/0044 |
| 9,693,692 B2 | 7/2017 | Deisseroth et al. |
| 9,757,587 B2 | 9/2017 | Deisseroth et al. |
| 9,829,492 B2 | 11/2017 | Deisseroth et al. |
| 9,840,541 B2 | 12/2017 | Deisseroth et al. |
| 9,850,290 B2 | 12/2017 | Deisseroth et al. |
| 9,855,442 B2 | 1/2018 | Deisseroth et al. |
| 9,878,176 B2 | 1/2018 | Deisseroth et al. |
| 9,924,093 B1 * | 3/2018 | Leizerovich ....... H04N 5/23293 |
| 9,968,652 B2 | 5/2018 | Deisseroth et al. |
| 9,969,783 B2 | 5/2018 | Deisseroth et al. |
| 9,992,981 B2 | 6/2018 | Deisseroth et al. |
| 10,018,695 B2 | 7/2018 | Deisseroth et al. |
| 10,035,027 B2 | 7/2018 | Deisseroth et al. |
| 10,036,758 B2 | 7/2018 | Deisseroth et al. |
| 10,046,174 B2 | 8/2018 | Deisseroth et al. |
| 10,052,383 B2 | 8/2018 | Deisseroth et al. |
| 10,052,497 B2 | 8/2018 | Deisseroth et al. |
| 16,115,303 | 8/2018 | Deisseroth et al. |
| 10,064,912 B2 | 9/2018 | Deisseroth et al. |
| 10,071,132 B2 | 9/2018 | Deisseroth et al. |
| 16,126,895 | 9/2018 | Deisseroth et al. |
| 10,086,012 B2 | 10/2018 | Deisseroth et al. |
| 10,087,223 B2 | 10/2018 | Deisseroth et al. |
| 10,094,840 B2 | 10/2018 | Deisseroth et al. |
| 16,211,083 | 12/2018 | Deisseroth et al. |
| 16,241,763 | 1/2019 | Deisseroth et al. |
| 16,261,388 | 1/2019 | Deisseroth et al. |
| 10,297,180 B2 * | 5/2019 | Shi .................... G02B 5/30 |
| 10,412,371 B1 * | 9/2019 | Chao ................. H04N 5/232 |
| 2001/0013960 A1 * | 8/2001 | Popovich ............ G02B 30/52 |
| | | 359/15 |
| 2001/0023346 A1 | 9/2001 | Loeb |
| 2002/0094516 A1 | 7/2002 | Calos et al. |
| 2002/0113860 A1 * | 8/2002 | Kowarz ................ B41J 2/47 |
| | | 347/255 |
| 2002/0155173 A1 | 10/2002 | Chopp et al. |
| 2002/0164577 A1 | 11/2002 | Tsien et al. |
| 2002/0190922 A1 | 12/2002 | Tsao |
| 2002/0193327 A1 | 12/2002 | Nemerow et al. |
| 2003/0009103 A1 | 1/2003 | Yuste et al. |
| 2003/0026784 A1 | 2/2003 | Koch et al. |
| 2003/0040080 A1 | 2/2003 | Miesenbock et al. |
| 2003/0050258 A1 | 3/2003 | Calos |
| 2003/0082809 A1 | 5/2003 | Quail et al. |
| 2003/0088060 A1 | 5/2003 | Benjamin et al. |
| 2003/0097122 A1 | 5/2003 | Ganz et al. |
| 2003/0104512 A1 | 6/2003 | Freeman et al. |
| 2003/0125719 A1 | 7/2003 | Furnish |
| 2003/0144650 A1 | 7/2003 | Smith |
| 2003/0204135 A1 | 10/2003 | Bystritsky |
| 2003/0232339 A1 | 12/2003 | Shu et al. |
| 2004/0013645 A1 | 1/2004 | Monahan et al. |
| 2004/0015211 A1 | 1/2004 | Nurmikko et al. |
| 2004/0023203 A1 | 2/2004 | Miesenbock et al. |
| 2004/0034882 A1 | 2/2004 | Vale et al. |
| 2004/0039312 A1 | 2/2004 | Hillstead et al. |
| 2004/0049134 A1 | 3/2004 | Tosaya et al. |
| 2004/0068202 A1 | 4/2004 | Hansson et al. |
| 2004/0073278 A1 | 4/2004 | Pachys |
| 2004/0076613 A1 | 4/2004 | Mazarkis et al. |
| 2004/0122475 A1 | 6/2004 | Myrick et al. |
| 2004/0203152 A1 | 10/2004 | Calos |
| 2004/0216177 A1 | 10/2004 | Jordan et al. |
| 2004/0239929 A1 * | 12/2004 | Boehm .................. G01J 4/00 |
| | | 356/327 |
| 2004/0260367 A1 | 12/2004 | Taboada et al. |
| 2004/0267118 A1 | 12/2004 | Dawson |
| 2005/0020945 A1 | 1/2005 | Tosaya et al. |
| 2005/0027284 A1 | 2/2005 | Lozano et al. |
| 2005/0058987 A1 | 3/2005 | Shi et al. |
| 2005/0088177 A1 | 4/2005 | Schreck et al. |
| 2005/0102708 A1 | 5/2005 | Lecanu et al. |
| 2005/0107753 A1 | 5/2005 | Rezai et al. |
| 2005/0111753 A1 * | 5/2005 | Peleg .................. G06T 3/4038 |
| | | 382/284 |
| 2005/0112759 A1 | 5/2005 | Radisic et al. |
| 2005/0119315 A1 | 6/2005 | Fedida et al. |
| 2005/0124877 A1 | 6/2005 | Chopra |
| 2005/0143295 A1 | 6/2005 | Walker et al. |
| 2005/0143790 A1 | 6/2005 | Kipke et al. |
| 2005/0146784 A1 * | 7/2005 | Vogt .................. G02B 21/0076 |
| | | 359/368 |
| 2005/0153885 A1 | 7/2005 | Yun et al. |
| 2005/0197679 A1 | 9/2005 | Dawson |
| 2005/0202398 A1 | 9/2005 | Hegemann et al. |
| 2005/0215764 A1 | 9/2005 | Tuszynski et al. |
| 2005/0226531 A1 * | 10/2005 | Silverstein ............ G06T 3/40 |
| | | 382/284 |
| 2005/0240127 A1 | 10/2005 | Seip et al. |
| 2005/0267011 A1 | 12/2005 | Deisseroth et al. |
| 2005/0267454 A1 | 12/2005 | Hissong et al. |
| 2005/0279354 A1 | 12/2005 | Deutsch et al. |
| 2006/0025756 A1 | 2/2006 | Francischelli et al. |
| 2006/0034943 A1 | 2/2006 | Tuszynski |
| 2006/0039072 A1 | 2/2006 | Ruoff et al. |
| 2006/0055811 A1 | 3/2006 | Fritz et al. |
| 2006/0057192 A1 | 3/2006 | Kane |
| 2006/0057614 A1 | 3/2006 | Heintz |
| 2006/0058671 A1 | 3/2006 | Vitek et al. |
| 2006/0058678 A1 | 3/2006 | Vitek et al. |
| 2006/0100679 A1 | 5/2006 | DiMauro et al. |
| 2006/0106543 A1 | 5/2006 | Deco et al. |
| 2006/0129126 A1 | 6/2006 | Kaplitt et al. |
| 2006/0155348 A1 | 7/2006 | de Charms |
| 2006/0161227 A1 | 7/2006 | Walsh et al. |
| 2006/0164639 A1 * | 7/2006 | Horn .................... G01J 3/02 |
| | | 356/326 |
| 2006/0167500 A1 | 7/2006 | Towe et al. |

(56) References Cited

U.S. PATENT DOCUMENTS

| | | |
|---|---|---|
| 2006/0179501 A1 | 8/2006 | Chan et al. |
| 2006/0184069 A1 | 8/2006 | Vaitekunas |
| 2006/0190044 A1 | 8/2006 | Libbus et al. |
| 2006/0206172 A1 | 9/2006 | DiMauro et al. |
| 2006/0216689 A1 | 9/2006 | Maher et al. |
| 2006/0236525 A1 | 10/2006 | Sliwa et al. |
| 2006/0241697 A1 | 10/2006 | Libbus et al. |
| 2006/0253177 A1 | 11/2006 | Taboada et al. |
| 2006/0271024 A1 | 11/2006 | Gertner et al. |
| 2007/0027443 A1 | 2/2007 | Rose et al. |
| 2007/0031924 A1 | 2/2007 | Li et al. |
| 2007/0053996 A1 | 3/2007 | Boyden et al. |
| 2007/0054319 A1 | 3/2007 | Boyden et al. |
| 2007/0060915 A1 | 3/2007 | Kucklick |
| 2007/0060984 A1 | 3/2007 | Webb et al. |
| 2007/0135875 A1 | 6/2007 | Demarais et al. |
| 2007/0156180 A1 | 7/2007 | Jaax et al. |
| 2007/0191906 A1 | 8/2007 | Iyer et al. |
| 2007/0196838 A1 | 8/2007 | Chesnut et al. |
| 2007/0197918 A1 | 8/2007 | Vitek et al. |
| 2007/0219600 A1 | 9/2007 | Gertner et al. |
| 2007/0220628 A1 | 9/2007 | Glassman et al. |
| 2007/0239080 A1 | 10/2007 | Schaden et al. |
| 2007/0239210 A1 | 10/2007 | Libbus et al. |
| 2007/0242256 A1* | 10/2007 | Van De Kerkhof ............ G03F 7/70566 355/71 |
| 2007/0253995 A1 | 11/2007 | Hildebrand |
| 2007/0260295 A1 | 11/2007 | Chen et al. |
| 2007/0261127 A1 | 11/2007 | Boyden et al. |
| 2007/0282404 A1 | 12/2007 | Cottrell et al. |
| 2007/0295978 A1 | 12/2007 | Coushaine et al. |
| 2008/0020465 A1 | 1/2008 | Padidam |
| 2008/0027505 A1 | 1/2008 | Levin et al. |
| 2008/0046053 A1 | 1/2008 | Wagner et al. |
| 2008/0033569 A1 | 2/2008 | Ferren et al. |
| 2008/0049221 A1* | 2/2008 | Wolleschensky .. G01N 21/6445 356/327 |
| 2008/0050770 A1 | 2/2008 | Zhang et al. |
| 2008/0051673 A1 | 2/2008 | Kong et al. |
| 2008/0060088 A1 | 3/2008 | Shin et al. |
| 2008/0065158 A1 | 3/2008 | Ben-Ezra et al. |
| 2008/0065183 A1 | 3/2008 | Whitehurst et al. |
| 2008/0077200 A1 | 3/2008 | Bendett et al. |
| 2008/0085265 A1 | 4/2008 | Schneider et al. |
| 2008/0088258 A1 | 4/2008 | Ng |
| 2008/0103551 A1 | 5/2008 | Masoud et al. |
| 2008/0119421 A1 | 5/2008 | Tuszynski et al. |
| 2008/0125836 A1 | 5/2008 | Streeter et al. |
| 2008/0167261 A1 | 7/2008 | Sclimenti |
| 2008/0175819 A1 | 7/2008 | Kingsman et al. |
| 2008/0176076 A1 | 7/2008 | Van Veggel et al. |
| 2008/0200749 A1 | 8/2008 | Zheng et al. |
| 2008/0221452 A1 | 9/2008 | Njemanze |
| 2008/0227139 A1 | 9/2008 | Deisseroth et al. |
| 2008/0228244 A1 | 9/2008 | Pakhomov et al. |
| 2008/0262411 A1 | 10/2008 | Dobak |
| 2008/0287821 A1 | 11/2008 | Jung et al. |
| 2008/0290318 A1 | 11/2008 | Van Veggel et al. |
| 2009/0009668 A1* | 1/2009 | Tan ..................... G02B 5/3016 349/1 |
| 2009/0030930 A1 | 1/2009 | Pradeep et al. |
| 2009/0054954 A1 | 2/2009 | Foley et al. |
| 2009/0069261 A1 | 3/2009 | Dodge et al. |
| 2009/0088680 A1 | 4/2009 | Deisseroth et al. |
| 2009/0093403 A1 | 4/2009 | Zhang et al. |
| 2009/0097108 A1 | 4/2009 | Fox et al. |
| 2009/0099038 A1 | 4/2009 | Deisseroth et al. |
| 2009/0118800 A1 | 5/2009 | Deisseroth et al. |
| 2009/0131837 A1 | 5/2009 | Granville |
| 2009/0148861 A1 | 6/2009 | Pegan et al. |
| 2009/0157145 A1 | 6/2009 | Cauller |
| 2009/0254134 A1 | 10/2009 | Nikolov et al. |
| 2009/0268511 A1 | 10/2009 | Birge et al. |
| 2009/0306474 A1 | 12/2009 | Wilson |
| 2009/0319008 A1 | 12/2009 | Mayer |
| 2009/0326603 A1 | 12/2009 | Boggs et al. |
| 2010/0009444 A1 | 1/2010 | Herlitze et al. |
| 2010/0016783 A1 | 1/2010 | Bourke et al. |
| 2010/0021982 A1 | 1/2010 | Herlitze |
| 2010/0073756 A1* | 3/2010 | Moskovits ........... G02B 5/3058 359/290 |
| 2010/0145418 A1 | 6/2010 | Zhang et al. |
| 2010/0146645 A1 | 6/2010 | Vasar et al. |
| 2010/0190229 A1 | 7/2010 | Zhang et al. |
| 2010/0209352 A1 | 8/2010 | Hultman et al. |
| 2010/0321773 A1* | 12/2010 | Chen ................. G02B 21/0032 359/386 |
| 2011/0221970 A1 | 1/2011 | Vo-Dihn et al. |
| 2011/0027494 A1* | 2/2011 | Tan .................... B29D 11/0074 427/508 |
| 2011/0092800 A1 | 4/2011 | Yoo et al. |
| 2011/0105998 A1 | 5/2011 | Deisseroth et al. |
| 2011/0112463 A1 | 5/2011 | Silver et al. |
| 2011/0125077 A1 | 5/2011 | Denison et al. |
| 2011/0125078 A1 | 5/2011 | Denison et al. |
| 2011/0159562 A1 | 6/2011 | Deisseroth et al. |
| 2011/0165681 A1 | 7/2011 | Boyden et al. |
| 2011/0166632 A1 | 7/2011 | Delp et al. |
| 2011/0224095 A1 | 9/2011 | Zoller et al. |
| 2011/0233046 A1 | 9/2011 | Nikolenko et al. |
| 2011/0301529 A1 | 12/2011 | Zhang et al. |
| 2011/0311489 A1 | 12/2011 | Deisseroth et al. |
| 2012/0026311 A1* | 2/2012 | Ouchi ..................... G02B 21/06 348/79 |
| 2012/0093772 A1 | 4/2012 | Horsager et al. |
| 2012/0121542 A1 | 5/2012 | Chuong et al. |
| 2012/0145923 A1* | 6/2012 | Nishiwaki ............. G02B 21/16 250/458.1 |
| 2012/0165904 A1 | 6/2012 | Deisseroth et al. |
| 2012/0188467 A1* | 7/2012 | Escuti ................. G02B 27/286 349/1 |
| 2012/0190629 A1 | 7/2012 | Tomita et al. |
| 2012/0253261 A1 | 10/2012 | Poletto et al. |
| 2013/0019325 A1 | 1/2013 | Deisseroth et al. |
| 2013/0030275 A1 | 1/2013 | Seymour et al. |
| 2013/0066402 A1 | 3/2013 | Lin et al. |
| 2013/0144359 A1 | 6/2013 | Kishawi et al. |
| 2013/0286181 A1 | 10/2013 | Betzig et al. |
| 2013/0317575 A1 | 11/2013 | Deisseroth et al. |
| 2013/0330816 A1 | 12/2013 | Deisseroth et al. |
| 2013/0335446 A1* | 12/2013 | Piippo ................. G06F 3/04815 345/633 |
| 2013/0342886 A1* | 12/2013 | Cooper ................. G02B 21/16 359/204.3 |
| 2013/0347137 A1 | 12/2013 | Deisseroth et al. |
| 2014/0063058 A1* | 3/2014 | Fialho .................... G06T 19/00 345/633 |
| 2014/0078298 A1* | 3/2014 | Kudenov ................ G01J 3/447 348/135 |
| 2014/0082758 A1 | 3/2014 | Deisseroth et al. |
| 2014/0252200 A1* | 9/2014 | Garsha ................ G02B 21/367 250/201.3 |
| 2014/0324133 A1 | 10/2014 | Deisseroth et al. |
| 2015/0040249 A1 | 2/2015 | Deisseroth et al. |
| 2015/0112411 A1 | 4/2015 | Beckman et al. |
| 2015/0217128 A1 | 8/2015 | Deisseroth et al. |
| 2015/0293037 A1* | 10/2015 | Deslandes ............ G01N 21/956 356/237.5 |
| 2016/0012749 A1* | 1/2016 | Connor ................... G09B 5/00 600/13 |
| 2016/0015996 A1 | 1/2016 | Deisseroth et al. |
| 2016/0038761 A1 | 2/2016 | Deisseroth et al. |
| 2016/0038764 A1 | 2/2016 | Deisseroth et al. |
| 2016/0045599 A1 | 2/2016 | Deisseroth et al. |
| 2016/0194624 A1 | 7/2016 | Deisseroth et al. |
| 2016/0199663 A1 | 7/2016 | Deisseroth et al. |
| 2016/0252524 A1 | 9/2016 | Deisseroth et al. |
| 2016/0258929 A1 | 9/2016 | Deisseroth et al. |
| 2016/0279267 A1 | 9/2016 | Deisseroth et al. |
| 2016/0316730 A1 | 11/2016 | Deisseroth et al. |
| 2016/0316732 A1 | 11/2016 | Deisseroth et al. |
| 2016/0317658 A1 | 11/2016 | Deisseroth et al. |

(56) References Cited

U.S. PATENT DOCUMENTS

| | | | |
|---|---|---|---|
| 2016/0320306 A1* | 11/2016 | Huffman | G02B 21/16 |
| 2016/0331995 A1 | 11/2016 | Deisseroth et al. | |
| 2017/0072219 A1 | 3/2017 | Deisseroth et al. | |
| 2017/0115484 A1* | 4/2017 | Yokoyama | G02B 5/1823 |
| 2017/0157269 A1 | 6/2017 | Deisseroth et al. | |
| 2017/0198017 A1 | 7/2017 | Deisseroth et al. | |
| 2017/0202912 A1 | 7/2017 | Lammel et al. | |
| 2017/0211040 A1 | 7/2017 | Deisseroth et al. | |
| 2017/0348545 A1 | 12/2017 | Deisseroth et al. | |
| 2018/0020921 A1 | 1/2018 | Deisseroth et al. | |
| 2018/0081159 A1* | 3/2018 | Lippert | G02B 21/10 |
| 2018/0113309 A1* | 4/2018 | Robbins | G02B 6/124 |
| 2018/0172994 A1* | 6/2018 | Robbins | G02B 26/0833 |
| 2018/0177401 A1 | 6/2018 | Deisseroth et al. | |
| 2018/0217262 A1* | 8/2018 | Albelo | G01S 17/04 |
| 2018/0284417 A1 | 10/2018 | Deisseroth et al. | |
| 2018/0311506 A1 | 11/2018 | Deisseroth et al. | |
| 2018/0326221 A1 | 11/2018 | Deisseroth et al. | |
| 2018/0328944 A1 | 11/2018 | Deisseroth et al. | |
| 2018/0333456 A1 | 11/2018 | Deisseroth et al. | |
| 2019/0022425 A1 | 1/2019 | Deisseroth et al. | |
| 2019/0038705 A1 | 2/2019 | Deisseroth et al. | |
| 2019/0046554 A1 | 2/2019 | Deisseroth et al. | |
| 2019/0049462 A1 | 2/2019 | Deisseroth et al. | |

FOREIGN PATENT DOCUMENTS

| | | |
|---|---|---|
| CN | 101288768 A | 10/2008 |
| CN | 102076866 A | 5/2011 |
| CN | 103313752 A | 9/2013 |
| CN | 103476456 A | 12/2013 |
| EP | 1197144 | 4/2002 |
| EP | 1334748 | 8/2003 |
| EP | 1444889 | 8/2004 |
| EP | 1873566 | 1/2008 |
| JP | 6295350 | 10/1994 |
| JP | H 09505771 A | 6/1997 |
| JP | 2004534508 | 11/2004 |
| JP | 2005034073 A | 2/2005 |
| JP | 2006217866 | 8/2006 |
| JP | 2007530027 A | 11/2007 |
| JP | 2008010422 A | 1/2008 |
| JP | 2010227537 A | 10/2010 |
| JP | 2012508581 | 4/2012 |
| WO | WO 1995/005214 | 2/1995 |
| WO | WO 1996/032076 | 10/1996 |
| WO | WO 2000/027293 | 5/2000 |
| WO | WO 2001/025466 | 4/2001 |
| WO | WO 2003/016486 | 2/2003 |
| WO | WO 2003/040323 | 5/2003 |
| WO | WO 2003/046141 | 6/2003 |
| WO | WO 2003/084994 | 10/2003 |
| WO | WO 2003/102156 | 12/2003 |
| WO | WO 2004/033647 | 4/2004 |
| WO | WO 2005/093429 | 10/2005 |
| WO | 2006092758 | 9/2006 |
| WO | WO 2006/103678 | 10/2006 |
| WO | WO 2007/024391 | 3/2007 |
| WO | WO 2007/131180 | 11/2007 |
| WO | WO 2008/014382 | 1/2008 |
| WO | WO 2008/086470 | 7/2008 |
| WO | WO 2008/106694 | 9/2008 |
| WO | 2008130555 | 10/2008 |
| WO | 2008130559 | 10/2008 |
| WO | 2008130561 | 10/2008 |
| WO | WO 2009/025819 | 2/2009 |
| WO | WO 2009/072123 | 6/2009 |
| WO | WO 2009/119782 | 10/2009 |
| WO | WO 2009/131837 | 10/2009 |
| WO | WO 2009/148946 | 12/2009 |
| WO | WO 2010/006049 | 1/2010 |
| WO | WO 2010/011404 | 1/2010 |
| WO | WO 2010009106 | 1/2010 |
| WO | 2010042089 | 4/2010 |
| WO | WO 2010/056970 | 5/2010 |
| WO | WO 2010/123993 | 10/2010 |
| WO | WO 2011/005978 | 1/2011 |
| WO | WO 2011/066320 | 6/2011 |
| WO | WO 2011/106783 | 9/2011 |
| WO | WO 2011/116238 | 9/2011 |
| WO | WO 2011/127088 | 10/2011 |
| WO | WO 2012/032103 | 3/2012 |
| WO | WO 2012027358 | 3/2012 |
| WO | WO 2012/061676 | 5/2012 |
| WO | WO 2012/061681 | 5/2012 |
| WO | WO 2012/061684 | 5/2012 |
| WO | WO 2012/061688 | 5/2012 |
| WO | WO 2012/061690 | 5/2012 |
| WO | WO 2012/061741 | 5/2012 |
| WO | WO 2012/061744 | 5/2012 |
| WO | WO 2012/106407 | 8/2012 |
| WO | WO 2012/134704 | 10/2012 |
| WO | WO 2013/003557 | 1/2013 |
| WO | WO 2013/016486 | 1/2013 |
| WO | WO 2013/090356 | 6/2013 |
| WO | WO 2013/126521 | 8/2013 |
| WO | WO 2013/126762 | 8/2013 |
| WO | WO 2013/142196 | 9/2013 |
| WO | WO 2014/081449 | 5/2014 |
| WO | WO 2014/117079 | 7/2014 |
| WO | WO 2015/148974 | 10/2015 |
| WO | WO 2015148974 | 10/2015 |
| WO | WO 2016/019075 | 2/2016 |
| WO | WO 2016025363 | 2/2016 |
| WO | WO 2016/090172 | 6/2016 |
| WO | WO 2017/087542 | 5/2017 |

OTHER PUBLICATIONS

IP.com search.*
Escuti et al., "Wide-angle, nonmechanical beam steering using thin liquid crystal polarization gratings", SPIE vol. 7093, 709302, 2008.*
Cincotti et al., "Polarization Grating-Based Wavelength Selective Switches", ICTON, Trento, 2016, pp. 1-4, Fig. 1-3.*
Duvarci, et al., "The bed Nucleus of the Stria Terminalis Mediates inter-individual variations in anxiety and fear", J. Neurosci., 29(33) 10357-10361 (2009).
Matsuda "Bed nucleus of stria terminalis (BNST)" Benshi Seishin Igaku (Molecular Psychiatric Medicine), 2009, vol. 9 No.3, p. 46-49.
Neuropsychopharmacology, 2011, vol. 36 No. Suppl.1, p. S110 (Abstract No. 67).
Neuropsychopharmacology, 2012, vol. 38 No. Suppl.1, p. S48 (Abstract No. 37.2).
Walker et al. "Selective Participation of the Bed Nucleus of the Stria Terminalis and CRF in Sustained Anxiety-like versus Phasic Fear-Like Responses," Prog Neuropsychopharmacol Bio Psychiatry, 13: 33(8) 1291-1308 (2009).
Ahmad, et al. "Heterplogous expression of bovine rhodopsin in *Drosophila* photoreceptor cells" Invest Ophthalmol Vis Sci. 2006, 3722-3728.
Clare "Targeting Ion Channels for Drug Discovery" Discov Med. 2010 Vol. 9 No. 46 pp. 1-6.
Clare "Functional Expression of Ion Channels in Mammalian Systems" Protein Science Encyclopedia A.R. Fersht (Ed.) 2008 pp. 79-109.
Reeves et al., "Structure and function in rhodosin: A tetracycline-inducible system in stable mammalian cell lines for high-level expression of opsin mutants" PNAS, 2002 vol. 99 No. 21 pp. 13413-13418.
Erbguth et al. "Bimodal Activation of Different Neuron Classes with Spectrally Red-Shifted Channelrhodopsin Chimera C1V1 in Caenorhabditis elegans," PLOS ONE, 2012, vol. 7 No. 10, pp. e46827/1 -9.
Li et al.; "Role of a Helix B Lysine Residue in the Photoactive Site in Channelrhodopsins," Biophysical Journal, 2014, vol. 106, pp. 1607-1617.
Prigge et al.: "Functional Studies of Volvox Channelrhodopsin Chimeras," Biophysical Journal, 2010, vol. 98, No. 3, Suppl. 1, 3694 Poster, 1 page.

(56) References Cited

OTHER PUBLICATIONS

Prigge et al.; Color-tuned Channelrhodopsins for Multiwavelength Optogenetics, J. Biol. Chem. 2012, vol. 287, No. 38, pp. 31804-31812.
Tsunoda & Hegemann "Glu 87 of Channelrhodopsin-1 Causes pH-dependent Color Tuning and Fast Photocurrent Inactivation," Photochemistry and Photobiology, 2009, vol. 85, No. 2, pp. 564-569.
Belzung et al., "Optogenetics to study the circuits of fear-and depresssion-like behaviors: A critical analysis," Pharmacology, Biochemistry and Behavior, 2014, 122: 144-157.
Bernstein & Boyden "Optogenetic tools for analyzing the neural circuits of behavior," Trends Cogn Sci., 2011 15(12): 592-600.
Nargeot et al.; Molecular basis of the diversity of calcium channels in cardiovascular tissues European Heart Journal, 1997, Supplemental A, A15-A26.
Kim et al., (2015) "Fabrication of ideal geometric-phase holograms with arbitrary wavefronts," Optica 2(11) 958-964.
Zhao et al. (2010) "Liquid-crystal micropolarimeter array for full Stokes polarization imaging in visible spectrum", Opt Express 18(17):17776-87.
Abbott, et al.; "Photostimulation of Retrotrapezoid Nucleus Phox2b-Expressing Neurons In Vivo Produces Long-Lasting Activation of Breathing in Rats"; The Journal of Neuroscience; vol. 29, No. 18, pp. 5806-5819 (May 6, 2009).
Adamantidis, et al., "Optogenetic Interrogation of Dopaminergic Modulation of the Multiple Phases of Reward-Seeking Behavior", J. Neurosci, 2011, vol. 31, No. 30, pp. 10829-10835.
Aebischer, et al. "Long-Term Cross-Species Brain Transplantation of a Polymer-Encapsulated Dopamine-Secreting Cell Line", Experimental Neurology, 1991, vol. 111, pp. 269-275.
Ageta-Ishihara et al., "Chronic overload of SEPT4, a parkin substrate that aggregates in Parkinson's disease, cause behavioral alterations but not neurodegeneration in mice", Molecular Brain, 2013, vol. 6, 14 pages.
Ahmad, et al. "The *Drosophila rhodopsin* cytoplasmic tail domain is required for maintenance of rhabdomere structure." The FASEB Journal, 2007, vol. 21, p. 449-455.
Airan, et al., "Temporally Precise in vivo Control of Intracellular Signaling", 2009, Nature, vol. 458, No. 7241, pp. 1025-1029.
Airan, et al.; "Integration of light-controlled neuronal firing and fast circuit imaging"; Current Opinion in Neurobiology; vol. 17, pp. 587-592 (2007).
Akirav, et al. "The role of the medial prefrontal cortex-amygdala circuit in stress effects on the extinction of fear", Neural Plasticity, 2007: vol. 2007 Article ID:30873, pp. 1-11.
Ali; "Gene and stem cell therapy for retinal disorders"; vision-research.en—The Gateway to European Vision Research; accessed from http://www.vision-research.eu/index.php?id=696, 10 pages (accessed Jul. 24, 2015).
Alilain, et al.; "Light-Induced Rescue of Breathing after Spinal Cord Injury"; The Journal of Neuroscience; vol. 28, No. 46, pp. 11862-11870 (Nov. 12, 2008).
Ang, et at. "Hippocampal CA1 Circuitry Dynamically Gates Direct Cortical Inputs Preferentially at Theta Frequencies." The Journal of Neurosurgery, 2005, vol. 25, No. 42, pp. 9567-9580.
Araki, et al. "Site-Directed Integration of the cre Gene Mediated by Cre Recombinase Using a Combination of Mutant Iox Sites", Nucleic Acids Research, 2002, vol. 30, No. 19, pp. 1-8.
Aravanis, et al. "An optical neural interface: in vivo control of rodent motor cortex with integrated fiberoptic and optogenetic technology," J. Neural. Eng., 2007, vol. 4(3):S143-S156.
Arenkiel, et al. "In vivo light-induced activation of neural circuitry in transgenic mice expressing Channelrhodopsin-2", Neuron, 2007, 54:205-218.
Argos, et al. "The integrase family of site-specific recombinases: regional similarities and global diversity", The EMBO Journal, 1986, vol. 5, No. 2, pp. 433-440.

Asano, et al.; "Optically Controlled Contraction of Photosensitive Skeletal Muscle Cells"; Biotechnology & Bioengineering; vol. 109, No. 1, pp. 199-204 (Jan. 2012).
Axoclamp-28 Microelectrode claim theory and operation. Accessed from https://physics.ucsd.edu/neurophysics/Manuals/Axon%20Instruments/Axoclamp-2B_Manual.pdf on Dec. 12, 2014.
Azizgolshani, et al.; "Reconstituted plant viral capsids can release genes to mammalian cells"; Virology; vol. 441, No. 1, pp. 12-17 (2013).
Babin et al., "Zebrafish Models of Human Motor Neuron Diseases: Advantages and Limitations", Progress in Neurobiology (2014), 118:36-58.
Balint et al., "The Nitrate Transporting Photochemical Reaction Cycle of the Pharanois Halorhodopsin", Biophysical Journal, 2004, 86:1655-1663.
Bamberg et al. "Light-driven proton or chloride pumping by halorhodopsin." Proc. Natl. Academy Science USA, 1993, vol. 90, No. 2, p. 639-643.
Banghart, et al. "Light-activated ion channels for remote control of neuronal firing". Nature Neuroscience, 2004, vol. 7, No. 12 pp. 1381-1386.
Barchet, et al.; "Challenges and opportunities in CNS delivery of therapeutics for neurodegenerative diseases"; Expert Opinion on Drug Delivery; vol. 6, No. 3, pp. 211-225 (Mar. 16, 2009).
Basil et al.; "Is There Evidence for Effectiveness of Transcranial Magnetic Stimulation in the Treatment of Psychiatric Disorders?"; Psychiatry; vol. 1, No. 11, pp. 64-69 (Nov. 2005).
Bebbington et al., "The use of vectors based on gene amplification for the expression of cloned genes in mammalian cells in DNA cloning" vol. 3, Academic Press, New York, 1987.
Benabid "Future strategies to restore brain functions," Conference proceedings from Medicine Meets Millennium: World Congress of Medicine and Health, 2000, 6 pages.
Benoist et al. "In vivo sequence requirements of the SV40 early promotor region" Nature (London), 1981, vol. 290(5804): pp. 304-310.
Berges et al., "Transduction of Brain by Herpes Simplex Virus Vectors", Molecular Therapy, 2007, vol. 15, No. 1: pp. 20-29.
Berke, et al. "Addiction, Dopamine, and the Molecular Mechanisms of Memory", Molecular Plasticity, 2000, vol. 25: pp. 515-532.
Berlanga, et a.; "Cholinergic Interneurons of the Nucleus Accumbens and Dorsal Striatum are Activated by the Self-Administration of Cocaine"; Neuroscience; vol. 120, pp. 1149-1156 (2003).
Berndt et al. "Bi-stable neural state switches", Nature Neuroscience, 2008, vol. 12, No. 2: pp. 229-234.
Berndt et al., "Structure-guided transformation of channelrhodopsin into a light-activated chloride channel", Science, 2014, 344:420-424.
Berridge et al., "The Versatility and Universality of Calcium Signaling", Nature Reviews: Molecular Cell Biology, 2000, vol. 1: pp. 11-21.
Bi, et al. "Ectopic Expression of a Microbial-Type Rhodopsin Restores Visual Responses in Mice with Photoreceptor Degeneration", Neuron, 2006, vol. 50, No. 1: pp. 23-33.
Bi, et al. "Synaptic Modifications in Cultured Hippocampal Neurons: Dependence on Spike Timing, Synaptic Strength, and Postsynaptic Cell Type", Journal of Neuroscience, 1998, vol. 18, No. 24: pp. 10464-10472.
Bibel, et al.; "Differentiation of mouse embryonic stem cells into a defined neuronal lineage"; Nature Neuroscience; vol. 7, No. 9, pp. 1033-1009 (Sep. 2004).
Blomer et al., "Highly Efficient and Sustained Gene Transfer in Adult Neurons with Lentivirus Vector", Journal of Virology,1997, vol. 71, No. 9: pp. 6641-6649.
Bocquet et al. "A prokaryotic proton-gated ion channel from the nicotinic acetylcholine receptor family." Nature Letters, 2007, vol. 445, p. 116-119.
Bowers, et al.; "Genetic therapy for the nervous system"; Human Molecular Genetics; vol. 20, No. 1, pp. R28-R41 (2011).
Boyden, et al.; "A history of optogenetics: the development of tools for controlling brain circuits with light"; F1000 Biology Reports; vol. 3, No. 11, 12 pages (May 3, 2011).

(56) References Cited

OTHER PUBLICATIONS

Boyden, et al. "Millisecond-timescale, genetically targeted optical control of neural activity" Nature Neuroscience, 2005, vol. 8, No. 9: pp. 1263-1268.
Braun, "Two Light-activated Conductances in the Eye of the Green Alga Volvox carteri", 1999, Biophys J., vol. 76, No. 3, pp. 1668-1678.
Brewin; "The Nature and Significance of Memory Disturbance in Posttraumatic Stress Disorder"; Ann. Rev. Clin. Psychol.; vol. 7, pp. 203-227 (2011).
Brinton, et al. "Preclinical analyses of the therapeutic potential of allopregnanolone to promote neurogenesis in vitro and in vivo in transgenic mouse model of Alzheimer's disease." Current Alzheimer Research, 2006, vol. 3, No. 1: pp. 11-7.
Brosenitsch et al, "Physiological Patterns of Electrical Stimulation Can Induce Neuronal Gene Expression by Activating N-Type Calcium Channels," Journal of Neuroscience, 2001, vol. 21, No. 8, pp. 2571-2579.
Brown, et al. "Long-term potentiation induced by θ frequency stimulation is regulated by a protein phosphate-operated gate." The Journal of Neuroscience, 2000, vol. 20, No. 21, pp. 7880-7887.
Bruegmann, et al.; "Optogenetic control of heart muscle in vitro and in vivo"; Nature Methods; vol. 7, No. 11, pp. 897-900(Nov. 2010).
Bruegmann, et al.; "Optogenetics in cardiovascular research: a new tool for light-induced depolarization of cardiomyocytes and vascular smooth muscle cells in vitro and in vivo"; European Heart Journal; vol. 32, No. Suppl . 1, p. 997 (Aug. 2011).
Callaway, et al. "Photostimulation using caged glutamate reveals functional circuitry in living brain slices", Proc. Natl. Acad. Sci. USA., 1993, vol. 90: pp. 7661-7665.
Campagnola et al. "Fiber-coupled light-emitting diode for localized photostimulation of neurons expressing channelrhodopsin-2." Journal of Neuroscience Methods , 2008, vol. 169, Issue 1. Abstract only.
Cannon, et al.; "Endophenotypes in the Genetic Analyses of Mental Disorders"; Annu. Rev. Clin. Psychol.; vol. 2, pp. 267-290 (2006).
Cardin, et al. "Driving Fast spiking Cells Induces Gamma Rhythm and Controls Sensory Responses", 2009, Nature, vol. 459, vol. 7247, pp. 663-667.
Cardin, et al.; "Targeted optogenetic stimulation and recording of neurons in vivo using cell-type-specific expression of Channelrhodopsin-2"; Nature Protocols; vol. 5, No. 2, pp. 247-254 (2010).
Caro, et al.; "Engineering of an Artificial Light-Modulated Potassium Channel"; PLoS One; vol. 7, Issue 8, e43766 (Aug. 2012).
Castagne, et al.; "Rodent Models of Depression: Forced Swim and Tail Suspension Behavioral Despair Tests in Rats and Mice"; Current Protocols in Pharmacology; Supp. 49, Unit 5.8.1-5.8.14 (Jun. 2010).
Cazillis, et al., "VIP and PACAP induce selective neuronal differentiation of mouse embryonic stem cells", Eur J Neurosci, 2004, 19(4):798-808.
Cenatiempo "Prokaryotic gene expression in vitro: transcription-translation coupled systems", Biochimie, 1986, vol. 68(4): pp. 505-515.
Chamanzar, et al.; "Deep Tissue Targeted Near-infrared Optogenetic Stimulation using Fully Implantable Upconverting Light Bulbs"; 2015 37th Annual International Conference of the IEEE Engineering in Medicine and Biology Society (EMBC), IEEE; doi: 10.1109/EMBC.2015.7318488, pp. 821-824 (Aug. 25, 2015).
Chinta, et al.; "Dopaminergic neurons"; The International Journal of Biochemistry & Cell Biology; vol. 37, pp. 942-946 (2005).
Chow et al., "Optogenetics and translation medicine", Sci Transl Med., 2013, 5(177):177.
Chow, et al.; "High-performance genetically targetable optical neural silencing by light-driven proton pumps"; Nature; vol. 463, pp. 98-102 (Jan. 7, 2010).
Clark, et al.; "A future for transgenic livestock"; Nature Reviews Genetics; vol. 4, No. 10, pp. 825-833 (Oct. 2003).

Claudio et al. "Nucleotide and deduced amino acid sequences of Torpedo californica acetylcholine receptor gamma subunit." PNAS USA,1983, vol. 80, p. 1111-1115.
Coleman, et al.; "Assessing Anxiety in Nonhuman Primates"; Ilar Journal; vol. 55, No. 2, pp. 333-346 (2014).
Collingridge et al. "Inhibitory post-synaptic currents in rat hippocampal CA1 neurones." J. Physiol., 1984, vol. 356, pp. 551-564.
Covington, et al. "Antidepressant Effect of Optogenetic Stimulation of the Medial Prefrontal Cortex." Journal of Neuroscience, 2010, vol. 30(48), pp. 16082-16090.
Cowan et al., "Targeting gene expression to endothelium in transgenic animals: a comparison of the human ICAM-2, PECAM-1, and endoglin promoters", Xenotransplantation, 2003, vol. 10, pp. 223-231.
Crouse, et al. "Expression and amplification of engineered mouse dihydrofolate reductase minigenes" Mol. Cell. Biol. , 1983, vol. 3(2): pp. 257-266.
Cucchiaro et al., "Electron-Microscopic Analysis of Synaptic Input from the Perigeniculate Nucleus to A-Laminae of the Lateral Geniculate Nucleus in Cats", The Journal of Comparitive Neurology, 1991, vol. 310, pp. 316-336.
Cucchiaro et al., "Phaseolus vulgaris leucoagglutinin (PHA-L): a neuroanatomical tracer for electron microscopic analysis of synaptic circuitry in the cat's dorsal lateral geniculate nucleus" J. Electron. Microsc. Tech., 1990, 15 (4):352-368.
Cui, et al., "Electrochemical deposition and characterization of conducting polymer polypyrrole/PSS on multichannel neural probes," Sensors and Actuators, 2001, vol. 93(1): pp. 8-18.
Dalva, et al. "Rearrangements of Synaptic Connections in Visual Cortex Revealed by Laser Photostimulation", Science, 1994,vol. 265, pp. 255-258.
Daniel, et al.; "Stress Modulation of Opposing Circuits in the Bed Nucleus of the Stria Terminalis"; Neuropsychopharmacology Reviews; vol. 41, pp. 103-125 (2016).
Date, et al. "Grafting of Encapsulated Dopamine-Secreting Cells in Parkinson's Disease: Long-Term Primate Study", Cell Transplant, 2000, vol. 9, pp. 705-709.
Davidson, et al.; "Viral Vectors for Gene Delivery to the Nervous System"; Nature Reviews Neuroscience; vol. 4, pp. 353-364 (May 2003).
Davis; "The many faces of epidermal growth factor repeats," The New Biologist; vol. 2, No. 5, pp. 410-419 (1990).
Day, et al.; "The Nucleus Accumbens and Pavlovian Reward Learning"; Neuroscientist; vol. 13, No. 2, pp. 148-159 (Apr. 2007).
De Foubert et al. "Fluoxetine-Induced Change in Rat Brain Expression of Brain-Derived Neurotrophic Factor Varies Depending On Length of Treatment," Neuroscience, 2004, vol. 128, pp. 597-604.
De Palma, et al.; "In Vivo Targeting of Tumor Endothelial Cells by Systemic Delivery of Lentiviral Vectors"; Human Gene Therapy; vol. 14, pp. 1193-1206 (Aug. 10, 2003).
Dederen, et al. "Retrograde neuronal tracing with cholera toxin B subunit: comparison of three different visualization methods", Histochemical Journal, 1994, vol. 26, pp. 856-862.
Definition of Implant; Merriam-Webster Dictionary; retrieved Nov. 7, 2016 (http://www.merriam-webster.com/dictionary/implant).
Definition of integral. Merriam-Webster Dictionary, retrieved on Mar. 20 2017; Retrieved from the internet: <http://www.merriam-webster.com/dictionary/integral>.
Definition of Psychosis (2015).
Deisseroth "Next-generation optical technologies for illuminating genetically targeted brain circuits," The Journal of Neuroscience, 2006, vol. 26, No. 41, pp. 10380-10386.
Deisseroth et al., "Excitation-neurogenesis Coupling in Adult Neural Stem/Progenitor Cells", 2004, Neuron, vol. 42, pp. 535-552.
Deisseroth et al., "Signaling from Synapse to Nucleus: Postsynaptic CREB Phosphorylation During Multiple Forms of Hippocampal Synaptic Plasticity", Neuron, 1996, vol. 16, pp. 89-101.
Deisseroth et al., "Signaling from Synapse to Nucleus: the logic Behind the Mechanisms", Currrent Opinion in Neurobiology, 2003, vol. 13, pp. 354-65.
Deisseroth et al., "Translocation of Calmodulin to the Nucleus Supports CREB Phosphorylation in Hippocampal Neurons", Nature, 1998, vol. 392, pp. 198-202.

(56) References Cited

OTHER PUBLICATIONS

Deisseroth, et al., "Controlling the Brain with Light", Scientific American, 2010, vol. 303, pp. 48-55.
Delaney et al., "Evidence for a long-lived 13-cis-containing intermediate in the photocycle of the leu 93 → ala bacteriorhodopsin mutant", J. Physical Chemistry B, 1997, vol. 101, No. 29, pp. 5619-5621.
Denk, W., et al. "Anatomical and functional imaging of neurons using 2-photon laser scanning microscopy", Journal of Neuroscience Methods, 1994, vol. 54, pp. 151-162.
Deonarain; "Ligand-targeted receptor-mediated vectors for gene delivery"; Exp. Opin. Ther. Patents; vol. 8, No. 1, pp. 53-69 (1998).
Ditterich, et al. "Microstimulation of visual cortex affects the speed of perceptual decisions", 2003, Nature Neuroscience, vol. 6, No. 8, pp. 891-898.
Dittgen, et al. "Lentivirus-based genetic manipulations of cortical neurons and their optical and electrophysiological monitoring in vivo", PNAS, 2004, vol. 101, No. 52, pp. 18206-18211.
Do Carmo, et al.; "Modeling Alzheimer's disease in transgenic rats"; Molecular Neurodegeneration; vol. 8, No. 37, 11 pages (2013).
Douglass, et al., "Escape Behavior Elicited by Single, Channelrhodopsin-2-evoked Spikes in Zebrafish Somatosensory Neurons", Curr Biol., 2008, vol. 18, No. 15, pp. 1133-1137.
Ebert et al., "A Moloney MLV-rat somatotropin fusion gene produces biologically active somatotropin in a transgenic pig", Mol. Endocrinology, 1988, vol. 2, pp. 277-283.
EBI accession No. EMBL: J05199; "N. pharaonis halorhodopsin (hop) gene, complete cds"; (Nov. 22, 1990).
EBI accession No. UNIPROT: A7U0Y6; "SubName: Full= Bacteriorhodopsin"; (Aug. 10, 2010).
EBI accession No. UNIPROT: B0R5N9; "Subname: Full= Bacteriorhodopsin"; (Apr. 8, 2008).
EBI accession No. UNIPROT: B4Y103; "SubName: Full= Channelrhodopsin-1"; (Sep. 23, 2008).
EBI accession No. UBIPROT: P15647; "RecName: Full= Halorhodopsin; Short=HR; Alt Name: Full=NpHR"; (Apr. 1, 1990).
Edelstein, et al.; "Gene therapy clinical trials worldwide 1989-2004—an overview"; The Journal of Gene Medicine; vol. 6, pp. 597-602 (2004).
Ehrlich I. et al. "Amygdala inhibitory circuits and the control of fear memory", Neuron, 2009, vol. 62: pp. 757-771.
Eijkelkamp, et al. "Neurological perspectives on voltage-gated sodium channels", Brain, 2012, 135:2585-2612.
Eisen, "Treatment of amyotrophic lateral sclerosis", Drugs Aging, 1999; vol. 14, No. 3, pp. 173-96.
Emerich, et al. "A Novel Approach to Neural Transplantation in Parkinson's Disease: Use of Polymer-Encapsulated Cell Therapy", Neuroscience and Biobehavioral Reviews, 1992, vol. 16, pp. 437-447.
Ensell, et al. "Silicon-based microelectrodes for neurophysiology, micromachined from silicon-on-insulator wafers," Med. Biol. Eng. Comput., 2000, vol. 38, pp. 175-179.
Ernst, et al. "Photoactivation of Channelrhodopsin", J. Biol. Chem., 2008, vol. 283, No. 3, pp. 1637-1643.
Esposito et al. "The integrase family of tyrosine recombinases: evolution of a conserved active site domain" , Nucleic Acids Research, 1997, vol. 25, No. 18, pp. 3605-3614.
Evanko "Optical excitation yin and yang" Nature Methods, 2007, 4:384.
Fabian et al. "Transneuronal transport of lectins" Brain Research, 1985, vol. 344, pp. 41-48.
Falconer et al. "High-throughput screening for ion channel modulators," Journal of Biomolecular Screening, 2002, vol. 7, No. 5, pp. 460-465.
Fanselow, et al.; "Why We Think Plasticity Underlying Pavlovian Fear Conditioning Occurs in the Basolateral Amygdala"; Neuron; vol. 23, pp. 229-232 (Jun. 1999).
Farber, et al. "Identification of Presynaptic Neurons by Laser Photostimulation", Science, 1983, vol. 222, pp. 1025-1027.

Feng, et al. "Imaging Neuronal Subsets in Transgenic Mice Expressing Multiple Spectral Variants of GFP", Neuron, 2000, vol. 28, pp. 41-51.
Fenno et al., "The development and application of optogenetics", Annual Review of Neuroscience, 2011, vol. 34, No. 1, pp. 389-412.
Ferenczi, et al.; "Optogenetic approaches addressing extracellular modulation of neural excitability"; Scientific Reports; vol. 6, 20 pages (Apr. 5, 2016).
Fiala et al., "Optogenetic approaches in neuroscience", Current Biology, Oct. 2010, 20(20):R897-R903.
Fisher, J. et al. "Spatiotemporal Activity Patterns During Respiratory Rhythmogenesis in the Rat Ventrolateral Medulla," The Journal of Neurophysiol, 2006, vol. 95, pp. 1982-1991.
Fitzsimons et al., "Promotors and Regulatory Elements that Improve Adeno-Associated Virus Transgene Expression in the Brain", 2002, Methods, vol. 28, pp. 227-236.
Foster, "Bright blue times", Nature, 2005, vol. 433, pp. 698-699.
Fox et al., "A gene neuron expression fingerprint of C. elegans embryonic motor neurons", BMC Genomics, 2005, 6(42):1-23.
Friedman, et al.; "Programmed Acute Electrical Stimulation of Ventral Tegmental Area Alleviates Depressive-Like Behavior"; Neuropsychopharmacology; vol. 34, pp. 1057-1066 (2009).
Friedman, et al.; "VTA Dopamine Neuron Bursting is Altered in an Animal Model of Depression and Corrected by Desipramine"; J. Mol. Neurosci.; vol. 34, pp. 201-209 (2008).
Garrido et al., "A targeting motif involved in sodium channel clustering at the axonal initial segment", Science, 2003, vol. 300, No. 5628, pp. 2091-2094.
Gelvich et al. "Contact flexible microstrip applicators (CFMA) in a range from microwaves up to short waves," IEEE Transactions on Biomedical Engineering, 2002, vol. 49, Issue 9: 1015-1023.
Genbank Accession No. AAG01180.1; Idnurm, et al.; pp. 1 (Mar. 21, 2001).
Genbank Accession No. ABT17417.1; Sharma, et al.; pp. 1 (Aug. 15, 2007).
GenBank Accession No. AC096118.6; Rattus norvegicus clone CH230-11 B15, 1-4, 24-25, Working Draft Sequence, 3 unordered pieces. May 10, 2003.
Genbank Accession No. BAA09452.1; Mukohata et al.; pp. 1 (Feb. 10, 1999).
Genbank Accession No. DQ094781 (Jan. 15, 2008).
GenBank Accession No. U79717.1; Rattus norvegicus dopamine 02 receptor 1-4, 24-25 gene, promoter region and exon 1. Jan. 31, 1997.
Gerits, et al.; "Optogenetically Induced Behavioral and Functional Network Changes in Primates"; Current Biology; vol. 22, pp. 1722-1726 (Sep. 25, 2012).
Gigg, et al. "Glutamatergic hippocampal formation projections to prefrontal cortex in the rat are regulated by GABAergic inhibition and show convergence with glutamatergic projections from the limbic thalamus," Hippocampus, 1994, vol. 4, No. 2, pp. 189-198.
Gilman, et al. "Isolation of sigma-28-specific promoters from *Bacillus subtilis* DNA" Gene, 1984, vol. 32(1-2): pp. 11-20.
Glick et al."Factors affecting the expression of foreign proteins in *Escherichia coli*", Journal of Industrial Microbiology, 1987, vol. 1(5): pp. 277-282.
Goekoop, R. et al. "Cholinergic challenge in Alzheimer patients and mild cognitive impairment differentially affects hippocampal activation-a pharmacological fMRI study." Brain, 2006, vol. 129, pp. 141-157.
Gold, et al. "Representation of a perceptual decision in developing oculomotor commands", Nature, 2000, vol. 404, pp. 390-394.
Gong, et al.; "Enhanced Archaerhodopsin Fluorescent Protein Voltage Indicators"; PLOS One; vol. 8, Issue 6, 10 pages (Jun. 2013).
Gonzalez, et al., "Cell-Based Assays and Instrumentation for Screening Ion-Channel Targets", DDT, 1999, vol. 4, No. 9, pp. 431439.
Gordon, et al. "Regulation of Thy-1 Gene Expression in Transgenic Mice", Cell, 1987, vol. 50, pp. 445-452.
Gorelova et al. , "The course of neural projection from the prefrontal cortex to the nucleus accumbens in the rat ", Neuroscience, 1997, vol. 76, No. 3, pp. 689-706.
Goshen et al. "Dynamics of Retrieval Strategies for Remote Memories", Cell, 2011, col. 147: pp. 678-589.

(56) References Cited

OTHER PUBLICATIONS

Gottesman et al."Bacterial regulation: global regulatory networks," Ann. Rev. Genet. , 1984, vol. 18, pp. 415-441.
Gradinaru et al., "Optical Deconstruction of Parkinsonian neural circuitry," Science, Apr. 2009, 324(5925):354-359.
Gradinaru et al., "Targeting and readout strategies for fast optical neural control in vitro and in vivo", J Neuroscience, 2007, 27(52):14231-14238.
Gradinaru, et al. "ENpHR: a Natronomonas Halorhodopsin Enhanced for Optogenetic Applications", 2008, Brain Cell Biol., vol. 36 (1-4), pp. 129-139.
Gradinaru, et al., "Molecular and Cellular Approaches for Diversifying and Extending Optogenetics", Cell, 2010, vol. 141, No. 1, pp. 154-165.
Grady, et al.; "Age-Related Reductions in Human Recognition Memory Due to Impaired Encoding"; Science; vol. 269, No. 5221, pp. 218-221 (Jul. 14, 1995).
Greenberg, et al. "Three-year outcomes in deep brain stimulation for highly resistant obsessive-compulsive disorder," Neuropsychopharmacology, 2006, vol. 31, pp. 2384-2393.
Gregory, et al. "Integration site for *Streptomyces phage* φBT1 and development of site-specific integrating vectors", Journal of Bacteriology, 2003, vol. 185, No. 17, pp. 5320-5323.
Gritton, et al.; "Optogenetically-evoked cortical cholinergic transients in mice expressing channelrhodopsin-2 (ChR2) in cholinergic neurons"; Society for Neuroscience Abstract Viewer and Itinery Planner & 40th Annual Meeting of the Society-for-Neuroscience; vol. 40, 2 pages (2010).
Groth et al. "Phage integrases: biology and applications," Journal of Molecular Biology, 2004, vol. 335, pp. 667-678.
Groth, et al. "A phage integrase directs efficient site-specific integration in human cells", PNAS, 2000, vol. 97, No. 11, pp. 5995-6000.
Guatteo, et al. "Temperature sensitivity of dopaminergic neurons of the substantia nigra pars compacta: Involvement of transient receptor potential channels," Journal of Neurophysiol. , 2005, vol. 94, pp. 3069-3080.
Gulick, et al. "Transfection using DEAE-Dextran" Supplement 40, Current Protocols in Molecular Biology, 1997, Supplement 40, 9.2.1-9.2.10.
Gunaydin et al., "Ultrafast optogenetic control", Nature Neuroscience, 2010, vol. 13, No. 3, pp. 387-392.
Gur et al., "A Dissociation Between Brain Activity and Perception: Chromatically Opponent Cortical Neurons Signal Chromatic Flicker that is not Perceived", Vision Research, 1997, vol. 37, No. 4, pp. 377-382.
Hackmann, et al.; "Static and time-resolved step-scan Fourier transform infrared investigations of the photoreaction of halorhodopsin from Natronobacterium pharaonis: consequences for models of the anion translocation mechanism"; Biophysical Journal; vol. 81, pp. 394-406 (Jul. 2001).
Hagglund, et al.; "Activation of groups of excitatory neurons in the mammalian spinal cord or hindbrain evokes locomotion"; Nature Neuroscience; vol. 13, No. 2, 8 pages (Feb. 2010).
Haim, et al.; "Gene Therapy to the Nervous System"; Stem Cell and Gene-Based Therapy; Section 2, pp. 133-154 (2006).
Hallet et al. "Transposition and site-specific recombination: adapting DNA cut-and-paste mechanisms to a variety of genetic rearrangements," FEMS Microbiology Reviews, 1997, vol. 21, No. 2, pp. 157-178.
Hamer, et al. "Regulation In Vivo of a cloned mammalian gene: cadmium induces the transcription of a mouse metallothionein gene in SV40 vectors," Journal of Molecular Applied Genetics, 1982, vol. 1, No. 4, pp. 273-288.
Hammack, et al.; "The response of neurons in the bed nucleus of the stria terminalis to serotonin Implications for anxiety"; Progress in Neuro-Psychopharmacology & Biological Psychiatry; vol. 33, pp. 1309-1320 (2009).
Hammer et al., "Spontaneous inflammatory disease in transgenic rats expressing HLA-B27 and Human $\beta_2$m: an animal model of HLA-B27-associated human disorders", Cell, 1990, vol. 63, pp. 1099-1112.
Han, et al.; "A high-light sensitivity optical neural silencer: development and application to optogenetic control of non-human primate cortex"; Frontiers in Systems Neuroscience; vol. 5, Article 18, pp. 1-8 (Apr. 2011).
Han, et al.; "Millisecond-Timescale Optical Control of Neural Dynamics in the Nonhuman Primate Brain"; Neuron; vol. 62, pp. 191-198 (Apr. 30, 2009).
Han, et al.; "Multiple-Color Optical Activation, Silencing, and Desynchronization of Neural Activity with Single-Spike Temporal Resolution"; PLoS One, 2007, vol. 2, No. 3, pp. 1-12.
Han, et al.; "Optogenetics in the nonhuman primate"; Prog. Brain Res.; vol. 196, pp. 215-233 (2012).
Han, et al.; "Two-color, bi-directional optical voltage control of genetically-targeted neurons", CoSyne Abstract Presentation, Presented Feb. 24, 2007.
Han, et al.; "Virogenetic and optogenetic mechanisms to define potential therapeutic targets in psychiatric disorders"; Neuropharmacology; vol. 62, pp. 89-100 (2012).
Hausser, et al. "Tonic Synaptic Inhibition Modulates Neuronal Output Pattern and Spatiotemporal Synaptic Integration", Neuron, 1997, vol. 19, pp. 665- 678.
Hegemann et al., "All-trans Retinal Constitutes the Functional Chromophore in *Chlamydomonas rhodopsin*", Biophys. J. , 1991, vol. 60, pp. 1477-1489.
Herlitze, et al., "New Optical Tools for Controlling Neuronal Activity", 2007, Curr Opin Neurobiol, vol. 17, No. 1, pp. 87-94.
Herry, et al. "Switching on and off fear by distinct neuronal circuits," Nature, 2008, vol. 454, pp. 600-606.
Heymann, et al.; "Expression of Bacteriorhodopsin in Sf9 and COS-1 Cells"; Journal of Bioenergetics and Biomembranes; vol. 29, No. 1, pp. 55-59 (1997).
Hikida et al., "Acetlycholine enhancement in the nucleus accumbens prevents addictive behaviors of cocaine and morphine", PNAS, May 2003, 100(10):6169-6173.
Hikida et al., "Increased sensitivity to cocaine by cholingergic cell ablation in nucleus accumbens," PNAS, Nov. 2001, 98(23):13351-13354.
Hildebrandt et al, "Bacteriorhodopsin expressed in *Schizosaccharomyces pombe* pumps protons through the plasma membrane, " PNAS, 1993, vol. 90, pp. 3578-3582.
Hira et al., "Transcranial optogenetic stimulation for functional mapping of the motor cortex", J Neurosci Methods, 2009, vol. 179, pp. 258-263.
Hirase, et al. "Multiphoton stimulation of neurons", J Neurobiol, 2002, vol. 51, No. 3: pp. 237-247.
Hodaie, et al., "Chronic Anterior Thalamus Stimulation for Intractable Epilepsy," Epilepsia, 2002, vol. 43, pp. 603-608.
Hoffman et al., "K+ Channel Regulation of Signal Propagation in Dendrites of Hippocampal Pyramidal Neurons", 1997, Nature, vol. 387: pp. 869-874.
Hofherr et al. "Selective Golgi export of Kir2.1 controls the stoichiometry of functional Kir2.x channel heteromers"Journal of Cell Science, 2005, vol. 118, p. 1935-1943.
Hosokawa, T. et al. "Imaging spatio-temporal patterns of long-term potentiation in mouse hippocampus." Philos. Trans. R. Soc. Lond. B., 2003, vol. 358, pp. 689-693.
Hososhima, et al.; "Near-infrared (NIR) up-conversion optogenetics"; Optical Techniques in Neurosurgery, Neurophotonics, and Optogenetics II; vol. 9305, doi: 10.1117/12.2078875, 4 pages (2015).
Hustler; et al., "Acetylcholinesterase staining in human auditory and language cortices: regional variation of structural features", Cereb Cortex (Mar.-Apr. 1996), 6(2):260-70.
Hynynen, et al. "Clinical applications of focused ultrasound—The brain." Int. J. Hyperthermia, 2007, vol. 23, No. 2: pp. 193-202.
Ibbini, et al.; "A Field Conjugation Method for Direct Synthesis of Hyperthermia Phased-Array Heating Patterns"; IEEE Transactions on Ultrasonics, Ferroelectrics, and Frequency Control; vol. 36, No. 1, pp. 3-9 (Jan. 1989).

(56) References Cited

OTHER PUBLICATIONS

Ihara, et al.; "Evolution of the Archaeal Rhodopsins: Evolution Rate Changes by Gene Duplication and Functional Differentiation"; J. Mol. Biol.; vol. 285, pp. 163-174 (1999).
International Search Report for International Application No. PCT/US2009/053474, dated Oct. 8, 2009.
Isenberg et al.; "Cloning of a Putative Neuronal Nicotinic Aceylcholine Receptor Subunit"; Journal of Neurochemistry; vol. 52, No. 3, pp. 988-991 (1989).
Iyer et al., "Virally mediated optogenetic excitation and inhibition of pain in freely moving nontransgenic mice", Nat Biotechnol., 2014, 32(3):274-8.
Jekely, "Evolution of Phototaxis", 2009, Phil. Trans. R. Soc. B, vol. 364, pp. 2795-2808.
Jennings et al., "Distinct extended amygdala circuits for divergent motivational states," Nature, 2013, 496:224-228.
Ji et al., "Light-evoked Somatosensory Perception of Transgenic Rats that Express Channelrhodopsin-2 in Dorsal Root Ganglion Cells", PLoS One, 2012 7(3):e32699.
Jimenez S.A & Maren S. et al/ "Nuclear disconnection within the amygdala reveals a direct pathway to fear", Learning Memory, 2009, vol. 16: pp. 766-768.
Johansen, et al., "Optical Activation of Lateral Amygdala Pyramidal Cells Instructs Associative Fear Learning", 2010, PNAS, vol. 107, No. 28, pp. 12692-12697.
Johnson, et al.; "Differential Biodistribution of Adenoviral Vector In Vivo as Monitored by Bioluminescence Imaging and Quantitative Polymerase Chain Reaction"; Human Gene Therapy; vol. 17, pp. 1262-1269 (Dec. 2006).
Johnson-Saliba, et al.; "Gene Therapy: Optimising DNA Delivery to the Nucleus"; Current Drug Targets; vol. 2, pp. 371-399 (2001).
Johnston et al. "Isolation of the yeast regulatory gene GAL4 and analysis of its dosage effects on the galactose/melibiose regulon," PNAS, 1982, vol. 79, pp. 6971-6975.
Jones, et al.; "Animal Models of Schizophrenia"; British Journal of Pharmacology; vol. 164, pp. 1162-1194 (2011).
Kaiser; "Clinical research. Death prompts a review of gene therapy vector"; Science; 317(5838):580, 1 page (Aug. 3, 2007).
Kandel, E.R.,et al. "Electrophysiology of Hippocampal Neurons: I. Sequential Invasion and Synaptic Organization," J Neurophysiol, 1961, vol. 24, pp. 225-242.
Kandel, E.R.,et al. "Electrophysiology of Hippocampal Neurons: II. After-Potentials and Repetitive Firing", J Neurophysiol., 1961, vol. 24, pp. 243-259.
Karra, et al. "Transfection Techniques for Neuronal Cells", The Journal of Neuroscience, 2010, vol. 30, No. 18, pp. 6171-6177.
Karreman et al. "On the use of double FLP recognition targets (FRTs) in the LTR of retroviruses for the construction of high producer cell lines", Nucleic Acids Research, 1996, vol. 24, No. 9: pp. 1616-1624.
Kato et al. "Present and future status of noninvasive selective deep heating using RF in hyperthermia." Med & Biol. Eng. & Comput 31 Supp: S2-11, 1993. Abstract. p. S2 only.
Katz, et al. "Scanning laser photostimulation: a new approach for analyzing brain circuits," Journal of Neuroscience Methods, 1994, vol. 54, pp. 205-218.
Kay; "State-of-the-art gene-based therapies: the road ahead"; Nature Reviews Genetics; vol. 12, pp. 316-328 (May 2011).
Kelder et al., "Glycoconjugates in human and transgenic animal milk", Advances in Exp. Med. And Biol., 2001, vol. 501, pp. 269-278.
Kessler, et al.; "Gene delivery to skeletal muscle results in sustained expression and systemic delivery of a therapeutic protein"; Proc. Natl. Acad. Sci. USA; vol. 93, pp. 14082-14087 (Nov. 1996).
Khodakaramian, et al. "Expression of Cre Recombinase during Transient Phage Infection Permits Efficient Marker Removal in *Streptomyces*," Nucleic Acids Research, 2006, vol. 34, No. 3:e20, pp. 1-5.
Khosravani et al., "Voltage-Gated Calcium Channels and Idiopathic Generalized Epilepsies", Physiol. Rev., 2006, vol. 86: pp. 941-966.

Kianianmomeni, et al. "Channelrhodopsins of Volvox carteri are Photochromic Proteins that are Specifically Expressed in Somatic Cells under Control of Light, Temperature, and the Sex Inducer", 2009, Plant Physiology, vol. 151, No. 1, pp. 347-366.
Kim et al., "Diverging neural pathways assemble a behavioural state from separable features in anxiety" Nature, 2013, 496(7444):219-23.
Kim et al., "Light-Driven Activation of β2-Adrenergic Receptor Signaling by a Chimeric Rhodopsin Containing the β2-Adrenergic Receptor Cytoplasmic Loops," Biochemistry, 2005, vol. 44, No. 7, pp. 2284-2292.
Kim et al., "PPZ domain proteins of synapses", Nature Reviews Neuroscience, 2004, vol. 5, No. 10, pp. 771-781.
Kingston et al. "Transfection and Expression of Cloned DNA," Supplement 31, Current Protocols in Immunology, 1999, 10.13.1-1 0.13.9.
Kingston et al. "Transfection of DNA into Eukaryotic Cells," Supplement 63, Current Protocols in Molecular Biology, 1996, 9.1.1-9.1.11, 11 pages.
Kinoshita, et al., "Optogenetically Induced Supression of Neural Activity in the Macaque Motor Cortex", Poster Sessions Somatomotor System, Others, Society for Neuroscience Meeting, 2010, pp. 141-154.
Kita, H. et al. "Effects of dopamine agonists and antagonists on optical responses evoked in rat frontal cortex slices after stimulation of the subcortical white matter," Exp. Brain Research, 1999, vol. 125, pp. 383-388.
Kitabatake et al., "Impairment of reward-related learning by cholinergic cell ablationn in the striatum", PNAS, Jun. 2003, 100(13):7965-7970.
Kitayama, et al. "Regulation of neuronal differentiation by N-methyl-D-aspartate receptors expressed in neural progenitor cells isolated from adult mouse hippocampus," Journal of Neurosci Research, 2004, vol. 76, No. 5: pp. 599-612.
Klausberger, et al. "Brain-state-and cell-type-specific firing of hippocampal interneurons in vivo", Nature, 2003, vol. 421: pp. 844-848.
Kleinlogel, et al.; "A gene-fusion strategy for stoichiometric and co-localized expression of light-gated membrane proteins"; Nature Methods; vol. 8, No. 12, pp. 1083-1091 (Dec. 2011).
Knopfel, et al.; "A comprehensive concept of optogenetics"; Progress in Brain Research; vol. 196, pp. 1-28 (2012).
Knopfel, et al.; "Optical Probing of Neuronal Circuit Dynamics: Gentically Encoded Versus Classical Fluorescent Sensors", 2006, Trends Neurosci, vol. 29, No. 3, pp. 160-166.
Knopfel, et al.; "Remote control of cells"; Nature Nanotechnology; vol. 5, pp. 560-561 (Aug. 2010).
Knox, et al.; "Heterologous Expression of Limulus Rhodopsin"; The Journal of Biological Chemistry; vol. 278, No. 42, pp. 40493-40502 (Oct. 17, 2003).
Kocsis et al., "Regenerating Mammalian Nerve Fibres: Changes in Action Potential Wavefrom and Firing Characteristics Following Blockage of Potassium Conductance", 1982, Proc. R. Soc. Lond., vol. B 217: pp. 77-87.
Kokel et al., "Photochemical activation of TRPA1 channels in neurons and animals", Nat Chem Biol, 2013, 9(4):257-263.
Kravitz, et al.; "Regulation of parkinsonian motor behaviours by optogenetic control of basal ganglia circuitry"; Nature; vol. 466, No. 622, 8 pages (Jul. 29, 2010).
Kugler, et al.; "Neuron-Specific Expression of Therapeutic Proteins: Evaluation of Different Cellular Promoters in Recombinant Adenoviral Vectors"; Molecular and Cellular Neuroscience; vol. 17, pp. 78-96 (2001).
Kuhlman et al. (2008) "High-Resolution Labeling and Functional Manipulation of Specific Neuron Types in Mouse Brain by Cre-Activated Viral Gene Expression" PLoS One, e2005, vol. 3, No. 4, pp. 1-11.
Kunkler, P. et at. "Optical Current Source Density Analysis in Hippocampal Organotypic Culture Shows that Spreading Depression Occurs with Uniquely Reversing Current," The Journal of Neuroscience, 2005, vol. 25, No. 15, pp. 3952-3961.

(56) References Cited

OTHER PUBLICATIONS

Lalumiere, R., "A new technique for controlling the brain: optogenetics and its potential for use in research and the clinic", Brain Stimulation, 2011, vol. 4, pp. 1-6.
Lammel et al., "Input-specific control of reward and aversion in the ventral tegmental area", Nature, 2012, 491(7423): 212-217.
Landy, A. "Mechanistic and structural complexity in the site-specific recombination pathways of Int and FLP", Current Opinion in Genetics and Development, 1993, vol. 3, pp. 699-707.
Lanyi et al. "The primary structure of a Halorhodopsin from Natronobacterium Pharaonis" Journal of Biological Chemistry, 1990, vol. 265, No. 3, p. 1253-1260.
Lee et al. "Sterotactic Injection of Adenoviral Vectors that Target Gene Expression to Specific Pituitary Cell Types: Implications for Gene Therapy", Neurosurgery, 2000, vol. 46, No. 6: pp. 1461-1469.
Lee et al., "Potassium Channel Gene Therapy Can Prevent Neuron Death Resulting from Necrotic and Apoptotic Insults", Journal of Neurochemistry, 2003, vol. 85: pp. 1079-1088.
Levitan et al. "Surface Expression of Kv1 Voltage-Gated K+ Channels Is Governed by a C-terminal Motif," Trends Cardiovasc. Med., 2000, vol. 10, No. 7, pp. 317-320.
Li et al. "Fast noninvasive activation and inhibition of neural and network activity by vertebrate rhodopsin and green algae channelrhodopsin." PNAS, 2005, vol. 102, No. 49, p. 17816-17821.
Li et al., "Surface Expression of Kv1 Channels is Governed by a C-Terminal Motif", J. Bioi. Chem. (2000), 275(16):11597-11602.
Li, et al.; "A Method for Activation of Endogenous Acid-sensing Ion Channel 1a (ASIC1a) in the Nervous System with High Spatial and Temporal Precision"; The Journal of Biological Chemistry; vol. 289, No. 22, pp. 15441-15448 (May 30, 2014).
Lim et al., "A Novel Targeting Signal for Proximal Clustering of the Kv2.1 K+ Channel in Hippocampal Neurons", Neuron, 2000, vol. 25: pp. 385-397.
Lima, et al. "Remote Control of Behavior through Genetically Targeted Photostimulation of Neurons", Cell, 2005, vol. 121: pp. 141-152.
Liman, et al. "Subunit Stoichiometry of a Mammalian K+ Channel Determined by Construction of Multimeric cDNAs," Neuron, 1992,vol. 9, pp. 861-871.
Lin, "A user's guide to channelrhodopsin variants: features, limitations and future developments", Exp Physiol, 2010, vol. 96, No. 1, pp. 19-25.
Lin, et al.; "Characterization of Engineered Channelrhodopsin Variants with Improved Properties and Kinetics"; Biophysical Journal; vol. 96, No. 5, pp. 1803-1814 (Mar. 2009).
Lin, et al.; "Study of the Circuitry of Nucleus Accumbens and its Effect on Addiction by Optogenetic Methods: 964"; Neurosurgery; vol. 67, No. 2, p. 557 (Aug. 2010).
Liske et al., "Optical inhibition of motor nerve and muscle activity in vivo", Muscle Nerve, 2013, 47(6):916-21.
Liu et al., "Optogenetics 3.0", Cell, Apr. 2010, 141(1):22-24.
Llewellyn et al., "Orderly recruitment of motor units under optical control in vivo", Nat Med., 2010, 16(10):1161-5.
Loetterle, et al., "Cerebellar Stimulation: Pacing the Brain", American Journal of Nursing, 1975, vol. 75, No. 6, pp. 958-960.
Lonnerberg et al. "Regulatory Region in Choline Acetyltransferase Gene Directs Developmental and Tissue-Specific Expression in Transgenic mice", Proc. Natl. Acad. Sci. USA (1995), 92(9):4046-4050.
Louis et al. "Cloning and sequencing of the cellular-viral junctions from the human adenovirus type 5 transformed 293 cell line," Virology, 1997, vol. 233, pp. 423-429.
Luecke, et al. "Structural Changes in Bacteriorhodopsin During Ion Transport at 2 Angstrom Resolution," Science, 1999, vol. 286, pp. 255-260.
Luo, et al.; "Synthetic DNA delivery systems"; Nature Biotechnology; vol. 18, pp. 33-37 (Jan. 2000).
Lyznik, et al. "FLP-mediated recombination of FRT sites in the maize genome," Nucleic Acids Research , 1996, vol. 24, No. 19: pp. 3784-3789.
Ma et al. "Role of ER Export Signals in Controlling Surface Potassium Channel Numbers," Science, 2001, vol. 291, pp. 316-319.
Maestripieri, et al.; "A modest proposal: displacement activities as an indicator of emotions in primates"; Anim. Behay.; vol. 44, pp. 967-979 (1992).
Malin et al., "Involvement of the rostral anterior cingulate cortex in consolidation of inhibitory avoidance memory: Interaction with the basolateral amygdala", Neurobiol Learn Mem., Feb. 2007, 87(2):295-302.
Mancuso et al., "Optogenetic probing of functional brain circuitry", Experimental Physiology, 2010, vol. 96.1, pp. 26-33.
Mann et at. "Perisomatic Feedback Inhibition Underlies Cholinergically Induced Fast Network Oscillations in the Rat Hippocampus in Vitro," Neuron, 2005, vol. 45, 2005, pp. 105-117.
Mann; "Synapses"; The Nervous System in Action; Chapter 13, http://michaeldmann.net/mann13.html (downloaded Apr. 2014).
Marin, et al., The Amino Terminus of the Fourth Cytoplasmic Loop of Rhodopsin Modulates Rhodopsin-Transduction Interaction, The Journal of Biological Chemistry, 2000, vol. 275, pp. 1930-1936.
Masaki, et al.; "β2-Adrenergic Receptor Regulation of the Cardiac L-Type Ca2+ Channel Coexpressed in a Fibroblast Cell Line"; Receptor; vol. 5, pp. 219-231 (1996).
Mattis et al., "Principles for applying optogenetic tools derived from direct comparative analysis of microbial opsins", Nat Methods, 2011, 9(2):159-72.
Mattson, "Apoptosis in Neurodegenerative Disorders", Nature Reviews, 2000, vol. 1: pp. 120-129.
Mayberg et al. "Deep Brain Stimulation for Treatment-Resistant Depression," Focus, 2008, vol. VI, No. 1, pp. 143-154.
Mayford et al., "Control of memory formation through regulated expression of CaMKII transgene", Science, Dec. 1996, 274(5293):1678-1683.
McAllister, "Cellular and Molecular Mechanisms of Dendrite Growth", 2000, Cereb Cortex, vol. 10, No. 10, pp. 963-973.
McKnight "Functional relationships between transcriptional control signals of the thymidine kinase gene of herpes simplex virus", Cell, 1982, vol. 31 pp. 355-365.
Melyan, Z., et al. "Addition of human melanopsin renders mammalian cells Photoresponsive", Nature, 2005, vol. 433: pp. 741-745.
Mermelstein, et al. "Critical Dependence of cAMP Response Element-Binding Protein Phosphorylation on L-Type Calcium Channels Supports a Selective Response to EPSPs in Preference to Action Potentials", The Journal of Neuroscience, 2000, vol. 20, No. 1, pp. 266-273.
Meyer, et al. "High density interconnects and flexible hybrid assemblies for active biomedical implants," IEEE Transactions on Advanced Packaging , 2001, vol. 24, No. 3, pp. 366-372.
Milella et al. "Opposite roles of dopamine and orexin in quinpirole-induced excessive drinking: a rat model of psychotic polydipsia" Psychopharmacology, 2010, 211:355-366.
Monje et al., "Irradiation Induces Neural Precursor-Cell Dysfunction", Natural Medicine, 2002, vol. 8, No. 9, pp. 955-962.
Morelli et al., "Neuronal and glial cell type-specific promoters within adenovirus recombinants restrict the expression of the apoptosis-inducing molecule Fas ligand to predetermined brain cell types, and abolish peripheral liver toxicity", Journal of General Virology, 1999, 80:571-583.
Mortensen et al. "Selection of Transfected Mammalian Cells," Supplement 86, Current Protocols in Molecular Biology, 1997, 9.5.1-09.5.19.
Mourot et al., "Rapid Optical Control of Nociception with an Ion Channel Photoswitch", Nat Methods, 2012, 9(4):396-402.
Mueller, et al.; "Clinical Gene Therapy Using Recombinant Adeno-Associated Virus Vectors"; Gene Therapy; vol. 15, pp. 858-863 (2008).
Mullins et al., "Expression of the DBA/2J Ren-2 gene in the adrenal gland of transgenic mice", EMBO, 1989, vol. 8, pp. 4065-4072.
Mullins et al., "Fulminant hypertension in transgenic rats harbouring the mouse Ren-2 gene", Nature, 1990, vol. 344, pp. 541-544.
Nacher, et al. "NMDA receptor antagonist treatment increases the production of new neurons in the aged rat hippocampus", Neurobiology of Aging, 2003,vol. 24, No. 2: pp. 273-284.

(56) References Cited

OTHER PUBLICATIONS

Nagel et al."Functional Expression of Bacteriorhodopsin in Oocytes Allows Direct Measurement of Voltage Dependence of Light Induced H+ Pumping," FEBS Letters, 1995, vol. 377, pp. 263-266.

Nagel, et al. "Channelrhodopsin-I: a light-gated proton channel in green algae", Science, 2002, vol. 296: pp. 2395-2398.

Nagel, et al. "Channelrhodopsin-2, a directly light-gated cation-selective membrane channel", PNAS, 2003, vol. 100, No. 24: pp. 13940-13945.

Nakagami, et al. "Optical Recording of Trisynaptic Pathway in Rat Hippocampal Slices with a Voltage-Sensitive Dye" Neuroscience, 1997, vol. 81, No. 1, pp. 1-8.

Naqvi, et al. "Damage to the insula disrupts addiction to cigarette smoking," Science; 2007, vol. 315 pp. 531-534.

Natochin, et al. "Probing rhodopsin-transducin interaction using Drosophila Rh1-bovine rhodopsin chimeras," Vision Res., 2006, vol. 46, No. 27: pp. 4575-4581.

Nelson, et al.; "Non-Human Primates: Model Animals for Developmental Psychopathology"; Neuropsychopharmacology; vol. 34, No. 1, pp. 90-105 (Jan. 2009).

Nieh et al., "Optogenetic dissection of neural circuits underlying emotional valence and motivated behaviors", Brain Research, E-pub 2012, 1511:73-92.

Nirenberg, et al. "The Light Response of Retinal Ganglion Cells is Truncated by a Displaced Amacrine Circuit", Neuron, 1997, vol. 18: pp. 637-650.

No Authors Listed; "Two bright new faces in gene therapy," Nature Biotechnology, 1996, vol. 14: p. 556.

Nonet, "Visualization of synaptic specializations in live C. elegans with synaptic vesicle protein-GFP fusions", J. Neurosci. Methods, 1999, 89:33-40.

Nunes-Duby, et al. "Similarities and differences among 105 members of the Int family of site-specific recombinases", Nucleic Acids Research, 1998, vol. 26, No. 2: pp. 391-406.

O'Gorman et al. "Recombinase-mediated gene activation and site-specific integration in mammalian cells", Science, 1991, 251(4999): pp. 1351-1355.

Olivares (2001) "Phage R4 integrase mediates site-specific integration in human cells", Gene, 2001, vol. 278, pp. 167-176.

Ory, et al. "A stable human-derived packaging cell line for production of high titer retrovirus/vesicular stomatitis virus G pseudotypes," PNAS, 1996, vol. 93: pp. 11400-11406.

Packer, et al.; "Targeting Neurons and Photons for Optogenetics"; Nature Neuroscience; vol. 16, No. 7, pp. 805-815 (Jul. 2013).

Palmer et al., "Fibroblast Growth Factor-2 Activates a Latent Neurogenic Program in Neural Stem Cells from Diverse Regions of the Adult CNS", The Journal of Neuroscience, 1999, vol. 19, pp. 8487-8497.

Palmer et al., "The Adult Rat Hippocampus Contains Primordial Neural Stem Cells", Molecular and Cellular Neuroscience, 1997, vol. 8, pp. 389-404.

Palu, et al.; "In pursuit of new developments for gene therapy of human diseases"; Journal of Biotechnology; vol. 68, pp. 1-13 (1999).

Pan et al. "Functional Expression of a Directly Light-Gated Membrane Channel in Mammalian Retinal Neurons: A Potential Strategy for Restoring Light Sensitivity to the Retina After Photoreceptor Degeneration"; Investigative Opthalmology & Visual Science, 2005, 46 E-Abstract 4631. Abstract only.

Panda, et al. "Illumination of the Melanopsin Signaling Pathway", Science, 2005, vol. 307: pp. 600-604.

Pandya, et al. "Where in the Brain Is Depression?"; Curr. Psychiatry Rep.; vol. 14, pp. 634-642 (2012).

Pape, et al., "Plastic Synaptic Networks of the Amygdala for the Acquisition, Expression, and Extinction of Conditioned Fear", 2010, Physiol Rev, vol. 90, pp. 419-463.

Paulhe et al. "Specific Endoplasmic Reticulum Export Signal Drives Transport of Stem Cell Factor (Kitl) to the Cell Surface," The Journal of Biological Chemistry, 2004, vol. 279, No. 53, p. 55545-55555.

Pear "Transient Transfection Methods for Preparation of High-Titer Retroviral Supernatants" Supplement 68, Current Protocols in Molecular Biology, 1996, 9.1 1 .1-9.1 1 .1 8.

Peralvarez-Marin et al., "Inter-helical hydrogen bonds are essential elements for intra-protein signal transduction: The role of Asp115 in bacteriorhodopsin transport function", J. Mol. Biol., 2007, vol. 368, pp. 666-676.

Peterlin, et al. "Optical probing of neuronal circuits with calcium indicators," PNAS, 2000, vol. 97, No. 7: pp. 3619-3624.

Petersen et al. "Spatiotemporal Dynamics of Sensory Responses in Layer 2/3 of Rat Barrel Cortex Measured In Vivo by Voltage-Sensitive Dye Imaging Combined with Whole-Cell Voltage Recordings and Neuron Reconstructions," The Journal of Neuroscience, 2003, vol. 23, No. 3, pp. 1298-1309.

Petersen, et al.; "Functionally Independent Columns of Rat Somatosensory Barrel Cortex Revealed with Voltage-Sensitive Dye Imaging"; J. of Neuroscience; vol. 21, No. 21, pp. 8435-8446 (Nov. 1, 2011).

Petrecca, et al. "Localization and Enhanced Current Density of the Kv4.2 Potassium Channel by Interaction with the Actin-Binding Protein Filamin," The Journal of Neuroscience, 2000, vol. 20, No. 23, pp. 8736-8744.

Pettit, et al. "Local Excitatory Circuits in the Intermediate Gray Layer of the Superior Colliculus", J Neurophysiol., 1999, vol. 81, No. 3: pp. 1424-1427.

Pfeifer, et al.; "Gene Therapy: Promises and Problems"; Annu. Rev. Genomics Hum. Genet.; vol. 2, pp. 177-211 (2001).

Pinkham et al., "Neural bases for impaired social cognition in schizophrenia and autism spectrum disorders", Schizophrenia Research, 2008, vol. 99, pp. 164-175.

Potter, "Transfection by Electroporation." Supplement 62, Current Protocols in Molecular Biology, 1996, 9.3.1-9.3.6.

Pouille, et al. "Routing of spike series by dynamic circuits in the hippocampus", Nature, 2004, vol. 429: pp. 717-723.

Powell, et al.; "Schizophrenia-Relevant Behavioral Testing in Rodent Models: A Uniquely Human Disorder?"; Biol. Psychiatry; vol. 59, pp. 1198-1207 (2006).

Qiu et al. " Induction of photosensitivity by heterologous expression of melanopsin", Nature, 2005, vol. 433: pp. 745-749.

Racaniello; "How many viruses on Earth?"; Virology Blog; 6 pages; http://www.virology.ws/2013/09/06/how-many-viruses-on-earth/ (Sep. 6, 2013).

Ramalho, et al.; "Mouse genetic corneal disease resulting from transgenic insertional mutagenesis"; Br. J. Ophthalmol.; vol. 88, No. 3, pp. 428-432 (Mar. 2004).

Rammes, et al., "Synaptic Plasticity in the Basolateral Amygdala in Transgenic Mice Expressing Dominant-Negative cAMP Response Element-binding Protein (CREB) in Forebrain", Eur J. Neurosci, 2000, vol. 12, No. 7, pp. 2534-2546.

Randic, et al. "Long-term Potentiation and Long-term Depression of Primary Afferent Neurotransmission in the Rat Spinal Cord", 1993, Journal of Neuroscience, vol. 13, No. 12, pp. 5228-5241.

Raper, et al.; "Fatal systemic inflammatory response syndrome in a ornithine transcarbamylase deficient patient following adenoviral gene transfer." Mol. Genet. Metab.; vol. 80, No. 1-2, pp. 148-158 (Sep.-Oct. 2003).

Rathnasingham et al., "Characterization of implantable microfabricated fluid delivery devices," IEEE Transactions on Biomedical Engineering, 2004, vol. 51, No. 1: pp. 138-145.

Rein, et al., "The Optogenetic (r)evolution", Mol. Genet. Genomics, 2012, vol. 287, No. 2, pp. 95-109.

Remy, et al., "Depression in Parkinson's Disease: Loss of Dopamine and Noradrenaline Innervation in the Limbic System", Brain, 2005, vol. 128 (Pt 6), pp. 1314-1322.

Ristevski; "Making Better Transgenic Models: Conditional, Temporal, and Spatial Approaches"; Molecular Biotechnology; vol. 29, No. 2, pp. 153-163 (Feb. 2005).

Ritter, et al., "Monitoring Light-induced Structural Changes of Channelrhodopsin-2 by UV-Visible and Fourier Transform Infared Spectroscopy", 2008, The Journal of Biological Chemistry, vol. 283, No. 50, pp. 35033-35041.

(56) References Cited

OTHER PUBLICATIONS

Rivera et al., "BDNF-Induced TrkB Activation Down-Regulates the K+-Cl-cotransporter KCC2 and Impairs Neuronal Cl-Extrusion", The Journal of Cell Biology, 2002, vol. 159: pp. 747-752.
Rogers, et al.; "Effects of ventral and dorsal CA1 subregional lesions on trace fear conditioning"; Neurobiology of Learning and Memory; vol. 86, pp. 72-81 (2006).
Rosenkranz, et al. "The prefrontal cortex regulates lateral amygdala neuronal plasticity and responses to previously conditioned stimuli", J. Neurosci., 2003, vol. 23, No. 35: pp. 11054-11064.
Rousche, et al., "Flexible polyimide-based intracortical electrode arrays with bioactive capability," IEEE Transactions on Biomedical Engineering, 2001, vol. 48, No. 3, pp. 361-371.
Rubinson et at. "A lentivirus-based system to functionally silence genes in primary mammalian cells, stem cells and transgenic mice by RNA interference," Nature Genetics, 2003, vol. 33, p. 401-406.
Rudiger et at. "Specific arginine and threonine residues control anion binding and transport in the light-driven chloride pump halorhodopsin," The EMBO Journal, 1997, vol. 16, No. 13, pp. 3813-3821.
Sajdyk, et al., "Excitatory Amino Acid Receptors in the Basolateral Amygdala Regulate Anxiety Responses in the Social Interaction Test", Brain Research, 1997, vol. 764, pp. 262-264.
Salzman, et al."Cortical microstimulation influences perceptual judgements of motion direction", Nature, 1990, vol. 346, pp. 174-177.
Samuelson; "Post-traumatic stress disorder and declarative memory functioning: a review"; Dialogues in Clinical Neuroscience; vol. 13, No. 3, pp. 346-351 (2011).
Santana et al., "Can Zebrafish Be Used as Animal Model to Study Alzheimer's Disease?" Am. J. Neurodegener. Dis. (2012), 1(1):32-48.
Sato et al. "Role of Anion-binding Sites in cytoplasmic and extracellular channels of *Natronomonas pharaonis* halorhodopsin," Biochemistry, 2005. vol. 44, pp. 4775-4784.
Sauer "Site-specific recombination: developments and applications," Current Opinion in Biotechnology, 1994, vol. 5, No. 5: pp. 521-527.
Schester, et al.; "Biodistribution of adeno-associated virus serotype 9 (AAV9) vector after intrathecal and intravenous delivery in mouse"; Frontiers in Neuroanatomy; vol. 8, Article 42, pp. 1-41 (Jun. 10, 2014).
Schiff, et al. "Behavioral improvements with thalamic stimulation after severe traumatic brain injury," Nature, 2007, vol. 448, pp. 600-604.
Schlaepfer et al. "Deep Brain stimulation to Reward Circuitry Alleviates Anhedonia in Refractory Major Depresion," Neuropsychopharmacology, 2008,vol. 33, pp. 368-377.
Schroll et al., "Light-induced activation of distinct modulatory neurons triggers appetitive or aversive learning in *Drosophila larvae*", Current Biology, Sep. 2006, 16(17):1741-1747.
Sclimenti, et al. "Directed evolution of a recombinase for improved genomic integration at a native human sequence," Nucleic Acids Research, 2001, vol. 29, No. 24: pp. 5044-5051.
Sheikh et al., "Neurodegenerative Diseases: Multifactorial Conformational Diseases and Their Therapeutic Interventions", Journal of Neurodegenerative Diseases (2013), Article ID 563481:1-8.
Shepherd, et al. "Circuit Analysis of Experience-Dependent Plasticity in the Developing Rat Barrel Cortex", Neuron, 2003, vol. 38: pp. 277-289.
Shibasaki et al., "Effects of body temperature on neural activity in the hippocampus: Regulation of resting membrane potentials by transient receptor potential vanilloid 4," The Journal of Neuroscience, 2007, 27(7):1566-1575.
Shimizu, et al.; "NMDA Receptor-Dependent Synaptic Reinforcement as a Crucial Process for Memory Consolidation"; Science; vol. 290, pp. 1170-1174 (Nov. 10, 2000).
Shoji, et al.; "Current Status of Delivery Systems to Improve Target Efficacy of Oligonucleotides"; Current Pharmaceutical Design; vol. 10, pp. 785-796 (2004).
Sigmund; "Viewpoint: Are Studies in Genetically Altered Mice Out of Control?"; Arterioscler Thromb Vasc Biol.; vol. 20, No, 6, pp. 1425-1429 (Jun. 2000).
Silver, et al. "Amino terminus of the yeast GAL4 gene product is sufficient for nuclear localization" PNAS, 1984, vol. 81, No. 19: pp. 5951-5955.
Simmons et al. "Localization and function of NK3 subtype Tachykinin receptors of layer pyramidal neurons of the guinea-pig medial prefrontal cortex", Neuroscience, 2008, vol. 156, No. 4: pp. 987-994.
Sineshchekov et al., "Two Rhodopsins Mediate Phototaxis to Low and High Intensity Light in Chlamydomas Reinhardtil", PNAS, 2002, vol. 99, No. 13, pp. 8689-94.
Sineshchekov et al.; "Intramolecular Proton Transfer in Channelrhodopsins"; Biophysical Journal; vol. 104, No. 4, pp. 807-817 (Feb. 2013).
Singer et al. "Elevated Intrasynaptic Dopamine Release in Tourette's Syndrome Measured by Pet," American Journal of Psychiatry, 2002, vol. 159: pp. 1329-1336.
Singer; "Light Switch for Bladder Control"; Technology Review; pp. 1-2 (Sep. 14, 2009).
Skolnick, et al.; "From genes to protein structure and function: novel applications of computational approaches in the genomic era"; Trends Biotechnol; vol. 18, No. 1, pp. 34-39 (Jan. 2000).
Slamovits et al., "A bacterial proteorhodopsin proton pump in marie eukaryotes", Nature Comm, 2011, 2:183.
Slimko et al., "Selective Electrical Silencing of Mammalian Neurons In Vitro by the use of Invertebrate Ligand-Gated Chloride Channels", The Journal of Neuroscience, 2002, vol. 22, No. 17: pp. 7373-7379.
Smith et al. "Diversity in the serine recombinases", Molecular Microbiology, 2002, vol. 44, No. 2: pp. 299-307.
Smith, et al.; "Proton binding sites involved in the activation of acid-sensing ion channel ASIC2a"; Neuroscience Letters; vol. 426, pp. 12-17 (2007).
Sofuoglu, et al.; "Cholinergic Functioning in Stimulant Addiction: Implications for Medications Development"; CNS Drugs; vol. 23, No. 11, pp. 939-952 (Nov. 1, 2009).
Sohal et al., "Parvalbumin neurons and gamma rhythms enhance cortical circuit performance", Nature, 2009, vol. 459, No. 7247, pp. 698-702.
Song et al. "Differential Effect of TEA on Long-Term Synaptic Modification in Hippocampal CA1 and Dentate Gyrus in vitro." Neurobiology of Learning and Memory, 2001, vol. 76, No. 3, pp. 375-387.
Song, "Genes responsible for native depolarization-activated K+ currents in neurons," Neuroscience Research, 2002, vol. 42, pp. 7-14.
Soofiyani, et al.; "Gene Therapy, Early Promises, Subsequent Problems, and Recent Breakthroughs"; Advanced Pharmaceutical Bulletin; vol. 3, No. 2, pp. 249-255 (2013).
Stark, et al. "Catalysis by site-specific recombinases," Trends Genet., 1992, vol. 8, No. 12: pp. 432-439.
Steimer; "The biology of fear-and anxiety-related behaviors"; Dialogues in Clinical Neuroscience; vol. 4, No. 3, pp. 231-249 (Sep. 2002).
Stockklausner et al. "A sequence motif responsible for ER export and surface expression of Kir2.0 inward rectifier K+ channels," FEBS Letters, 2001, vol. 493, pp. 129-133.
Stoll, et al. "Phage TP901-I site-specific integrase functions in human cells," Journal of Bacteriology, 2002, vol. 184, No. 13: pp. 3657-3663.
Stonehouse, et al.; "Caffeine Regulates Neuronal Expression of the Dopamine 2 Receptor Gene"; Molecular Pharmacology; vol. 64, No. 6, pp. 1463-1473 (2003).
Stuber; "Dissecting the neural circuitry of addiction and psychiatric disease with optogenetics"; Neuropsychopharmacology; vol. 35, No. 1, pp. 341-342 (2010).

(56) References Cited

OTHER PUBLICATIONS

Suzuki et al., "Stable Transgene Expression from HSV Amplicon Vectors in the Brain: Potential Involvement of Immunoregulatory Signals", Molecular Therapy (2008), 16(10):1727-1736.

Swanson, "Lights, Opsins, Action! Optogenetics Brings Complex Neuronal Circuits into Sharper Focus", 2009,Tthe Dana Foundation, [URL: http://www.dana.org/news/features/detail.aspx?id= 24236], PDF File, pp. 1-3.

Swiss-Prot_Q2QCJ4, Opsin 1, 31 Oct. 2006, URL: http://www.ncbi.nlm.nig.gov/protein/QCQCJ4.

Takahashi, et al."Diversion of the Sign of Phototaxis in a *Chlamydomonas reinhardtii* Mutant Incorporated with Retinal and Its Analogs," FEBS Letters, 1992, vol. 314, No. 3, pp. 275-279.

Takahashi, et al., "Induction of Pluripotent Stem Cells from Mouse Embryonic and Adult Fibroblast Cultures by Defined Factors", 2006, Cell, vol. 126, pp. 663-676.

Tam, B. et al., "Identification of an Outer Segment Targeting Signal in the COOH Terminus of Rhodopsin Using Transgenic *Xenopus laevis*", The Journal of Cell Biology, 2000, vol. 151, No. 7, pp. 1369-1380.

Tamai, "Progress in Pathogenesis and Therapeutic Research in Retinitis Pigmentosa and Age Related Macular Degeneration", Nippon Ganka Gakkai Zasshi, Dec. 2004, 108(12):750-769.

Tatarkiewicz, et al. "Reversal of Hyperglycemia in Mice After Subcutaneous Transplantation of Macroencapsulated Islets", Transplantation, 1999, vol. 67, No. 5: pp. 665-671.

Taurog et al., "HLA-B27 in inbred and non-inbred transgenic mice", J. Immunol., 1988, vol. 141, pp. 4020-4023.

Thomas et al., "Progress and Problems with the Use of Viral Vectors for Gene", Nat. Rev. Genet. (2003), 4(5):346-358.

Tomita, et al.; "Visual Properties of Transgenic Rats Harboring the Channelrhodopsin-2 Gene Regulated by the Thy-1.2 Promoter"; PLoS One; vol. 4, No. 11, 13 pages (Nov. 2009).

Tennesen, et al., "Optogenetic Control of Epileptiform Activity", PNAS, 2009, vol. 106, No. 29, pp. 12162-12167.

Tottene et al., "Familial Hemiplegic Migraine Mutations Increase $Ca^{2+}$Influx Through Single Human $Ca_v2.1$ Current Density in Neurons", PNAS USA, 2002, vol. 99, No. 20: pp. 13284-13289.

Towne et al., "Efficient transduction of non-human primate motor neurons after intramuscular delivery of recombinant AAV serotype 6", Gene Ther., 2010, 17(1):141-6.

Towne et al., "Optogenetic control of targeted peripheral axons in freely moving animals", PLoS One, 2013, 8(8):e72691.

Towne et al., "Recombinant adeno-associated virus serotype 6 (rAAV2/6)-mediated gene transfer to nociceptive neurons through different routes of delivery", Mol Pain, 2009, 5:52.

Tsai, et al., "Phasic Firing in Dopaminergic Neurons in Sufficient for Behavioral Conditioning", Science, 2009, vol. 324, pp. 1080-1084.

Tsau et al. "Distributed Aspects of the Response to Siphon Touch in Aplysia: Spread of Stimulus Information and Cross-Correlation Analysis," The Journal of Neuroscience, 1994, vol. 14, No. 7, pp. 4167-4184.

Tsuchida; "Nervous Control of Micturition"; The Japanese Journal of Urology; vol. 80, No. 9, pp. 1257-1277 (1989).

Tye et. al., "Amygdala circuitry mediating reversible and bidirectional control of anxiety", Nature, 2011, vol. 471(7338): pp. 358-362.

Tye et. al., Supplementary Materials: "Amygdala circuitry mediating reversible and bidirectional control of anxiety,", Nature, 2011, vol. 471(7338): pp. 358-362.

Tye, et al. "Optogenetic investigation of neural circuits underlyding brain disease in animal models," Nature Reviews Neuroscience (Mar. 2012), 13(4):251-266.

Ulmanen, et al. "Transcription and translation of foreign genes in Bacillus subtilis by the aid of a secretion vector," Journal of Bacteriology, 1985, vol. 162, No. 1: pp. 176-182.

Uniprot Accession No. P02945, integrated into the database on Jul. 21, 1986.

Van Der Linden, "Functional brain imaging and pharmacotherapy in social phobia: single photon emission computed tomography before and after Treatment with the selective serotonin reuptake inhibitor citalopram," Prog Neuro-psychopharmacol Biol Psychiatry, 2000, vol. 24, No. 3: pp. 419-38.

Vanin, et al. "Development of high-titer retroviral producer cell lines by using Cre-mediated recombination," Journal of Virology, 1997, vol. 71, No. 10: pp. 7820-7826.

Varo et al.,"Light-Driven Chloride Ion Transport by Halorhodopsin from Natronobacterium pharaonis. 2. Chloride Release and Uptake, Protein Conformation Change, and Thermodynamics", Biochemistry (1995), 34(44):14500-14507.

Verma, et al.; "Gene therapy—promises, problems and prospects"; Nature; vol. 389, pp. 239-242 (Sep. 1997).

Vetter, et al. "Development of a Microscale Implantable Neural Interface (MINI) Probe System," Proceedings of the 2005 IEEE, Engineering in Medicine and Biology 27th Annual Conference, Shanghai, China, Sep. 1-4, 2005.

Wagner, "Noninvasive Human Brain Stimulation", Annual Rev. Biomed. Eng. 2007. 9:I9.1-19.39.

Wall, "Transgenic livestock: Progress and prospects for the future", Theriogenology, 1996, vol. 45, pp. 57-68.

Wang, et al. "Direct-current Nanogenerator Driven By Ultrasonic Waves," Science, 2007, vol. 316, pp. 102-105.

Wang, et al., "High-speed mapping of synaptic connectivity using photostimulation in Channelrhodopsin-2 transgenic mice", PNAS, 2007, vol. 104, No. 19, pp. 8143-8148.

Wang, et al., "Molecular Determinants Differentiating Photocurrent Properties of Two Channelrhodopsins from Chlamydomonas", 2009, The Journal of Biological Chemistry, vol. 284, No. 9, pp. 5685-5696.

Wang, et al., "Mrgprd-Expressing Polymodal Nociceptive Neurons Innervate Most Known Classes of Substantia Gelatinosa Neurons", J Neurosci, 2009, 29(42):13202-13209.

Wang, et al.; "Laser-evoked synaptic transmission in cultured hippocampal neurons expressing channelrhodopsin-2 delivered by adeno-associated virus"; Journal of Neuroscience Methods; vol. 183, pp. 165-175 (2009).

Wang, et al.; "Simultaneous phase and size control of upconversion nanocrystals through lanthanide doping"; Nature; vol. 463, No. 7284, pp. 1061-1065 (Feb. 25, 2010).

Ward, et al. "Construction and characterisation of a series of multi-copy promoter-probe plasmid vectors for *Streptomyces* using the aminoglycoside phosphotransferase gene from Tn5 as indicator", 1986, Mol. Gen. Genet., vol. 203: pp. 468-478.

Watson, et al. "Targeted transduction patterns in the mouse brain by lentivirus vectors pseudotyped with VSV, Ebola, Mokola, LCMV, or MuLV envelope proteins," Molecular Therapy, 2002, vol. 5, No. 5, pp. 528-537.

Weick et al. "Interactions with PDZ Proteins Are Required for L-Type Calcium Channels to Activate cAMP Response Element-Binding Protein-Dependent Gene Expression," The Journal of Neuroscience, 2003, vol. 23, No. 8, pp. 3446-3456.

Weiss, et al.; "Galanin: A Significant Role in Depression?"; Annals New York Academy of Sciences; vol. 863, No. 1, pp. 364-382 (1998).

Wells et al. "Application of Infrared light for in vivo neural stimulation," Journal of Biomedical Optics, 2005, vol. 10(6), pp. 064003-1-064003-12.

Williams et al., "From optogenetic technologies to neuromodulation therapies", Sci Transl Med., 2013, 5(177):177.

Winter, et al.; "Lesions of dopaminergic neurons in the substantia nigra pars compacta and in the ventral tegmental area enhance depressive-like behavior in rats"; Behavioural Brain Research; vol. 184, pp. 133-141 (2007).

Witten et. al., "Cholinergic Interneurons Control Local Circuit Activity and Cocaine Conditioning", Science, 2010, vol. 330, No. 6011: pp. 1677-1681.

Witten et. al., Supporting Online Material for: "Cholinergic Interneurons Control Local Circuit Activity and Cocaine Conditioning", Science, 2010, vol. 330: 17 pages.

Witten, et al.; "Cholinergic interneurons of the nucleus accumbens control local circuit activity and reward behavior"; Society for Neuroscience Abstract Viewer and Itinerary Planner & 40th Annual Meeting of the Society-for-Neuroscience; vol. 40, 2 pages (2010).

(56) References Cited

OTHER PUBLICATIONS

Written opinion of PCT Application No. PCT/US2011/059383 (dated May 9, 2012).
Xiong et al., "Interregional connectivity to primary motor cortex revealed using MRI resting state images", Hum Brain Mapp, 1999, 8(2-3):151-156.
Yajima, et al., "Effects of bromazepam on responses of mucosal blood flow of the gastrointestinal tract and the gastric motility to stimulation of the amygdala and hypothalamus in conscious cats"; Folia Pharmacol. Japon; vol. 83, No. 3, pp .237-248 (Mar. 1984). [English abstract translation].
Yamada, Shigeto; "Neurobiological Aspects of Anxiety Disorders"; The Japanese Journal of Psychiatry; vol. 8, No. 6, pp. 525-535 (Nov. 25, 2003). [Englsih translation of introduction and summary].
Yamazoe, et al. "Efficient generation of dopaminergic neurons from mouse embryonic stem cells enclosed in hollow fibers", Biomaterials, 2006, vol. 27, pp. 4871-4880.
Yan et al., "Cloning and Characterization of a Human β,β-Carotene-15, 15'-Dioxygenase that is Highly Expressed in the Retinal Pigment Epithelium", Genomics, 2001, vol. 72: pp. 193-202.
Yizhar et al., "Optogenetics in neural systems", Neuron Primer, vol. 71, No. 1, pp. 9-34 (Jul. 14, 2011).
Yizhar et. al., "Neocortical excitation/inhibition balance in information processing and social dysfunction", Nature, 2011, vol. 477, pp. 171-178; and Supplemental Materials; 41 pages.
Yoon, et al., "A micromachined silicon depth probe for multichannel neural recording," IEEE Transactions Biomedical Engineering, 2000, vol. 47, No. 8, pp. 1082-1087.
Yoshimura, et al. "Excitatory cortical neurons form fine-scale functional networks", Nature, 2005, vol. 433: pp. 868-873.
Zacharias et al. "Recent advances in technology for measuring and manipulating cell signals," Current Opinion in Neurobiology, 2000, vol. 10: pp. 416-421.
Zemelman, et al. "Selective Photostimulation of Genetically ChARGed Neurons", Neuron, 2002, vol. 33: pp. 15-22.
Zemelman, et al. "Photochemical gating of heterologous ion channels: Remote control over genetically designated populations of neurons", PNAS, 2003, vol. 100, No. 3: pp. 1352-1357.
Zeng, et al.; "Activation of acid-sensing ion channels by localized proton transient reveals their role in proton signaling"; Scientific Reports; vol. 5, 14 pages (Sep. 15, 2015).
Zeng, et al.; "Proton production, regulation and pathophysiological roles in the mammalian brain"; Neuroscience Bulletin; vol. 28, No. 1, pp. 1-13 (Feb. 1, 2012).
Zhang "Multimodal fast optical interrogation of neural circuitry," Nature, 2007, vol. 446, pp. 633-641.
Zhang, et al. "Channelrhodopsin-2 and optical control of excitable cells," Nature Methods,2006, vol. 3, No. 10, pp. 785-792.
Zhang, et al. "Red-Shifted Optogenetic Excitation: a Tool for Fast Neural Control Derived from *Volvox carteri*", Nature Neurosciences, 2008,vol. 11, No. 6, pp. 631-633.
Zhang, et al., "The Microbial Opsin Family of Optogenetic Tools", Cell, 2011, vol. 147, No. 7, pp. 1146-1457.
Zhang, et al.; "Optogenetic interrogation of neural circuits: Technology for probing mammalian brain structures"; Nature Protocols; vol. 5, No. 3, pp. 439-456 (Feb. 18, 2010).
Zhao, et al., "Improved Expression of Halorhodopsin for Light-Induced Silencing of Neuronal Activity", Brain Cell Biology, 2008, vol. 36 (1-4), pp. 141-154.
Zrenner, E., "Will Retinal Implants Restore Vision?" Science, 2002, vol. 295, No. 5557, pp. 1022-1025.
Zufferey, et al. "Self-Inactivating Lentivirus Vector for Safe and Efficient In Vivo Gene Delivery", Journal of Virology, 1998, vol. 72, No. 12, pp. 9873-9880.
Sharma, et al. "Evolution of rhodosin ion pump in haloarchaea," BMC Evolutionary Biology, 2007, vol. 7, No. 79: pp. 1-13.
Vodusek, et al, "Anatomy and Neurocontrol of the Pelvic Floor," Digestiom, vol. 69, pp. 87-92.

* cited by examiner

FIG. 4

| State ID | Input polarization | V0 | V1 | V2 | V3 | V4 | Output polarization | Output action |
|---|---|---|---|---|---|---|---|---|
| 1 | RHC | OFF | ON | OFF | OFF | ON | RHC | $+\theta_x, +\theta_y$ |
| 2 | RHC | OFF | ON | OFF | ON | OFF | RHC | $+\theta_x, -\theta_y$ |
| 3 | RHC | OFF | ON | OFF | ON | ON | LHC | $+\theta_x, 0$ |
| 4 | RHC | OFF | ON | ON | ON | OFF | LHC | $0, +\theta_y$ |
| 5 | RHC | OFF | ON | ON | OFF | ON | LHC | $0, -\theta_y$ |
| 6 | RHC | OFF | ON | ON | OFF | ON | RHC | $0, 0$ |
| 7 | RHC | OFF | OFF | ON | OFF | OFF | RHC | $-\theta_x, +\theta_y$ |
| 8 | RHC | OFF | OFF | ON | ON | ON | RHC | $-\theta_x, -\theta_y$ |
| 9 | RHC | OFF | OFF | ON | ON | ON | LHC | $-\theta_x, 0$ |
| 10 | RHC | ON | OFF | ON | ON | ON | RHC | $+\theta_x, 0$ |

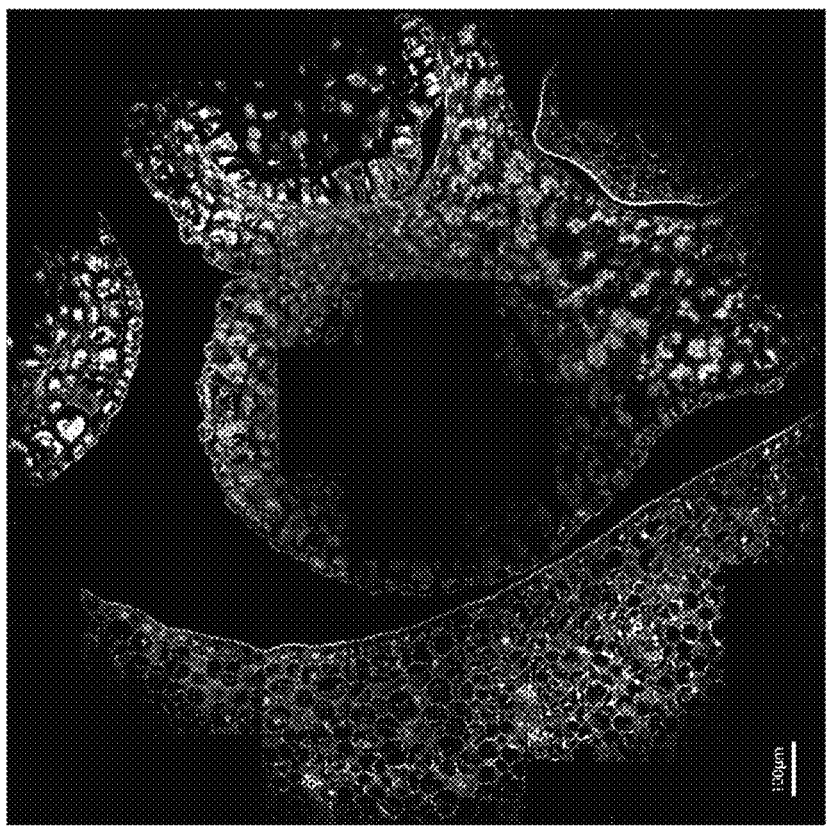
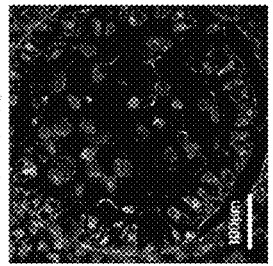
FIG. 8

MODULAR, ELECTRO-OPTICAL DEVICE FOR INCREASING THE IMAGING FIELD OF VIEW USING TIME-SEQUENTIAL CAPTURE

CROSS-REFERENCE TO RELATED APPLICATIONS

This application claims priority pursuant to 35 U.S.C. § 119(e) to the filing date of U.S. Provisional Application No. 62/478,981, filed Mar. 30, 2017, the disclosure of which is incorporated herein by reference.

INTRODUCTION

Recent advances in microscopy have enabled visualization and analysis of a broad range of morphologic and dynamic features in a sample, with improved efficiency. However, common microscopes have fields-of-view (FOVs) less than a few millimeters due to the limitations imposed by optical aberrations. In many imaging systems, the FOV can be limited by either the available scanning angles of a raster-scanned beam which samples the object-space and/or scene, or the size of the imaging detector. To increase the FOVs, additional lens components and design configurations are required to compensate for the aberrations, leading higher system costs and larger microscopes. In state-of-the-art commercialized systems, for instance, the samples are physically transported under a conventional microscope to increase the effective FOV, but this involves extended imaging times. Non-conventional microscopes can yield a FOV of up to 5 mm in diameter (Sofronview, N. J., et al (2016), or with some compromises up to 8 mm×10 mm (Tsai, P. S., et al (2015), "Ultra-large field-of-view two-photon microscopy," Optics Express, 23(11) pp. 13833-13847), but require a new dedicated microscope. Therefore, such FOV limitations have become a major bottleneck in microscopy. One can readily observe when comparing wide-field imaging results with those obtained by a raster-scanned multi-photon scanning image acquisition (which are commonly a smaller FOV) that the full capabilities of a microscope objective may frequently be left unmet. Accordingly, devices that can improve the FOV with minimal disruption to existing hardware are needed.

SUMMARY

The present disclosure provides optical image acquisition methods and devices for microscopy systems that enhance the FOV during image acquisition. According to aspects of the present disclosure, the methods and devices for enhancing the FOV of a sample during image acquisition in an optical imaging system include directing an incident electromagnetic field through a plurality of polarization-selective gratings. In some cases, the gratings are modulated via a directly applied electric field or indirectly via paired polarization modulating devices. In certain embodiments, each of the polarization-selective gratings is configured to apply a discrete amount of angular displacement to the incident electromagnetic field in a direction transverse or axial to the optical system's electromagnetic axis. Temporal sequencing through these available beam displacements results in an enhanced FOV or volume acquisition during image acquisition.

In certain aspects, the method is configured to direct an incident electromagnetic field through a plurality of polarization-selective gratings to acquire an image. The present disclosure also provides a device configured to attach with an optical imaging system, the device having a plurality of polarization-selective grating devices each configured to selectively apply a discrete amount of angular displacement to a directed incident electromagnetic field. This capability enables imaging of samples with enhanced FOVs with a high-frame rate.

In certain aspects, each of the polarization-selective gratings is configured to selectively apply a discrete amount of angular displacement to the incident electromagnetic field. In certain aspects, the discrete amount of angular displacement to the incident electromagnetic field is configured to pan an acquired image. In certain aspects, directing the incident electromagnetic field through the plurality of polarization-selective gratings results in an enhanced FOV during image acquisition. In some cases, the gratings are modulated via a directly applied electric field or indirectly via paired polarization modulating devices. In certain aspects, the field-of-view is enhanced by less than $2^N$, where N is the number of polarization-selective gratings, as compared with the FOV of imaging systems without the electrically-modulated polarization-selective grating device. In certain aspects, the plurality of polarization-selective gratings are arranged serially or otherwise known as sequentially.

In certain aspects, the polarization-selective gratings include a plurality of liquid-crystal polarization gratings. In such aspects, the plurality of liquid-crystal polarization gratings include a patterned birefringent liquid crystal. In other aspects, the plurality of polarization-selective gratings include a plurality of lithographically or optically patterned birefringent liquid-crystal plates. In such aspects, the plurality of lithographic plates includes a transparent substrate having a sub-wavelength feature on the lithographic plate. See e.g., Kim, J, et al. (2015), "*Fabrication of ideal geometric-phase holograms with arbitrary wavefronts*," Optica 2(11), pp. 958-964.

In certain aspects, the incident electromagnetic field modulated through the plurality of polarization-selective gratings results in a polarization incident for each independent polarization-selective grating. In certain aspects, the polarization incident upon each independent polarization-selective grating is directly modulated by a voltage across each the polarization-selective gratings or indirectly with a polarization modulating device.

In certain aspects, the plurality of polarization-selective gratings are electrically switchable. In such aspects, the polarization-selective gratings include a voltage controller. In some cases, the gratings are modulated via a directly applied electric field or indirectly via paired polarization modulating devices. In certain aspects, the polarization incident upon each independent polarization-selective grating is modulated by a variable waveplate, which includes a voltage controller.

In certain aspects, the device further comprises a variable wave-plate retarder. In certain aspects, the polarization incident upon each independent polarization-selective grating is indirectly modulated by a voltage across the variable wave-plate retarder. In certain aspects, the voltage across the variable wave-plate retarder is configured to alternate the incident polarization state upon each independent polarization-selective grating. In certain aspects, alternating the incident polarization state upon each independent polarization-selective grating comprises electrically switching each independent polarization-selective grating.

In certain aspects, a polarization incident upon each independent polarization-selective grating is modulated by:

a) a voltage across each the polarization-selective grating; b) a voltage across the variable wave-plate retarder; or c) a combination of a) and b)).

Aspects of the present disclosure further include a device configured to attach to an optical imaging system, the device having a plurality of polarization-selective gratings each configured to selectively apply a discrete amount of angular displacement to a directed incident electromagnetic field. In some cases, the gratings are modulated via a directly applied electric field or indirectly via paired polarization modulating devices. In certain aspects, the optical imaging system is a raster-scanned or a wide-field imaging acquisition system. In certain aspects, the raster-scanned image acquisition system includes a one-photon, a multi-photon, or a confocal imaging system. In certain aspects, the wide-field image acquisition system comprises a single lens reflex (SLR) camera, an upright microscope, or an inverted microscope. In yet other aspects, the wide-field image acquisition system includes a cell-phone camera.

In certain aspects, the plurality of polarization-selective gratings are positioned between an excitation source and an imaging lens of the optical imaging system. In some cases, the gratings are modulated via a directly applied electric field or indirectly via paired polarization modulating devices. An example of an embodiment where the plurality of polarization-selective gratings, modulated via a directly applied electric field or indirectly via paired polarization modulating devices, are positioned between an excitation source and an imaging lens of the optical imaging system is shown in FIG. 2A-B of the present application. In certain aspects, the plurality of polarization-selective gratings are positioned at or near the pupil plane of the imaging system. In certain aspects, the plurality of polarization-selective gratings are positioned between a tube lens and a wide-field camera of the wide-field optical imaging system. An example of an embodiment where the plurality of polarization-selective gratings are positioned between a tube lens and a wide-field camera of the wide-field optical imaging system is shown in FIG. 2C of the present application. In certain aspects, the plurality of polarization-selective gratings are positioned between an imaging lens and an image sensor of the cell-phone camera.

In certain aspects, the device includes a plurality of polarization-selective gratings each configured to selectively apply a discrete amount of angular displacement to a directed incident electromagnetic field. In certain aspects, the incident electromagnetic field is modulated through the plurality of polarization-selective gratings. In certain aspects, the incident electromagnetic field is modulated in a direction transverse or axial to the optical system's electromagnetic axis, where the modulation results in an enhanced FOV during image acquisition. In certain aspects, the discrete amount of angular displacement to the incident electromagnetic field is configured to pan an acquired image. In certain aspects, the image acquisition has at least one FOV. In yet other aspects, the image acquisition has a super-position of FOVs simultaneously acquired.

In certain aspects, the plurality of polarization-selective gratings are arranged serially. In certain aspects, the plurality of polarization-selective gratings includes a plurality of liquid-crystal polarization gratings. In certain aspects, the liquid-crystal polarization gratings include a patterned birefringent liquid crystal.

In yet other aspects, the plurality of polarization-selective gratings include a plurality of lithographic plates. In such aspects, the lithographic plates include a transparent substrate having a sub-wavelength feature on the lithographic plate Sub-wavelength features on lithographics plantes are known in the art and can be found in, for example, Kim, J, et al (2015), *"Fabrication of ideal geometric-phase holograms with arbitrary wavefronts,"* Optica 2(11), pp. 958-964 (2015). In some aspects, the lithographic plates including a transparent substrate having a sub-wavelength feature can be fabricated using techniques known in the art.

In certain aspects, each of the polarization-selective gratings is electrically switchable. In certain aspects, each of the polarization-selective gratings includes a voltage controller.

Aspects of the present disclosure further include an optical imaging system comprising: a light source; a plurality of polarization-selective gratings; a processor; and a non-transitory computer-readable memory medium comprising instructions that cause the processor to: a) electrically switch the polarization-selective gratings to displace the beam of light in a: i) first direction to capture a first image with a first field-of-view, ii) second direction to capture second image with a second field-of-view, iii) third direction to capture a third image with a third field-of-view, iv) fourth direction to capture a fourth image with a first field-of-view, or a combination thereof; and b) capture a panned, time-sequential composite image with a super-position of a combination of field-of-views as in step a). In certain aspects, the non-transitory computer-readable memory medium further comprises instructions that cause the processor to electrically switch the polarization-selective gratings to displace the beam of light in a fifth direction to capture fifth image with a second field-of-view, sixth direction to capture a sixth image with a third field-of-view, or a combination thereof. In certain aspects, the non-transitory computer-readable memory medium further comprises instructions that cause the processor to electrically switch the polarization-selective gratings to displace the beam of light in a: seventh direction to capture a seventh image with a first field-of-view, eighth direction to capture eighth image with a second field-of-view, ninth direction to capture a ninth image with a third field-of-view, tenth direction to capture a tenth image with a third field-of-view, or a combination thereof. In certain aspects, the optical imaging system further comprises a variable wave-plate retarder. In certain aspects, electrically switching the polarization-selective gratings is configured to produce a polarization incident upon each independent polarization-selective grating. In certain aspects, the polarization incident upon each independent polarization-selective grating is modulated by: a) a voltage across each the polarization-selective grating; b) a voltage across the variable wave-plate retarder; or c) a combination of a) and b)). In certain aspects, the voltage is applied across: a) a first polarization-selective grating; b) a second polarization-selective grating; c) a third polarization-selective grating; d) a fourth polarization-selective grating; or e) a combination thereof. In certain aspects, the voltage is not applied across: a) a first polarization-selective grating; b) a second polarization-selective grating; c) a third polarization-selective grating; d) a fourth polarization-selective grating; or e) a combination thereof.

Aspects of the present disclosure further include an optical imaging system comprising: a light source; a plurality of polarization-selective gratings; a processor; and a non-transitory computer-readable memory medium comprising instructions that cause the processor to: electrically switch the polarization-selective gratings to displace the beam of light in a: i) first angle to capture a first image with a first field-of-view, ii) second angle to capture second image with a second field-of-view, iii) third angle to capture a third image with a third field-of-view, iv) fourth angle to capture a fourth image with a fourth field-of-view or v) a combination thereof; and b) capture a panned, time-sequential composite image with a super-position of a combination of field-of-views as in step a). In certain aspects, the non-transitory computer-readable memory medium further comprises instructions that cause the processor to electrically switch the polarization-selective gratings to displace the beam of light in a: a) fifth angle to capture fifth image with a fifth field-of-view, b) sixth angle to capture a sixth image with a sixth field-of-view, or c) a combination thereof. In certain aspects, the non-transitory computer-readable memory medium further comprises instructions that cause the processor to electrically switch the polarization-selective gratings to displace the beam of light in a: a) seventh angle to capture a seventh image with a seventh field-of-view, b) eighth angle to capture eighth image with a eighth field-of-view, c) ninth angle to capture a ninth image with a ninth field-of-view, d) tenth angle to capture a tenth image with a tenth field-of-view, or e) a combination thereof. In certain aspects, the optical imaging system further comprises a variable wave-plate retarder. In certain aspects, electrically switching the polarization-selective gratings is configured to produce a polarization incident upon each independent polarization-selective grating. In certain aspects, the polarization incident upon each independent polarization-selective grating is modulated by: a) a voltage across each the polarization-selective grating; b) a voltage across the variable wave-plate retarder; or c) a combination of a) and b). In certain aspects, the voltage is applied across: a) a first polarization-selective grating; b) a second polarization-selective grating; c) a third polarization-selective grating; d) a fourth polarization-selective grating; or e) a combination thereof. In certain aspects, the voltage is not applied across: a) a first polarization-selective grating; b) a second polarization-selective grating; c) a third polarization-selective grating; d) a fourth polarization-selective grating; or e) a combination thereof.

Aspects of the present disclosure include an optical image acquisition method for capturing a panned composite image with an enhanced field-of-view, the method comprising: directing an incident electromagnetic field through a plurality of polarization-selective gratings; electrically switching the polarization-selective gratings to displace the beam of light at a: i) first angle to capture a first image with a first field-of-view, ii) second angle to capture second image with a second field-of-view, iii) third angle to capture a third image with a third field-of-view, iv) fourth angle to capture a fourth image with a fourth field-of-view, or v) a combination thereof; and capturing a panned, time-sequential composite image with a super-position of a combination of field-of-views. In certain aspects, electrically switching further comprises electrically switching the polarization-selective gratings to displace the beam of light at a: a) fifth angle to capture fifth image with a fifth field-of-view, b) sixth angle to capture a sixth image with a sixth field-of-view, or c) a combination thereof. In certain aspects, electrically switching further comprises electrically switching the polarization-selective gratings to displace the beam of light at a: a) seventh angle to capture a seventh image with a seventh field-of-view, b) eighth angle to capture eighth image with a eighth field-of-view, c) ninth angle to capture a ninth image with a ninth field-of-view, d) tenth angle to capture a tenth image with a tenth field-of-view, or e) a combination thereof. In certain aspects, electrically switching the polarization-selective gratings is configured to produce a polarization incident upon each independent polarization-selective grating. In certain aspects, the method further comprises modulating the polarization incident upon each independent polarization-selective grating by: a) a voltage across each the polarization-selective grating; b) a voltage across the variable wave-plate retarder; or c) a combination of a) and b). In certain aspects, the method further comprises applying a voltage across: a) a first polarization-selective grating; b) a second polarization-selective grating; c) a third polarization-selective grating; d) a fourth polarization-selective grating; or e) a combination thereof. In certain aspects, the voltage is not applied across: a) a first polarization-selective grating; b) a second polarization-selective grating; c) a third polarization-selective grating; d) a fourth polarization-selective grating; or e) a combination thereof.

Aspects of the present disclosure further include an optical image acquisition method for capturing a panned composite image with an enhanced field-of-view, the method comprising: directing an incident electromagnetic field through a plurality of polarization-selective gratings; electrically switching the polarization-selective gratings to displace the beam of light at a: i) first direction to capture a first image with a first field-of-view, ii) direction to capture second image with a second field-of-view, iii) direction to capture a third image with a third field-of-view, iv) direction to capture a fourth image with a fourth field-of-view, or v) a combination thereof; and capturing a panned, time-sequential composite image with a super-position of a combination of field-of-views. In certain aspects, electrically switching further comprises electrically switching the polarization-selective gratings to displace the beam of light at a: a) fifth direction to capture fifth image with a fifth field-of-view, b) sixth direction to capture a sixth image with a sixth field-of-view, or c) a combination thereof. In certain aspects, electrically switching further comprises electrically switching the polarization-selective gratings to displace the beam of light at a: a) seventh direction to capture a seventh image with a seventh field-of-view, b) eighth direction to capture eighth image with a eighth field-of-view, c) ninth direction to capture a ninth image with a ninth field-of-view, d) tenth direction to capture a tenth image with a tenth field-of-view, or e) a combination thereof.

These and other features will be apparent to the ordinarily skilled artisan upon reviewing the present disclosure.

BRIEF DESCRIPTION OF THE DRAWINGS

FIG. 4 provides a table listing the possible outputs from a serial combination of one voltage-controlled wave-plate (S0 in FIG. 3) and four electrically switched LCPGs (S1-S4 in FIG. 3) through a voltage controller, as depicted in FIG. 3 and according to embodiments of the present disclosure. Here, explicit combinations of when a voltage is applied (e.g. ON or OFF) are enumerated and the respective output state is reported in terms of polarization and the desired action of beam deviation (to pan the field-of-view). States 3 and 10 demonstrate that there can be multiple combinations which achieve the same action of beam deviation but with orthogonal polarization states.

FIG. 8 depicts a composite image showing the field-of-view of an Olympus microscope with a FOV of 480×480 um without integration of LCPGs, and an enhanced FOV using LCPGs integrated in an optical imaging system, according to embodiments of the present disclosure.

FIG. 9, panel B is a simulation imaging two micro-endoscopes placed within the field-of-view of the microscope. FIG. 9, panel C, illustrates how careful manipulation of the input polarization state can result in multiple, simultaneous output beams multiplexed from the polarization-sensitive grating device. These beams can then sample multiple areas under the microscope objective simultaneously.

DEFINITIONS

Figure 1:
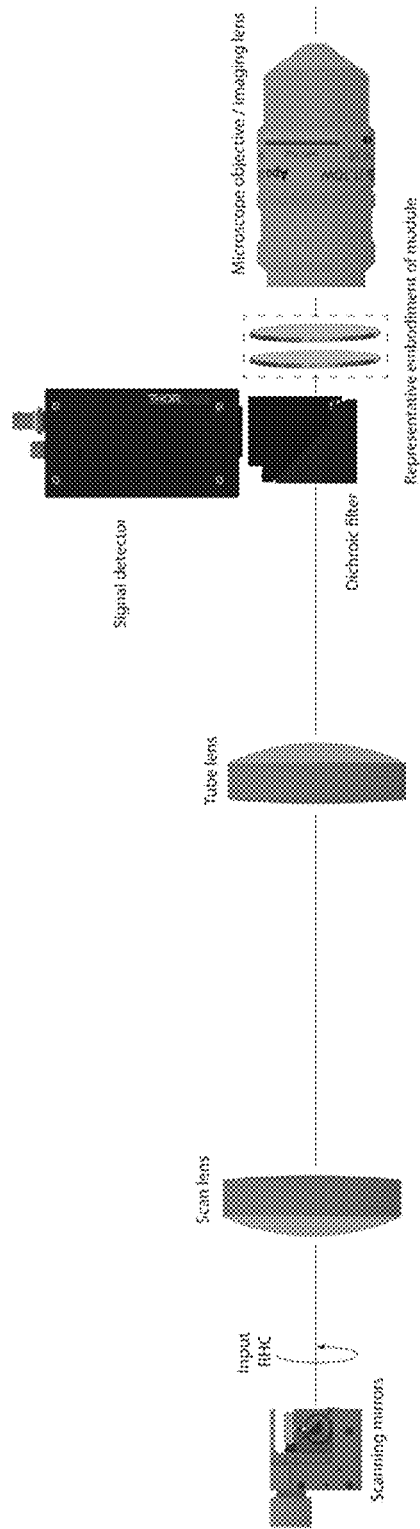
FIG. 1 depicts two LCPGs added to a raster scanned optical imaging system, located behind the microscope objective, where the incident illumination is circularly polarized (i.e. right-handed circular) that is raster scanned, according to embodiments of the present disclosure. Although the polarization is depicted here as circularly polarized, this is not exclusively the case. Implementation of arbitrary polarization states can be used advantageously (e.g. linearly or elliptical polarization states).

By 'angular displacement', as used herein, refers to the angle through which a ray of light deviates from a linear path. Angular displacement, as used herein, can be expressed in radians or degrees.

By "field-of-view", as used herein, refers to how much of a scene a user can simultaneously observe and thus, sets fundamental limits on the throughput of any task undertaken by the user.

By "birefringent", as used herein, refers to a material that exhibits two different indices of refraction for orthogonal polarization states.

By "serially", as used herein, refers to sequential arrangement of device components (e.g., light passes through each selective-polarization grating sequentially).

Before the present invention is further described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that stated range and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a," "an," and "the" include plural referents unless the context clearly dictates otherwise. Thus, for example, reference to "a polarization-selective grating" includes a plurality of such polarization-selective gratings and reference to "polarization-selective gratings" includes reference to one or more liquid crystal polarization-selective gratings and equivalents thereof known to those skilled in the art, and so forth. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. All combinations of the embodiments pertaining to the invention are specifically embraced by the present invention and are disclosed herein just as if each and every combination was individually and explicitly disclosed. In addition, all sub-combinations of the various embodiments and elements thereof are also specifically embraced by the present invention and are disclosed herein just as if each and every such sub-combination was individually and explicitly disclosed herein.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

DETAILED DESCRIPTION

The present disclosure provides optical image acquisition methods and devices for microscopy systems that enhance the FOV during image acquisition. According to aspects of the present disclosure, the methods and devices for enhancing the FOV of a sample during image acquisition in an optical imaging system include directing an incident electromagnetic field through a plurality of polarization-selective gratings, where each of the polarization-selective gratings is configured to apply a discrete amount of angular displacement to the incident electromagnetic field in a direction transverse or axial to the optical system's electromagnetic axis, resulting in an enhanced FOV or sampled volume size during image acquisition. In some cases, the gratings are modulated via a directly applied electric field or indirectly via paired polarization modulating devices.

Methods and devices for directing an incident electromagnetic field through a plurality of polarization-selective gratings to acquire an image, resulting in an enhanced field-of-view, are provided. In some cases, the gratings are modulated via a directly applied electric field or indirectly via paired polarization modulating devices. Aspects of the methods include directing an incident electromagnetic field through a plurality of polarization-selective gratings to acquire an image, resulting in an enhanced field-of-view. In some cases, the gratings are modulated via a directly applied electric field or indirectly via paired polarization modulating devices. Devices suitable for using the subject methods to enhance a FOV or sampled volume size during image acquisition are described.

Methods

Polarization-Selective Gratings

Aspects of the invention includes a method of using a series of polarization-selective gratings (PSG) or lithographic plates, as well as potential polarization modulating electro-optics to translate the native FOV of an optical system through manipulation of incident polarization states of the electromagnetic field and manipulations of applied electric fields to each polarization-selective grating, and/or an applied electric field to a preceding polarization modulating device. In some embodiments, the subject methods involve directing an incident electromagnetic field through a polarization-selective grating to acquire an image. In some cases, the grating is modulated via a directly applied electric field or indirectly via paired polarization modulating devices. In some embodiments, the polarization-selective grating device includes one or more polarization-selective gratings. In some embodiments, a plurality of polarization-selective gratings includes 2 polarization-selective gratings. In some embodiments, the plurality of polarization-selective gratings include a first polarization-selective grating, and a second polarization-selective grating. In some embodiments, a plurality of polarization-selective gratings includes 3 polarization-selective gratings. In some embodiments, a plurality of polarization-selective gratings includes 4 polarization-selective gratings. In some embodiments, a plurality of polarization-selective gratings includes more than 4 polarization-selective gratings, such as 5, 6, 7, 8, 9, or 10, or more polarization-selective gratings.

In some instances, two or more PSGs in the plurality of PSGs can have different thicknesses, as desired. In some instances, two or more PSGs in the plurality of PSGs can have the same thickness, as desired. In some embodiments, the thickness of a polarization-selective grating ranges from 0.1-0.5 mm, 0.5-1 mm, 1-1.5 mm, 1.5-2 mm, 2-2.5 mm, 2.5-3 mm, 3-3.5 mm, 3.5-4 mm, 4-4.5 mm, or 4.5-5 mm. In some embodiments, the thickness of a polarization-selective grating is 5 mm or less, 4 mm or less, 3 mm or less, 2 mm or less, or 1 mm or less. In some embodiments, the thickness of a polarization-selective grating is 1 mm or less, 0.9 mm or less, 0.8 mm or less, 0.7 mm or less, 0.5 mm or less, 0.4 mm or less, 0.3 mm or less, 0.2 mm or less, or 0.1 mm or less. In some embodiments, the polarization-selective grating is a cylindrical shape, a circular shape, a square shape, a spherical shape, a cone-shape, a prism-shape, or a rectangular shape. In some embodiments, each of the polarization-selective gratings is the same shape. In some embodiments, each of the polarization-selective gratings is a different shape. The polarization-selective gratings are not limited to the shapes and/or sizes as described herein and can be any shape and/or size as required per conditions specified to its intended use.

In some embodiments, the plurality of polarization-selective gratings can have the same length and/or width, as desired. In some embodiments, the plurality of polarization-selective gratings can have a different length and/or width, as desired. In some embodiments, the polarization-selective gratings have a length ranging from 0-5 mm, 5-10 mm, 10-15 mm, 15-20 mm, 20-25 mm, 25-30 mm, 30-35 mm, 35-40 mm, 40-45 mm, 45-50 mm, 50-55 mm, 60-65 mm, 65-70 mm, or 70-75 mm. In some embodiments, the polarization-selective gratings have a width ranging from 0-5 mm, 5-10 mm, 10-15 mm, 15-20 mm, 20-25 mm, 25-30 mm, 30-35 mm, 35-40 mm, 40-45 mm, 45-50 mm, 50-55 mm, 60-65 mm, 65-70 mm, or 70-75 mm In some embodiments, the polarization-selective gratings have a length ranging from 0-5 cm, 5-10 cm, 10-15 cm, 15-20 cm, 20-25 cm, 25-30 cm, 30-35 cm, 35-40 cm, 40-45 cm, 45-50 cm, 50-55 cm, 60-65 cm, 65-70 cm, or 70-75 cm. In some embodiments, the polarization-selective gratings have a width ranging from 0-5 mm, 5-10 mm, 10-15 mm, 15-20 mm, 20-25 mm, 25-30 mm, 30-35 mm, 35-40 mm, 40-45 mm, 45-50 mm, 50-55 mm, 60-65 mm, 65-70 mm, or 70-75 mm. In some embodiments, the polarization-selective gratings have a width ranging from 0-5 cm, 5-10 cm, 10-15 cm, 15-20 cm, 20-25 cm, 25-30 cm, 30-35 cm, 35-40 cm, 40-45 cm, 45-50 cm, 50-55 cm, 60-65 cm, 65-70 cm, or 70-75 cm. In some embodiments, the polarization-selective gratings have a height ranging from 0-5 mm, 5-10 mm, 10-15 mm, 15-20 mm, 20-25 mm, 25-30 mm, 30-35 mm, 35-40 mm, 40-45 mm, 45-50 mm, 50-55 mm, 60-65 mm, 65-70 mm, 70-75 mm, or 75-80 mm. In some embodiments, the polarization-selective gratings have a height ranging from 0-5 cm, 5-10 cm, 10-15 cm, 15-20 cm, 20-25 cm, 25-30 cm, 30-35 cm, 35-40 cm, 40-45 cm, 45-50 cm, 50-55 cm, 60-65 cm, 65-70 cm, or 70-75 cm. In some embodiments, the polarization-selective gratings have a diameter ranging from 0-5 mm, 5-10 mm, 10-15 mm, 15-20 mm, 20-25 mm, 25-30 mm, 30-35 mm, 35-40 mm, 40-45 mm, 45-50 mm, 50-55 mm, 60-65 mm, 65-70 mm, or 70-75 mm. In some embodiments, the polarization-selective gratings have a diameter ranging from 0-5 cm, 5-10 cm, 10-15 cm, 15-20 cm, 20-25 cm, 25-30 cm, 30-35 cm, 35-40 cm, 40-45 cm, 45-50 cm, 50-55 cm, 60-65 cm, 65-70 cm, or 70-75 cm. In some embodiments, the polarization-selective gratings have a radius ranging from 0-5 mm, 5-10 mm, 10-15 mm, 15-20 mm, 20-25 mm, 25-30 mm, 30-35 mm, or 35-40 mm. In some embodiments, the polarization-selective gratings have a radius ranging from 0-5 cm, 5-10 cm, 10-15 cm, 15-20 cm, 20-25 cm, 25-30 cm, 30-35 cm, or 35-40 cm. In some embodiments, the polarization-selective gratings have a surface area ranging from 0.6-480 $mm^2$. In some embodiments, the polarization-selective gratings have a surface area ranging from 0-1 $mm^2$, 1-2 $mm^2$, 2-3 $mm^2$, 3-4 $mm^2$, 4-5 $mm^2$, 5-6 $mm^2$, 6-7 $mm^2$, 7-8 $mm^2$, 8-9 $mm^2$, or 9-10 $mm^2$. In some embodiments, the polarization-selective gratings have a surface area ranging from 0-20 $mm^2$, 20-40 $mm^2$, 40-60 $mm^2$, 60-80 $mm^2$, 80-100 $mm^2$, 100-120 $mm^2$, 120-140 $mm^2$, 140-160 $mm^2$, 160-180 $mm^2$, 180-200 $mm^2$, 200-220 $mm^2$, 220-240 $mm^2$, 240-260 $mm^2$, 260-280 $mm^2$, 280-300 $mm^2$, 300-320 $mm^2$, 320-340 $mm^2$, 340-360 $mm^2$, 360-380 $mm^2$, 380-400 $mm^2$, 400-420 $mm^2$, 420-440 $mm^2$, 440-460 $mm^2$, 460-480 $mm^2$, or 480-500 $mm^2$. In some embodiments, the polarization-selective gratings have a surface area ranging from 0-1 $cm^2$, 1-2 $cm^2$, 2-3 $cm^2$, 3-4 $cm^2$, 4-5 $cm^2$, 5-6 $cm^2$, 6-7 $cm^2$, 7-8 $cm^2$, 8-9 $cm^2$, or 9-10 $cm^2$. In some embodiments, the polarization-selective gratings have a surface area ranging from 0-20 mm², 20-40 cm², 40-60 cm², 60-80 cm², 80-100 cm², 100-120 cm², 120-140 cm², 140-160 cm², 160-180 cm², 180-200 cm², 200-220 cm², 220-240 cm², 240-260 cm², 260-280 cm², 280-300 cm², 300-320 cm², 320-340 cm², 340-360 cm², 360-380 cm², 380-400 cm², 400-420 cm², 420-440 cm², 440-460 cm², 460-480 cm², or 480-500 cm².

In some embodiments, each polarization-selective grating can selectively modulate an electromagnetic field based upon the state of the incident field. In some embodiments, the polarization-selective gratings are designed to encode an arbitrary optical field pattern upon a passing electromagnetic field. In some embodiments, the arbitrary patterns are responsible for angularly displacing an optical field to one or more angles. In some embodiments, the arbitrary patterns are responsible for focusing an optical field to one or more locations. In some embodiments, the patterns are responsible for arbitrary combinations of optical field displacement and focusing to one or more angles and/or locations.

Polarization gratings according to some embodiments of the present invention may be transparent, thin-film, beam-splitters that periodically alter the local polarization state and propagation direction of light traveling therethrough. In contrast, conventional linear polarizers may operate by converting incident light into a single polarization state, permitting light of that polarization state to travel therethrough, but absorbing or rejecting light of other polarization states. Some embodiments of the present invention provide at least one polarization-selective grating arrangement. Some embodiments of the present invention provide a plurality of polarization-selective grating arrangements including at least first and second polarization-selective gratings. Some embodiments of the present invention provide a plurality of polarization-selective grating arrangements including a single polarization-selective grating. In such an arrangement, the second polarization-selective grating is generally referred to herein as an "analyzer", and thus, "analyzes" (i.e., polarizes) the polarized light received from the first polarization grating and/or intermediate layers. One or more of the polarization-selective gratings may be provided by a liquid crystal layer that is configured to be switched between a first state that does not substantially affect the polarization of light traveling therethrough, and a second state that "reverses" the polarization of the light traveling therethrough (i.e., converts the light to its opposite or orthogonal polarization). Additionally or alternatively, one or more of the polarization-selective gratings may be a polymerized liquid crystal layer. Examples of methods of polarization gratings are also discussed in U.S. Pat. Nos. 7,196,758 and 8,982,313, the disclosures of which are hereby incorporated by reference in their entireties.

Polarization gratings according to some embodiments of the present invention may have a spatially-variant uniaxial birefringence, and may provide diffraction efficiencies of up to 100%. In some cases, the polarization-selective gratings are polarization-sensitive diffractive elements with relatively wide acceptance angles and relatively low loss. Examples of methods of using polarization gratings are also discussed in U.S. Pat. No. 9,195,092, the disclosure of which is hereby incorporated by reference in its entirety.

In some embodiments, the polarization-selective gratings are polarization-sensitive elements with a lithographic design of sub-wavelength features on a transparent substrate.

Liquid Crystal Polarization-Selective Gratings

In some embodiments, enhanced FOV during image acquisition may be accomplished using stacked polarization gratings, for example where the gratings are modulated via a directly applied electric field or indirectly via paired polarization modulating devices.

In some embodiments, the incident electromagnetic field modulated through the plurality of polarization-selective gratings results in a polarization incident for each independent polarization-selective grating. In some embodiments, the polarization incident upon each independent polarization-selective grating is modulated by directly applying a voltage across the polarization-selective grating. In some embodiments, directly applying a voltage across the polarization-selective grating renders the plate transparent.

In some embodiments, the device of the present disclosure further comprises a variable wave-plate retarder. In some embodiments, the polarization incident upon each independent polarization-selective grating is indirectly modulated by a voltage across the variable wave-plate retarder. Examples of wave plate retarders for controlling a state of polarization are found in, for example, U.S. Pat. Nos.: 7,315,665 and 6,744,509, the disclosures of each of which are incorporated herein by reference in their entirety.

In some embodiments, the polarization incident upon each independent polarization-selective grating is indirectly modulated by electrically switching (e.g. ON or OFF) the polarization-selective gratings via the variable wave-plate. In some embodiments, the incident light is circularly polarized after passing through a variable wave-plate and a first linear polarizer. In some embodiments, in the OFF state, the incident unpolarized light is diffracted off-axis. In some embodiments, in the ON state, the incident unpolarized light is deflected. In some embodiments, the variable wave plate retarder is located in behind the polarization-selective gratings. In some embodiments, the variable wave plate retarder is located between each individual polarization-selective grating. In some embodiments, the polarization incident upon each independent polarization-selective grating is indirectly modulated by the voltage across the variable waveplate retarder is configured to alternate the incident polarization state upon each independent polarization-selective grating. In some embodiments, alternating the incident polarization state upon each independent polarization-selective grating comprises electrically switching each independent polarization-selective grating.

Figure 5:
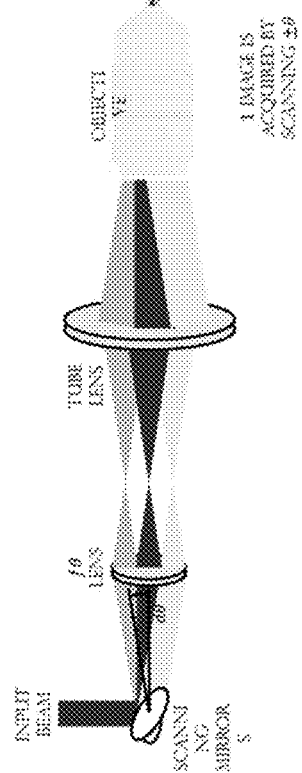
FIG. 5 depicts components of a fluorescence microscope without integration of LCPGs.

In additional embodiments, acquiring an image with enhanced FOV may be accomplished by the rotation of two or more polarization gratings around a common axis (i.e. right-hand circular polarization or left-hand circular polarization, or a combination thereof). In some cases, the FOV is enhanced with respect to the FOV of imaging systems without the polarization-selective grating device. FIG. 5 of the present application depicts an optical imaging system without integration of polarization-selective gratings, where one FOV of a brain is imaged, compared to FIG. 3, where the FOV is enhanced. In some cases, the FOV is enhanced by more than 1 times the FOV of the imaging systems without the polarization-selective gratings. In some cases, the FOV is enhanced by 2 times the FOV of imaging systems without the polarization-selective gratings. In some cases, the FOV is enhanced by 3 times, such as 4 times, 5 times, 6 times, 7 times, or 8 times the FOV of imaging systems without the polarization-selective gratings. In some cases, the FOV is enhanced by 9 times the FOV of imaging systems without the polarization-selective gratings. In some cases, the FOV is enhanced by 10 times, or more than 10 times, the FOV of imaging systems without the polarization-selective gratings.

Figure 3:
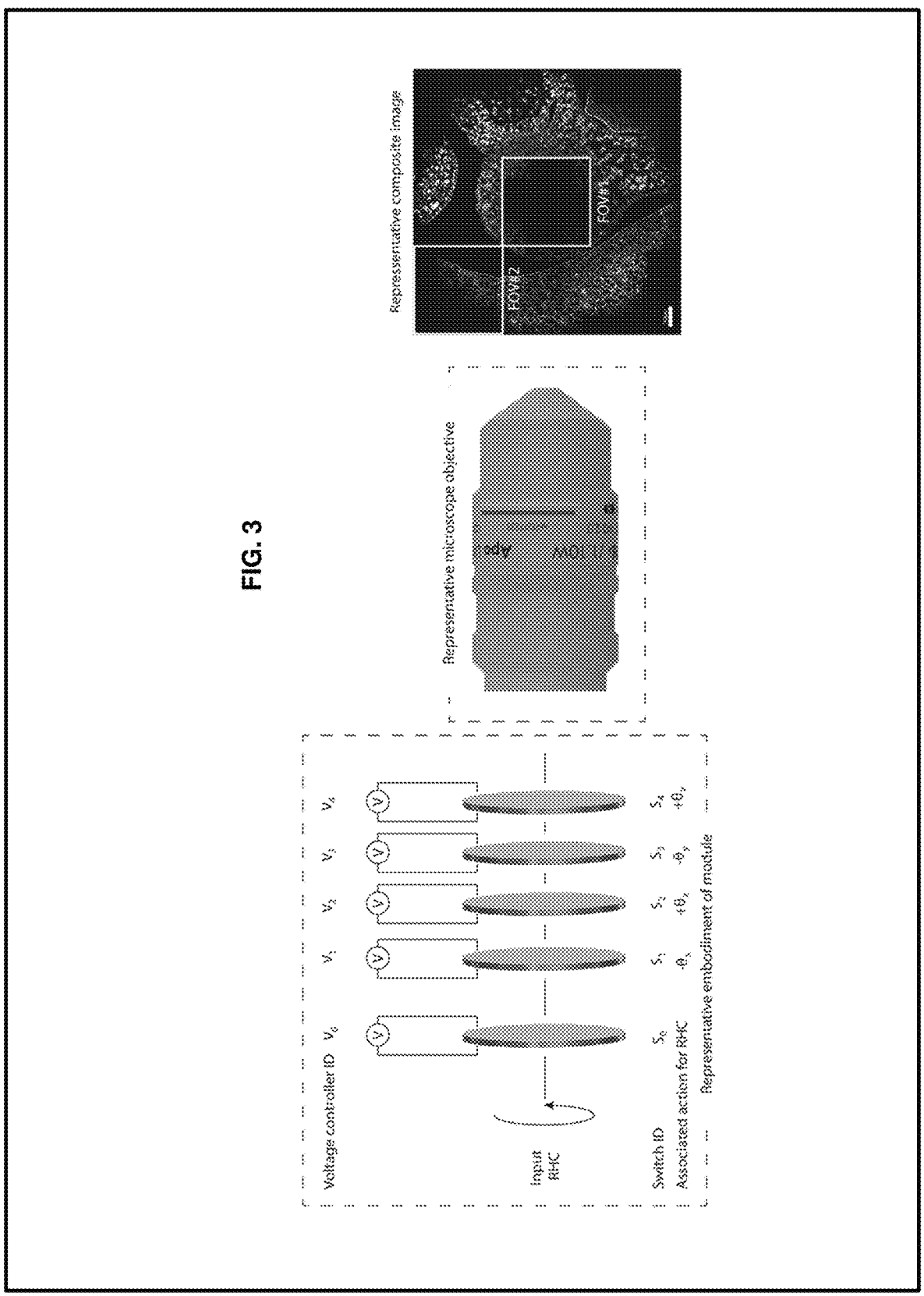
FIG. 3 depicts one voltage-controlled wave-plates with a series of four LCPGs integrated into an raster scanned imaging system, where the raster scanned beam sweeps across an angular range, behind the microscope objective, and the optical signal from the sample is digitized in time to create a composite image with two field-of-views, according to embodiments of the present disclosure.
Figure 7:
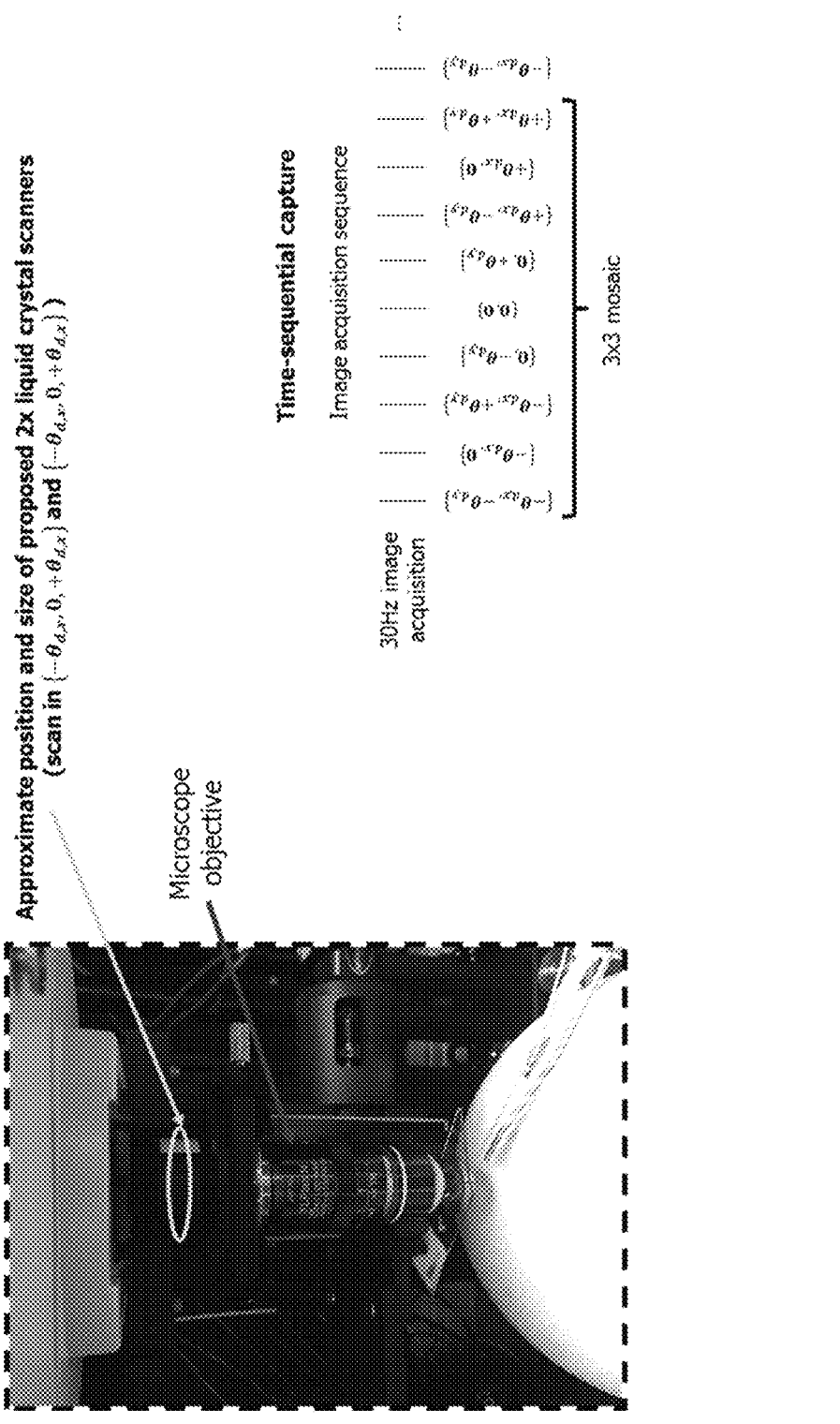
FIG. 7 depicts approximate positioning and size of LCPGs in an optical imaging system and the image acquisition sequence for time-sequential capture, according to embodiments of the present disclosure.

In some embodiments, the plurality of polarization-selective gratings are realized as a plurality of liquid-crystal polarization gratings (LCPGs) which can also include liquid crystal variable waveplates. In some embodiments, the polarization-selective gratings are electrically switchable. In some embodiments, the variable liquid-crystal waveplate are electrically switchable and may be paired with individual LCPGs. In some embodiments, the polarization-selective gratings include a voltage controller. An example of an embodiment of voltage controllers for each LCPG to modulate the polarization of each LCPG is shown in FIG. 3. In some embodiments, the polarization-selective gratings include a plurality of voltage controllers. In some embodiments, the LCPGs include a patterned birefringent liquid crystal. For example, when an unpolarized light is incident on a birefringent material, it is split into two types of polarized rays, ordinary (o-waves), and extraordinary (e-waves). The ordinary rays have polarization in a direction perpendicular to the optical axis, and the extraordinary rays have a polarization in the direction of the optical axis medium. A retardation plate that introduces a relative phase difference of $\pi$ radians or 180° between the o- and e-waves is known as a half-wave plate or half-wave retardation. Examples of birefringent material, polarizers, and retardation plates can be found in, for example, Hecht et al. 2002, *Optics, fourth edition*, ISBN: 9780805385663. For example, the liquid crystal layer may be a switchable birefringent liquid crystal layer that can be electrically switched between zero and half-wave retardation responsive to a voltage applied thereto, with relatively high accuracy and relatively wide bandwidth. In some embodiments, the LCPGs are electro-optical. In some embodiments, the application of an external electric field can alter the properties of the polarization grating, thereby making the LCPGs electro-optical. In some embodiments, the polarization-selective gratings will manipulate the direction of the incident field in directions transverse or axial to the system electromagnetic axis (i.e. or some combination thereof). In some embodiments, the voltage-controlled LCPGs with optional variable waveplates are present at a position as to selectively modulate the beam from a right-hand circular polarization (RHC) to a left-hand circular polarization (LHC). In some embodiments, the action of each electrically switched LCPG can be removed by applying a voltage to the respective switch (e.g. a threshold voltage applied to will remove the action of the LCPG from the modular device). In some embodiments the action of each LCPG can be selected by the prior variable waveplate by application of an external voltage. The table in FIG. 4 lists example possible outputs from this serial combination of electrically switched LCPGs, creating a time-sequential capture during image acquisition, as shown in FIG. 7. In some embodiments, the device comprises one voltage-controlled wave-plate (S0 in FIG. 3) and four electrically switched LCPGs (S1-S4 in FIG. 3). In some embodiments, the voltage of the device is controlled through a voltage controller, as depicted in FIG. 3 and according to embodiments of the present disclosure. In some embodiments, explicit combinations of when a voltage is applied (e.g. ON or OFF) are enumerated and the respective output state is reported in terms of polarization and the desired action of beam deviation (to pan the field-of-view). In some cases, multiple combinations of when a voltage is applied (e.g. ON or OFF) achieve the same action of beam deviation but with orthogonal polarization states. In some embodiments, when LHC is incident to LCPG, the associated action is the opposite beam deviation, resulting in more than one field-of-view. In some embodiments, LCPGs including a waveplate can be used to realize the same output action but at orthogonal polarization states. This has the utility of increasing the degrees-of-freedom for addressing if additional modules of LCPGs are to be added later, for axial displacement as an example.

In some embodiments, the polarization incident upon each independent polarization-selective grating is indirectly modulated by electrically switching (e.g. ON or OFF) the polarization-selective gratings via the variable wave-plate. In some embodiments, the incident light is circularly polarized after passing through a variable wave-plate and a first linear polarizer. In some embodiments, in the OFF state, the incident unpolarized light is diffracted off-axis. In some embodiments, in the ON state, the incident unpolarized light is deflected. In some embodiments, the variable wave plate retarder is located behind the polarization-selective gratings.

In some embodiments, the polarization incident upon each independent polarization-selective grating is indirectly modulated by the voltage across the variable wave-plate retarder and is configured to alternate the incident polarization state upon each independent polarization-selective grating. In some embodiments, alternating the incident polarization state upon each independent polarization-selective grating comprises electrically switching each independent polarization-selective grating.

In some embodiments, a polarization incident upon each independent polarization-selective grating is modulated by: a) a voltage across each the polarization-selective grating; b) a voltage across the variable wave-plate retarder; or c) a combination of a) and b). In some embodiments, the voltage across a first polarization-selective grating is different than the voltage across a second polarization-selective grating, a third polarization-selective grating, a fourth polarization-selective grating, a fifth polarization-selective grating, a sixth polarization-selective grating, a seventh polarization-selective grating, an eighth polarization-selective grating, a ninth polarization-selective grating, and/or a tenth polarization-selective grating. In some embodiments, the voltage across the variable wave-plate retarder, and each polarization-selective grating (i.e. first, second, third, fourth, fifth, sixth, seventh, eighth, ninth, and/or tenth polarization-selective gratings) is a different voltage. In some embodiments, the voltage across the variable wave-plate retarder, and each polarization-selective grating (i.e. first, second, third, fourth, fifth, sixth, seventh, eighth, ninth, and/or tenth polarization-selective gratings) is the same voltage. In some embodiments, the voltage applied to a wave-plate retarder, and/or the polarization-selective gratings is 0 volts, 5 volts, 10 volts, 15 volts, 20 volts, 25 volts, 30 volts, 35 volts, 40 volts, 45 volts, 50 volts, 55 volts, 60 volts, 65 volts, 70 volts, 75 volts, 80 volts, 85 volts, 90 volts, 95 volts, and/or 100 volts. In some embodiments, the voltages applied to the wave-plate retarder and/or each polarization-selective grating ranges from 0-5 volts, 5-10 volts, 10-15 volts, 15-20 volts, 20-25 volts, 25-30 volts, 30-35 volts, 35-40 volts, 40-45 volts, 45-50 volts, 50-55 volts, 55-60 volts, 60-65 volts, 65-70 volts, 70-75 volts, 75-80 volts, 80-85 volts, 85-90 volts, 90-95 volts, and/or 95-100 volts. In some embodiments, the difference in voltage between each polarization-selective grating is independently 1 volt or more, 2 volts or more, 3 volts or more, 4 volts or more, 5 volts or more, 6 volts or more, 7 volts or more, 8 volts or more, 9 volts or more, 10 volts or more, 11 volts or more, 12 volts or more, 13 volts or more, 14 volts or more, 15 volts or more, 16 volts or more, 17 volts or more, 18 volts or more, 19 volts or more, or 20 volts or more. In some embodiments, the voltages applied to the wave-plate retarder and/or each polarization-selective grating is 0 volts$_{rms}$ ($V_{rms}$). In some embodiments, the voltages applied to the wave-plate retarder and/or each polarization-selective grating ranges from 0-5 $V_{rms}$, 5-10 $V_{rms}$, 10-15 $V_{rms}$, 15-20 $V_{rms}$, 20-25 $V_{rms}$, 25-30 $V_{rms}$, 30-35 $V_{rms}$, 35-40 $V_{rms}$, 40-45 $V_{rms}$, 45-50$_{Vrms}$, 50-55$_{Vrm}$, 55-60$_{Vrms}$, 60-65$_{Vrms}$, 65-70$_{Vrms}$, 70-75 $V_{rms}$, 75-80$_{Vrms}$, 80-85 $V_{rms}$, 85-90$_{Vrms}$, 90-95$_{Vrms}$, or 95-100 $V_{rms}$. In some embodiments, the difference in voltage between each polarization-selective grating is independently 1 $V_{rms}$ or more, 2 $V_{rms}$ or more, 3 $V_{rms}$ or more, 4 $V_{rms}$ or more, 5 $V_{rms}$ or more, 6 $V_{rms}$ or more, 7 $V_{rms}$ or more, 8 $V_{rms}$ or more, 9 $V_{rms}$ or more, 10 $V_{rms}$ or more, 11 $V_{rms}$ or more, 12 $V_{rms}$ or more, 13 $V_{rms}$ or more, 14 $V_{rms}$ or more, 15 $V_{rms}$ or more, 16 $V_{rms}$ or more, 17 $V_{rms}$ or more, 18 $V_{rms}$ or more, 19 $V_{rms}$ or more, or 20 $V_{rms}$ or more. In some embodiments, the voltages applied to the wave-plate retarder and/or each polarization-selective grating is modulated by 5 volts or more. In some embodiments, the voltages applied to the wave-plate retarder and/or each polarization-selective grating is modulated by 5 $V_{rms}$ or more. In some embodiments, the voltages applied to the wave-plate retarder and/or each polarization-selective grating is modulated by 5 volts or less. In some embodiments, the voltages applied to the wave-plate retarder and/or each polarization-selective grating is modulated by 5 $V_{rms}$ or less. In some embodiments, the voltages applied to the wave-plate retarder and/or each polarization-selective grating is modulated at 0 kHz or more, 1 kHz or more, 2 kHz or more, 3 kHz or more, 4 kHz or more, 5 kHz or more, 6 kHz or more, 7 kHz or more, 8 kHz or more, 9 kHz or more, 10 kHz or more, 11 kHz or more, 12 kHz or more, 13 kHz or more, 14 kHz or more, 15 kHz or more, 16 kHz or more, 17 kHz or more, 18 kHz or more, 19 kHz or more, 20 kHz or more, 21 kHz or more, 22 kHz or more, 23 kHz or more, 24 kHz or more, or 25 kHz or more. In some embodiments, the voltages applied to the wave-plate retarder and/or each polarization-selective grating is modulated by a frequency signal ranging from 0-5 kHz, 5-10 kHz, 10-20 kHz, 20-25 kHz, 25-30 kHz, 30-35 kHz, 35-40 kHz, 40-45 kHz, 45-50 kHz, 50-55 kHz, 55-60 kHz, 60-65 kHz, 65-70 kHz, 70-75 kHz, 75-80 kHz, 80-85 kHz, 85-90 kHz, 90-95 kHz, or 95-100 kHz. For example, the voltages applied to the wave-plate retarder and/or each polarization-selective grating can be modulated by a frequency signal ranging from 2-10 kHz. In some embodiments, the voltage is a voltage direct current (VDC). In some embodiments, the voltage is modulated as a ± signal. In some embodiments, the voltage is a ±VDC signal, such as a ±square-wave signal. In some embodiments, the voltage is a ±5 VDC square-wave signal.

In some embodiments, the duration of the voltage applied or not applied (e.g. ON or OFF) for the wave-plate retarder and/or each polarization-selective grating is the same duration for each of the polarization-selective gratings and/or wave-plate retarder. In some embodiments, the duration of the voltage applied or not applied (e.g. ON or OFF) for the wave-plate retarder and/or each polarization-selective gratings is a different duration for each of the polarization-selective gratings and/or wave-plate retarder. In some embodiments, the duration of voltage applied to the wave-plate retarder and/or the polarization-selective grating ranges from 0.1-0.5 ms. In some embodiments, the duration of voltage applied to the wave-plate retarder and/or the polarization-selective grating ranges from 0.5-1 ms. In some embodiments, the duration of voltage applied to the wave-plate retarder and/or the polarization-selective gratings is 1 ms or more, 2 ms or more, 3 ms or more, 4 ms or more, 5 ms or more, 6 ms or more, 7 ms or more, 8 ms or more, 9 ms or more, or 10 ms or more. In some embodiments, the duration of voltage applied to the wave-plate retarder and/or the polarization-selective grating is 5 ms or more, 10 ms or more, 15 ms or more, 20 ms or more, 25 ms or more, 30 ms or more, 35 ms or more, 40 ms or more, 45 ms or more, 50 ms or more, 55 ms or more, or 60 ms or more. In some embodiments, the duration of voltage applied to the wave-plate retarder and/or the polarization-selective gratings is 1 ms or more, 2 ms or less, 3 ms or less, 4 ms or less, 5 ms or less, 6 ms or less, 7 ms or less, 8 ms or less, 9 ms or less, or 10 or less. In some embodiments, the duration of voltage applied to the wave-plate retarder and/or the polarization-selective gratings is 1 ms, 2 ms, 3 ms, 4 ms, 5 ms, 6 ms, 7 ms, 8 ms, 9 ms, or 10 ms. In some embodiments, the duration of the voltage applied to the wave-plate retarder and/or the polarization-selective gratings ranges from 0-5 ms, 5-10 ms, 10-15 ms, 15-20 ms, 20-25 ms, 25-30 ms, 30-35 ms, 35-40 ms, 40-45 ms, 45-50 ms, 50-55 ms, 55-60 ms, 60-65 ms, 65-70 ms, 70-75 ms, 75-80 ms, 80-85 ms, 85-90 ms, 90-95 ms, or 95-100 ms. In some embodiments, the relaxation time (i.e. voltage OFF) of the wave-plate retarder and/or the polarization-selective gratings ranges from 0.1-0.5 ms. In some embodiments, the relaxation time (i.e. voltage OFF) of the wave-plate retarder and/or the polarization-selective gratings ranges from 0.5-1 ms. In some embodiments, the relaxation time (i.e. voltage OFF) of the wave-plate retarder and/or polarization-selective gratings is 1 ms, 2 ms, 3 ms, 4 ms, 5 ms, 6 ms, 7 ms, 8 ms, 9 ms, or 10 ms. In some embodiments, the relaxation time (i.e. voltage OFF) of the wave-plate retarder and/or polarization-selective gratings is 0 ms or more, 5 ms or more, 10 ms or more, 15 ms or more, 20 ms or more, 25 ms or more, 30 ms or more, 35 ms or more, 40 ms or more, 45 ms or more, 50 ms or more, 55 ms or more, or 60 ms or more. In some embodiments, the relaxation time (i.e. voltage OFF) of the wave-plate retarder and/or polarization-selective gratings ranges from 0-5 ms, 5-10 ms, 10-15 ms, 15-20 ms, 20-25 ms, 25-30 ms, 30-35 ms, 35-40 ms, 40-45 ms, 45-50 ms, 50-55 ms, 55-60 ms, 60-65 ms, 65-70 ms, 70-75 ms, 75-80 ms, 80-85 ms, 85-90 ms, 90-95 ms, or 95-100 ms.

In some embodiments, a voltage is applied to a polarization-selective grating for 0.001 ms, 0.01 ms, 0.1 ms, 1 ms, 10 ms, 100 ms, or 1000 ms, or some other interval. In some embodiments, the relaxation time (i.e. voltage OFF) for at least one polarization-selective grating is for 0.001 ms, 0.01 ms, 0.1 ms, 1 ms, 10 ms, 100 ms, or 1000 ms.

In some embodiments, an input incident electromagnetic field is right hand circular polarized (RHC). In some embodiments, a voltage is applied (i.e. ON) on: the first polarization-selective grating, and the fourth polarization-selective grating; and a voltage is not applied (i.e. OFF) on: a variable wave-plate, the second polarization-selective grating, and the third polarization-selective grating. In some embodiments, applying a voltage to the first polarization-selective grating, and the fourth polarization-selective grating, but not applying a voltage to a variable wave-plate, the second polarization-selective grating, and the third polarization-selective grating results in an output right hand circular polarization (RHC). In some embodiments, a voltage is applied (i.e. ON) on: the first polarization-selective grating, and the fourth polarization-selective grating; and a voltage is not applied (i.e. OFF) on: a variable wave-plate, the second polarization-selective grating, and the third polarization-selective grating, where each of the polarization-selective gratings are electrically switched to displace the beam of light in the (+θ$_x$, +θ$_y$) direction. In such embodiments, the output polarization followed by electrically switching (i.e. ON and/or OFF) the wave-plate and each of the polarized-selective gratings is a RHC. In some embodiments, the electric field, followed by electrically switching (i.e. ON and/or OFF) the wave-plate and each of the polarized-selective gratings, is angularly displaced by 45 degrees. In some embodiments, the electric field, followed by electrically switching (i.e. ON and/or OFF) the wave-plate and each of the polarized-selective gratings, is angularly displaced by 90 degrees. In some embodiments, the electric field followed by electrically switching (i.e. ON and/or OFF) the wave-plate and each of the polarized-selective gratings is angularly displaced by 135 degrees. In some embodiments, the electric field followed by electrically switching (i.e. ON and/or OFF) the wave-plate and each of the polarized-selective gratings is angularly displaced by 180 degrees. In some embodiments, the electric field, followed by electrically switching (i.e. ON and/or OFF) the wave-plate and each of the polarized-selective gratings, is angularly displaced ranging from 0-10 degrees, 10-20 degrees, 20-30 degrees, 30-40 degrees, 40-50 degrees, 50-60 degrees, 60-70 degrees, 70-80 degrees, 80-90 degrees, 90-100 degrees, 100-110 degrees, 110-120 degrees, 120-130 degrees, 130-140 degrees, 140-150 degrees, 150-160 degrees, 160-170 degrees, or 170-180 degrees. In some embodiments, the electric field, followed by electrically switching (i.e. ON and/or OFF) the wave-plate and each of the polarized-selective gratings, is angularly displaced ranging from 0-10 degrees, 10-20 degrees, 20-30 degrees, 30-40 degrees, 40-50 degrees, 50-60 degrees, 60-70 degrees, 70-80 degrees, or 80-90 degrees. In some embodiments, the polarization of the electromagnetic field, followed by electrically switching (i.e. ON and/or OFF) the wave-plate and each of the polarized-selective gratings, is rotated by an angle ranging from 0-10 degrees, 10-20 degrees, 20-30 degrees, 30-40 degrees, 40-50 degrees, 50-60 degrees, 60-70 degrees, 70-80 degrees, 80-90 degrees, 90-100 degrees, 100-110 degrees, 110-120 degrees, 120-130 degrees, 130-140 degrees, 140-150 degrees, 150-160 degrees, 160-170 degrees, or 170-180 degrees. In some embodiments, the plurality of polarization-selective gratings includes four polarization-selective gratings, and includes electrical switching (i.e. ON and/or OFF) settings similar to State ID #1 of FIG. 4.

In some embodiments, a voltage is applied (i.e. ON) on: the first polarization-selective grating, and the third polarization-selective grating; and a voltage is not applied (i.e. OFF) on the: the variable wave-plate, the second polarization-selective grating, and the fourth polarization-selective grating. In some embodiments, a voltage is applied (i.e. ON) on: the first polarization-selective grating, and the third polarization-selective grating; and a voltage is not applied (i.e. OFF) on the: the variable wave-plate, the second polarization-selective grating, and the fourth polarization-selective grating, where each of the polarization-selective gratings are electrically switched to displace the beam of light in the (+θ$_x$, −θ$_x$) direction. In some embodiments, the output polarization as a result of applying a voltage to the first polarization-selective grating, and to the third polarization-selective grating, but not applying a voltage controller on a variable wave-plate, the second polarization-selective grating, and the fourth polarization-selective grating results in a RHC. In such embodiments, the output polarization followed by electrically switching (i.e. ON and/or OFF) the wave-plate and each of the polarized-selective gratings is a RHC. In some embodiments, the electric field, followed by electrically switching (i.e. ON and/or OFF) the wave-plate and each of the polarized-selective gratings, is angularly displaced by 45 degrees, by 90 degrees, by 135 degrees, and/or by 180 degrees. In some embodiments, the electric field, followed by electrically switching (i.e. ON and/or OFF) the wave-plate and each of the polarized-selective gratings, is angularly displaced ranging from 0-10 degrees, 10-20 degrees, 20-30 degrees, 30-40 degrees, 40-50 degrees, 50-60 degrees, 60-70 degrees, 70-80 degrees, 80-90 degrees, 90-100 degrees, 100-110 degrees, 110-120 degrees, 120-130 degrees, 130-140 degrees, 140-150 degrees, 150-160 degrees, 160-170 degrees, or 170-180 degrees. In some embodiments, the electric field, followed by electrically switching (i.e. ON and/or OFF) the wave-plate and each of the polarized-selective gratings, is angularly displaced ranging from 0-10 degrees, 10-20 degrees, 20-30 degrees, 30-40 degrees, 40-50 degrees, 50-60 degrees, 60-70 degrees, 70-80 degrees, or 80-90 degrees. In some embodiments, the polarization of the electromagnetic field, followed by electrically switching (i.e. ON and/or OFF) the wave-plate and each of the polarized-selective gratings, is rotated by an angle ranging from 0-10 degrees, 10-20 degrees, 20-30 degrees, 30-40 degrees, 40-50 degrees, 50-60 degrees, 60-70 degrees, 70-80 degrees, 80-90 degrees, 90-100 degrees, 100-110 degrees, 110-120 degrees, 120-130 degrees, 130-140 degrees, 140-150 degrees, 150-160 degrees, 160-170 degrees, or 170-180 degrees. In some embodiments, the plurality of polarization-selective gratings includes four polarization-selective gratings, and includes electrical switching (i.e. ON and/or OFF) settings similar to State ID #2 of FIG. 4.

In some embodiments, a voltage is applied (i.e. ON) on: the first polarization-selective grating, the third polarization-selective grating, and the fourth polarization-selective grating; and a voltage is not applied (i.e. OFF) on: the variable wave-plate, and the second polarization-selective grating. In some embodiments, a voltage is applied (i.e. ON) on: the first polarization-selective grating, the third polarization-selective grating, and the fourth polarization-selective grating; and a voltage is not applied (i.e. OFF) on: the variable wave-plate, and the second polarization-selective grating, where each of the polarization-selective gratings are electrically switched to displace the beam of light in the (+θ$_x$, 0) direction. In some embodiments, the output polarization as a result of applying a voltage controller on the first polarization-selective grating, the third polarization-selective grating, and the fourth polarization-selective grating, but not applying a voltage controller on a variable wave-plate, and the second polarization-selective grating results in a LHC. In such embodiments, the output polarization followed by electrically switching (i.e. ON and/or OFF) the wave-plate and each of the polarized-selective gratings is a LHC. In some embodiments, the electric field, followed by electrically switching (i.e. ON and/or OFF) the wave-plate and each of the polarized-selective gratings, is angularly displaced by 45 degrees, by 90 degrees, by 135 degrees, and/or by 180 degrees. In some embodiments, the electric field, followed by electrically switching (i.e. ON and/or OFF) the wave-plate and each of the polarized-selective gratings, is angularly displaced ranging from 0-10 degrees, 10-20 degrees, 20-30 degrees, 30-40 degrees, 40-50 degrees, 50-60 degrees, 60-70 degrees, 70-80 degrees, 80-90 degrees, 90-100 degrees, 100-110 degrees, 110-120 degrees, 120-130 degrees, 130-140 degrees, 140-150 degrees, 150-160 degrees, 160-170 degrees, or 170-180 degrees. In some embodiments, the electric field, followed by electrically switching (i.e. ON and/or OFF) the wave-plate and each of the polarized-selective gratings, is angularly displaced ranging from 0-10 degrees, 10-20 degrees, 20-30 degrees, 30-40 degrees, 40-50 degrees, 50-60 degrees, 60-70 degrees, 70-80 degrees, or 80-90 degrees. In some embodiments, the polarization of electric field, followed by electrically switching (i.e. ON and/or OFF) the wave-plate and each of the polarized-selective gratings, is rotated by an angle ranging from 0-10 degrees, 10-20 degrees, 20-30 degrees, 30-40 degrees, 40-50 degrees, 50-60 degrees, 60-70 degrees, 70-80 degrees, 80-90 degrees, 90-100 degrees, 100-110 degrees, 110-120 degrees, 120-130 degrees, 130-140 degrees, 140-150 degrees, 150-160 degrees, 160-170 degrees, or 170-180 degrees. In some embodiments, the polarization of the electromagnetic field, followed by electrically switching (i.e. ON and/or OFF) the wave-plate and each of the polarized-selective gratings, is rotated by an angle ranging from 0-10 degrees, 10-20 degrees, 20-30 degrees, 30-40 degrees, 40-50 degrees, 50-60 degrees, 60-70 degrees, 70-80 degrees, 80-90 degrees, 90-100 degrees, 100-110 degrees, 110-120 degrees, 120-130 degrees, 130-140 degrees, 140-150 degrees, 150-160 degrees, 160-170 degrees, or 170-180 degrees. In some embodiments, the plurality of polarization-selective gratings includes four polarization-selective gratings, and includes electrical switching (i.e. ON and/or OFF) settings similar to State ID #3 of FIG. 4.

In some embodiments, a voltage is applied (i.e. ON) on: the first polarization-selective grating, the second polarization-selective grating, and the third polarization-selective grating; and a voltage is not applied (i.e. OFF) on: the variable wave-plate, and the fourth polarization-selective grating. In some embodiments, a voltage is applied (i.e. ON) on: the first polarization-selective grating, the second polarization-selective grating, and the third polarization-selective grating; and a voltage is not applied (i.e. OFF) on: the variable wave-plate, and the fourth polarization-selective grating, where each of the polarization-selective gratings are electrically switched to displace the beam of light in the (0, $+\theta_y$) direction. In some embodiments, the output polarization as a result of applying a voltage controller on the first polarization-selective grating, the second polarization-selective grating, and the third polarization-selective grating, but not applying a voltage controller on a variable wave-plate, and the fourth polarization-selective grating results in a LHC. In such embodiments, the output polarization followed by electrically switching (i.e. ON and/or OFF) the wave-plate and each of the polarized-selective gratings is a LHC. In some embodiments, the electric field, followed by electrically switching (i.e. ON and/or OFF) the wave-plate and each of the polarized-selective gratings, is angularly displaced by 45 degrees, by 90 degrees, by 135 degrees, and/or by 180 degrees. In some embodiments, the polarization of the electromagnetic field, followed by electrically switching (i.e. ON and/or OFF) the wave-plate and each of the polarized-selective gratings, is rotated by an angle ranging from 0-10 degrees, 10-20 degrees, 20-30 degrees, 30-40 degrees, 40-50 degrees, 50-60 degrees, 60-70 degrees, 70-80 degrees, 80-90 degrees, 90-100 degrees, 100-110 degrees, 110-120 degrees, 120-130 degrees, 130-140 degrees, 140-150 degrees, 150-160 degrees, 160-170 degrees, or 170-180 degrees. In some embodiments, the plurality of polarization-selective gratings includes four polarization-selective gratings, and includes electrical switching (i.e. ON and/or OFF) settings similar to State ID #4 of FIG. 4.

In some embodiments, a voltage is applied (i.e. ON) on: the first polarization-selective grating, the second polarization-selective grating, and the fourth polarization-selective grating; and a voltage is not applied (i.e. OFF) on: the variable wave-plate, the third polarization-selective grating, and the polarization-selective grating. In some embodiments, a voltage is applied (i.e. ON) on: the first polarization-selective grating, the second polarization-selective grating, and the fourth polarization-selective grating; and a voltage is not applied (i.e. OFF) on: the variable wave-plate, the third polarization-selective grating, and the polarization-selective grating, where each of the polarization-selective gratings are electrically switched to displace the beam of light in the (0, $-\theta_y$) direction. In some embodiments, the output polarization as a result of applying a voltage controller on the first polarization-selective grating, the second polarization-selective grating, and the fourth polarization-selective grating, but not applying a voltage controller on a variable wave-plate, and the third polarization-selective grating results in a LHC. In such embodiments, the output polarization followed by electrically switching (i.e. ON and/or OFF) the wave-plate and each of the polarized-selective gratings is a LHC. In some embodiments, the electric field, followed by electrically switching (i.e. ON and/or OFF) the wave-plate and each of the polarized-selective gratings, is angularly displaced by 45 degrees, by 90 degrees, by 135 degrees, and/or by 180 degrees. In some embodiments, the electric field, followed by electrically switching (i.e. ON and/or OFF) the wave-plate and each of the polarized-selective gratings, is angularly displaced ranging from 0-10 degrees, 10-20 degrees, 20-30 degrees, 30-40 degrees, 40-50 degrees, 50-60 degrees, 60-70 degrees, 70-80 degrees, or 80-90 degrees. In some embodiments, the polarization of the electromagnetic field, followed by electrically switching (i.e. ON and/or OFF) the wave-plate and each of the polarized-selective gratings, is rotated by an angle ranging from 0-10 degrees, 10-20 degrees, 20-30 degrees, 30-40 degrees, 40-50 degrees, 50-60 degrees, 60-70 degrees, 70-80 degrees, 80-90 degrees, 90-100 degrees, 100-110 degrees, 110-120 degrees, 120-130 degrees, 130-140 degrees, 140-150 degrees, 150-160 degrees, 160-170 degrees, or 170-180 degrees. In some embodiments, the plurality of polarization-selective gratings includes four polarization-selective gratings, and includes electrical switching (i.e. ON and/or OFF) settings similar to State ID #5 of FIG. 4.

In some embodiments, a voltage is applied (i.e. ON) on: the first polarization-selective grating, the second polarization-selective grating, the third polarization-selective grating, and the fourth polarization-selective grating; and a voltage is not applied (i.e. OFF) on: the variable wave-plate. In some embodiments, a voltage is applied (i.e. ON) on: the first polarization-selective grating, the second polarization-selective grating, the third polarization-selective grating, and the fourth polarization-selective grating; and a voltage is not applied (i.e. OFF) on: the variable wave-plate, where each of the polarization-selective gratings are electrically switched to displace the beam of light in the (0,0) direction. In some embodiments, the output polarization as a result of applying a voltage controller on the first polarization-selective grating, the second polarization-selective grating, the third polarization-selective grating, and the fourth polarization-selective grating, but not applying a voltage controller on a variable wave-plate results in a RHC. In such embodiments, the output polarization followed by electrically switching (i.e. ON and/or OFF) the wave-plate and each of the polarized-selective gratings is a RHC. In some embodiments, the electric field, followed by electrically switching (i.e. ON and/or OFF) the wave-plate and each of the polarized-selective gratings, is angularly displaced by 45 degrees, by 90 degrees, by 135 degrees, and/or by 180 degrees. In some embodiments, the electric field, followed by electrically switching (i.e. ON and/or OFF) the wave-plate and each of the polarized-selective gratings, is angularly displaced ranging from 0-10 degrees, 10-20 degrees, 20-30 degrees, 30-40 degrees, 40-50 degrees, 50-60 degrees, 60-70 degrees, 70-80 degrees, 80-90 degrees, 90-100 degrees, 100-110 degrees, 110-120 degrees, 120-130 degrees, 130-140 degrees, 140-150 degrees, 150-160 degrees, 160-170 degrees, or 170-180 degrees. In some embodiments, the electric field, followed by electrically switching (i.e. ON and/or OFF) the wave-plate and each of the polarized-selective gratings, is angularly displaced ranging from 0-10 degrees, 10-20 degrees, 20-30 degrees, 30-40 degrees, 40-50 degrees, 50-60 degrees, 60-70 degrees, 70-80 degrees, or 80-90 degrees. In some embodiments, the polarization of the electromagnetic field, followed by electrically switching (i.e. ON and/or OFF) the wave-plate and each of the polarized-selective gratings, is rotated by an angle ranging from 0-10 degrees, 10-20 degrees, 20-30 degrees, 30-40 degrees, 40-50 degrees, 50-60 degrees, 60-70 degrees, 70-80 degrees, 80-90 degrees, 90-100 degrees, 100-110 degrees, 110-120 degrees, 120-130 degrees, 130-140 degrees, 140-150 degrees, 150-160 degrees, 160-170 degrees, or 170-180 degrees. In some embodiments, the plurality of polarization-selective gratings includes four polarization-selective gratings, and includes electrical switching (i.e. ON and/or OFF) settings similar to State ID #6 of FIG. 4.

In some embodiments, a voltage is applied (i.e. ON) on: the second polarization-selective grating, and the fourth polarization-selective grating; and a voltage is not applied (i.e. OFF) on: the variable wave-plate, the first polarization-selective grating, and the third polarization-selective grating. In some embodiments, a voltage is applied (i.e. ON) on: the second polarization-selective grating, and the fourth polarization-selective grating; and a voltage is not applied (i.e. OFF) on: the variable wave-plate, the first polarization-selective grating, and the third polarization-selective grating, where each of the polarization-selective gratings are electrically switched to displace the beam of light in the $(-\theta_x, +\theta_y)$ direction. In some embodiments, the output polarization as a result of applying a voltage controller on the second polarization-selective grating, and the fourth polarization-selective grating, but not applying a voltage controller on a variable wave-plate, the first polarization-selective grating, and the third polarization-selective grating results in a RHC. In such embodiments, the output polarization followed by electrically switching (i.e. ON and/or OFF) the wave-plate and each of the polarized-selective gratings is a RHC. In some embodiments, the electric field, followed by electrically switching (i.e. ON and/or OFF) the wave-plate and each of the polarized-selective gratings, is angularly displaced by 45 degrees, by 90 degrees, by 135 degrees, and/or by 180 degrees. In some embodiments, the electric field, followed by electrically switching (i.e. ON and/or OFF) the wave-plate and each of the polarized-selective gratings, is angularly displaced ranging from 0-10 degrees, 10-20 degrees, 20-30 degrees, 30-40 degrees, 40-50 degrees, 50-60 degrees, 60-70 degrees, 70-80 degrees, 80-90 degrees, 90-100 degrees, 100-110 degrees, 110-120 degrees, 120-130 degrees, 130-140 degrees, 140-150 degrees, 150-160 degrees, 160-170 degrees, or 170-180 degrees. In some embodiments, the electric field, followed by electrically switching (i.e. ON and/or OFF) the wave-plate and each of the polarized-selective gratings, is angularly displaced ranging from 0-10 degrees, 10-20 degrees, 20-30 degrees, 30-40 degrees, 40-50 degrees, 50-60 degrees, 60-70 degrees, 70-80 degrees, or 80-90 degrees. In some embodiments, the polarization of the electromagnetic field, followed by electrically switching (i.e. ON and/or OFF) the wave-plate and each of the polarized-selective gratings, is rotated by an angle ranging from 0-10 degrees, 10-20 degrees, 20-30 degrees, 30-40 degrees, 40-50 degrees, 50-60 degrees, 60-70 degrees, 70-80 degrees, 80-90 degrees, 90-100 degrees, 100-110 degrees, 110-120 degrees, 120-130 degrees, 130-140 degrees, 140-150 degrees, 150-160 degrees, 160-170 degrees, or 170-180 degrees. In some embodiments, the plurality of polarization-selective gratings includes four polarization-selective gratings, and includes electrical switching (i.e. ON and/or OFF) settings similar to State ID #7 of FIG. 4.

In some embodiments, a voltage is applied (i.e. ON) on: the second polarization-selective grating, and the third polarization-selective grating; and a voltage is not applied (i.e. OFF) on: the variable wave-plate, the first polarization-selective grating, and the fourth polarization-selective grating. In some embodiments, a voltage is applied (i.e. ON) on: the second polarization-selective grating, and the third polarization-selective grating; and a voltage is not applied (i.e. OFF) on: the variable wave-plate, the first polarization-selective grating, and the fourth polarization-selective grating, where each of the polarization-selective gratings are electrically switched to displace the beam of light in the $(-\theta_x, -\theta_y)$ direction. In some embodiments, the output polarization as a result of applying a voltage controller on the second polarization-selective grating, and the third polarization-selective grating, but not applying a voltage controller on a variable wave-plate, the first polarization-selective grating, and the fourth polarization-selective grating results in a RHC. In such embodiments, the output polarization followed by electrically switching (i.e. ON and/or OFF) the wave-plate and each of the polarized-selective gratings is a RHC. In some embodiments, the electric field, followed by electrically switching (i.e. ON and/or OFF) the wave-plate and each of the polarized-selective gratings, is angularly displaced by 45 degrees, by 90 degrees, by 135 degrees, and/or by 180 degrees. In some embodiments, the electric field, followed by electrically switching (i.e. ON and/or OFF) the wave-plate and each of the polarized-selective gratings, is angularly displaced ranging from 0-10 degrees, 10-20 degrees, 20-30 degrees, 30-40 degrees, 40-50 degrees, 50-60 degrees, 60-70 degrees, 70-80 degrees, or 80-90 degrees. In some embodiments, the polarization of the electromagnetic field, followed by electrically switching (i.e. ON and/or OFF) the wave-plate and each of the polarized-selective gratings, is rotated by an angle ranging from 0-10 degrees, 10-20 degrees, 20-30 degrees, 30-40 degrees, 40-50 degrees, 50-60 degrees, 60-70 degrees, 70-80 degrees, 80-90 degrees, 90-100 degrees, 100-110 degrees, 110-120 degrees, 120-130 degrees, 130-140 degrees, 140-150 degrees, 150-160 degrees, 160-170 degrees, or 170-180 degrees. In some embodiments, the plurality of polarization-selective gratings includes four polarization-selective gratings, and includes electrical switching (i.e. ON and/or OFF) settings similar to State ID #8 of FIG. 4.

In some embodiments, a voltage is applied (i.e. ON) on: the second polarization-selective grating, the third polarization-selective grating, and the fourth polarization-selective grating; and a voltage is not applied (i.e. OFF) on: the variable wave-plate, and the first polarization-selective grating. In some embodiments, a voltage is applied (i.e. ON) on: the second polarization-selective grating, the third polarization-selective grating, and the fourth polarization-selective grating; and a voltage is not applied (i.e. OFF) on: the variable wave-plate, and the first polarization-selective grating, where each of the polarization-selective gratings are electrically switched to displace the beam of light in the $(-\theta_x, 0)$ direction. In some embodiments, the output polarization as a result of applying a voltage controller on the second polarization-selective grating, and the third polarization-selective grating, but not applying a voltage controller on a variable wave-plate, and the first polarization-selective grating results in a LHC. In such embodiments, the output polarization followed by electrically switching (i.e. ON and/or OFF) the wave-plate and each of the polarized-selective gratings is a LHC. In some embodiments, the electric field, followed by electrically switching (i.e. ON and/or OFF) the wave-plate and each of the polarized-selective gratings, is angularly displaced by 45 degrees, by 90 degrees, by 135 degrees, and/or by 180 degrees. In some embodiments, the electric field, followed by electrically switching (i.e. ON and/or OFF) the wave-plate and each of the polarized-selective gratings, is angularly displaced ranging from 0-10 degrees, 10-20 degrees, 20-30 degrees, 30-40 degrees, 40-50 degrees, 50-60 degrees, 60-70 degrees, 70-80 degrees, 80-90 degrees, 90-100 degrees, 100-110 degrees, 110-120 degrees, 120-130 degrees, 130-140 degrees, 140-150 degrees, 150-160 degrees, 160-170 degrees, or 170-180 degrees. In some embodiments, the electric field, followed by electrically switching (i.e. ON and/or OFF) the wave-plate and each of the polarized-selective gratings, is angularly displaced ranging from 0-10 degrees, 10-20 degrees, 20-30 degrees, 30-40 degrees, 40-50 degrees, 50-60 degrees, 60-70 degrees, 70-80 degrees, or 80-90 degrees. In some embodiments, the polarization of the electromagnetic field, followed by electrically switching (i.e. ON and/or OFF) the wave-plate and each of the polarized-selective gratings, is rotated by an angle ranging from 0-10 degrees, 10-20 degrees, 20-30 degrees, 30-40 degrees, 40-50 degrees, 50-60 degrees, 60-70 degrees, 70-80 degrees, 80-90 degrees, 90-100 degrees, 100-110 degrees, 110-120 degrees, 120-130 degrees, 130-140 degrees, 140-150 degrees, 150-160 degrees, 160-170 degrees, or 170-180 degrees. In some embodiments, the plurality of polarization-selective gratings includes four polarization-selective gratings, and includes electrical switching (i.e. ON and/or OFF) settings similar to State ID #9 of FIG. 4.

In some embodiments, a voltage is applied (i.e. ON) on: the variable wave-plate, the second polarization-selective grating, the third polarization-selective grating, and the fourth polarization-selective grating; and a voltage is not applied (i.e. OFF) on: the first polarization-selective grating. In some embodiments, a voltage is applied (i.e. ON) on: the variable wave-plate, the second polarization-selective grating, the third polarization-selective grating, and the fourth polarization-selective grating; and a voltage is not applied (i.e. OFF) on: the first polarization-selective grating, where each of the polarization-selective gratings are electrically switched to displace the beam of light in the $(+\theta_x, 0)$ direction. In some embodiments, the output polarization as a result of applying a voltage controller on the variable wave-plate, the second polarization-selective grating, the third polarization-selective grating, and the fourth polarization-selective grating, but not applying a voltage controller on the first polarization-selective grating results in a RHC. In such embodiments, the output polarization followed by electrically switching (i.e. ON and/or OFF) the wave-plate and each of the polarized-selective gratings is a RHC. In some embodiments, the electric field, followed by electrically switching (i.e. ON and/or OFF) the wave-plate and each of the polarized-selective gratings, is angularly displaced by 45 degrees, by 90 degrees, by 135 degrees, and/or by 180 degrees. In some embodiments, the electric field, followed by electrically switching (i.e. ON and/or OFF) the wave-plate and each of the polarized-selective gratings, is angularly displaced ranging from 0-10 degrees, 10-20 degrees, 20-30 degrees, 30-40 degrees, 40-50 degrees, 50-60 degrees, 60-70 degrees, 70-80 degrees, 80-90 degrees, 90-100 degrees, 100-110 degrees, 110-120 degrees, 120-130 degrees, 130-140 degrees, 140-150 degrees, 150-160 degrees, 160-170 degrees, or 170-180 degrees. In some embodiments, the electric field, followed by electrically switching (i.e. ON and/or OFF) the wave-plate and each of the polarized-selective gratings, is angularly displaced ranging from 0-10 degrees, 10-20 degrees, 20-30 degrees, 30-40 degrees, 40-50 degrees, 50-60 degrees, 60-70 degrees, 70-80 degrees, or 80-90 degrees. In some embodiments, the polarization of the electromagnetic field, followed by electrically switching (i.e. ON and/or OFF) the wave-plate and each of the polarized-selective gratings, is rotated by an angle ranging from 0-10 degrees, 10-20 degrees, 20-30 degrees, 30-40 degrees, 40-50 degrees, 50-60 degrees, 60-70 degrees, 70-80 degrees, 80-90 degrees, 90-100 degrees, 10-110 degrees, 110-120 degrees, 120-130 degrees, 130-140 degrees, 140-150 degrees, 150-160 degrees, 160-170 degrees, or 170-180 degrees. In some embodiments, the plurality of polarization-selective gratings includes four polarization-selective gratings, and includes electrical switching (i.e. ON and/or OFF) settings similar to State ID #10 of FIG. 4.

Embodiments of the present invention are described herein with reference to liquid crystal (LC) materials and polarization-selective gratings, in some embodiments, incorporating LC materials (LCPGs). As used herein, the liquid crystals can have a nematic phase, a chiral nematic phase, a smectic phase, a ferroelectric phase, and/or another phase. In addition, a number of photopolymerizable polymers may be used as alignment layers to create the polarization gratings described herein. In addition to being photopolymerizable, these materials may be inert with respect to the LC, should provide stable alignment over a range of operating temperatures of the LC device (e.g., from about −50° C. to about 100° C.), and should be compatible with manufacturing methods described in, for example, U.S. Pat. No. 9,195,092. Some examples of photopolymerizable polymers include polyimides (e.g., AL 1254, JSR Micro, Inc (Sunnyvale, Calif.)), Nissan RN-1199, Brewer Science, Inc. (Rolla, Mo.), and cinnamates (e.g., polyvinyl 4-methoxy-cinnamate as described by M. Schadt et al., in "Surface-Induced Parallel Alignment of Liquid Crystals by Linearly Polymerized Photopolymers," Jpn. J. Appl. Phys., Vol. 31 (1992), pp. 2155-2164). Another example of a photopolymerizable polymer is Staralign™, Vantico Inc. (Los Angeles, Calif.). Further examples include chalcone-epoxy materials, such as those disclosed by Dong Hoon Choi and co-workers in "Photo-alignment of Low-molecular Mass Nematic Liquid Crystals on Photochemically Bifunctional Chalcone-epoxy Film by Irradiation of a Linearly Polarized UV," Bull. Korean Chem. Soc., Vol. 23, No. 4 587 (2002), and coumarin side chain polyimides, such as those disclosed by M. Ree and co-workers in "Alignment behavior of liquid-crystals on thin films of photosensitive polymers—Effects of photoreactive group and UV-exposure," Synth. Met., Vol. 117(1-3), pp. 273-5 (2001) (with these materials, the LC aligns nearly perpendicularly to the direction of polarization). Additional examples of methods of liquid crystal alignment are also discussed in and U.S. Pat. Nos. 7,196,758, 9,195,092, and 8,982,313, the disclosures of which are hereby incorporated by reference in their entireties. Furthermore, some structures described herein may involve precise fabrication through a balance of spin-coating processes and liquid crystal materials. Additional structures and/or methods for use with some embodiments of the present invention are discussed in PCT Publication Nos. WO 2006/092758, WO 2008/130559, WO 2008/130561, and WO 2008/130555 to Escuti, et al., as well as pending PCT Application No. PCT/US2008/011611 to Escuti, et al., the disclosures of which are hereby incorporated by reference in their entireties.

In some embodiments, the LCPGs include a patterned birefringent liquid crystal. In some embodiments, polarization gratings may have a spatially-variant uniaxial birefringence (i.e., $n(x)=\cos n(x)=[\cos(\pi x/\Lambda), \sin(\pi x/\Lambda)]$), and may provide non-zero-order diffraction efficiencies of up to 100%. As used herein, "zero-order" light propagates in a direction substantially parallel to that of the incident light, i.e., at a substantially similar angle of incidence, and is also referred to herein as "on-axis" light. In some embodiments, the incident light is normal to a first polarization grating; thus "zero-order" or "on-axis" light would also propagate substantially normal to the first polarization grating. In other embodiments, "non-zero-order light", such as "first-order" light and/or "second-order light" propagates in directions that are not parallel to the incident light. In such embodiments, the second-order light propagates at a greater angle than the first-order light relative to the angle of incidence. As such, first and second order light are collectively referred to herein as "off-axis". Examples of birefringence can be found, for example, in U.S. Pat. Nos. 8,982,313 and 9,195,092, the disclosures of which are hereby incorporated by reference in their entireties.

An example of an embodiment of the plurality of the size and positioning of polarization-selective gratings is shown in FIG. 7. In some embodiments, the plurality of polarization-selective gratings are arranged serially. In such cases, the incident light passes through one polarization-selective grating at a time. In such cases, the incident light passes through one polarization-selective grating sequentially. In some embodiments, a sequential arrangement of parallel polarization gratings may be used to diffract incident light into zero-order beams without significant losses, while a sequential arrangement of two anti-parallel polarization gratings may be used to diffract incident light into two non-zero-order beams without significant losses.

In some embodiments, sequential arrangement two or more polarization-selective gratings may be used to diffract incident light at different angles (i.e. $(+\theta_x, +\theta_y)$, $(+\theta_x, -\theta_y)$, $(+\theta_x, 0)$, $(0, +\theta_y)$, $(0, -\theta_y)$, $(0,0)$, $(-\theta_x, +\theta_y)$, $(-\theta_x, -\theta_y)$, $(-\theta_x, 0)$ and/or $(+\theta_x, 0)$) thereby capturing a panned, time-sequential composite image at two different fields-of-view. In some embodiments, the plurality of polarization-selective gratings includes four polarization-selective gratings, and includes electrical switching (i.e. ON and/or OFF) and/or polarization settings (i.e. change in direction and/or angular displacement) similar to each row (i.e. State ID #1-10) of FIG. 4. In some embodiments, the plurality of polarization-selective gratings includes four polarization-selective gratings, and includes electrical switching (i.e. ON and/or OFF) and/or polarization (i.e. change in direction and/or angular displacement) settings similar one or more rows (i.e. State ID #1-10) of FIG. 4. In some embodiments, a voltage controller is applied (i.e. ON) on: the first polarization-selective grating, and the fourth polarization-selective grating; and a voltage is not applied (i.e. OFF) on: a variable wave-plate, the second polarization-selective grating, and the third polarization-selective grating, where each of the polarization-selective gratings are electrically switched to displace the beam of light in the $(+\theta_x, +\theta_y)$ direction to create a first image with a first field-of-view (see e.g. FIG. 4, State ID:1). In some embodiments, a voltage is applied (i.e. ON) on: the first polarization-selective grating, and the third polarization-selective grating; and a voltage is not applied (i.e. OFF) on the: the variable wave-plate, the second polarization-selective grating, and the fourth polarization-selective grating, where each of the polarization-selective gratings are electrically switched to displace the beam of light in the $(+\theta_x, -\theta_y)$ direction to capture a second image with a second field-of-view (see e.g. FIG. 4, State ID:2). In some embodiments, a voltage is applied (i.e. ON) on: the first polarization-selective grating, the third polarization-selective grating, and the fourth polarization-selective grating; and a voltage is not applied (i.e. OFF) on: the variable wave-plate, and the second polarization-selective grating, where each of the polarization-selective gratings are electrically switched to displace the beam of light in the $(+\theta_x, 0)$ direction to capture a third image with a third field-of-view (see e.g. FIG. 4, State ID:3). In some embodiments, a voltage is applied (i.e. ON) on: the first polarization-selective grating, the second polarization-selective grating, and the third polarization-selective grating; and a voltage is not applied (i.e. OFF) on: the variable wave-plate, and the fourth polarization-selective grating, where each of the polarization-selective gratings are electrically switched to displace the beam of light in the $(0, +\theta_y)$ direction to capture a fourth image with a fourth field-of-view (see e.g. FIG. 4, State ID:4). In some embodiments, a voltage is applied (i.e. ON) on: the first polarization-selective grating, the second polarization-selective grating, and the fourth polarization-selective grating; and a voltage is not applied (i.e. OFF) on: the variable wave-plate, the third polarization-selective grating, and the polarization-selective grating, where each of the polarization-selective gratings are electrically switched to displace the beam of light in the $(0, -\theta_y)$ direction to capture a fifth image with a fifth field-of-view (see e.g. FIG. 4, State ID:5). In some embodiments, a voltage is applied (i.e. ON) on: the first polarization-selective grating, the second polarization-selective grating, the third polarization-selective grating, and the fourth polarization-selective grating; and a voltage is not applied (i.e. OFF) on: the variable wave-plate, where each of the polarization-selective gratings are electrically switched to displace the beam of light in the $(0,0)$ direction to capture a sixth image with a sixth field-of-view (see e.g. FIG. 4, State ID:6). In some embodiments, a voltage is applied (i.e. ON) on: the second polarization-selective grating, and the fourth polarization-selective grating; and a voltage is not applied (i.e. OFF) on: the variable wave-plate, the first polarization-selective grating, and the third polarization-selective grating, the first polarization-selective grating, and the third polarization-selective grating, where each of the polarization-selective gratings are electrically switched to displace the beam of light in the $(-\theta_x, +\theta_y)$ direction to capture a seventh image with a seventh field-of-view (see e.g. FIG. 4, State ID:7). In some embodiments, a voltage is applied (i.e. ON) on: the second polarization-selective grating, and the third polarization-selective grating; and a voltage is not applied (i.e. OFF) on: the variable wave-plate, the first polarization-selective grating, and the fourth polarization-selective grating, where each of the polarization-selective gratings are electrically switched to displace the beam of light in the ($-\theta_x$, $-\theta_y$) direction to capture an eighth image with a eighth field-of-view (see e.g. FIG. 4, State ID:8). In some embodiments, a voltage is applied (i.e. ON) on: the second polarization-selective grating, the third polarization-selective grating, and the fourth polarization-selective grating; and a voltage is not applied (i.e. OFF) on: the variable wave-plate, and the first polarization-selective grating, where each of the polarization-selective gratings are electrically switched to displace the beam of light in the ($-\theta_x$, 0) direction to capture a ninth image with a ninth field-of-view (see e.g. FIG. 4, State ID:9). In some embodiments, a voltage is applied (i.e. ON) on: the variable wave-plate, the second polarization-selective grating, the third polarization-selective grating, and the fourth polarization-selective grating; and a voltage is not applied (i.e. OFF) on: the first polarization-selective grating, where each of the polarization-selective gratings are electrically switched to displace the beam of light in the ($+\theta_x$, 0) direction to capture a tenth image with a tenth field-of-view (see e.g. FIG. 4, State ID:1).

As used herein, a "parallel" polarization grating arrangement, in some embodiments, includes a plurality of polarization-selective gratings with the same birefringence n(x), i.e., the respective birefringence patterns of the plurality of polarization gratings have substantially similar orientations. In some embodiments, an "anti-parallel" polarization grating arrangement includes a plurality of polarization gratings having opposite birefringence, i.e., n(x) and n(-x). In some embodiments, the plurality of polarization-selective gratings is a first and second polarization-selective grating. In some embodiments, a "parallel" polarization grating arrangement includes a first and second polarization grating with the same birefringence n(x), i.e., the respective birefringence patterns of the first and second polarization gratings have substantially similar orientations. In some embodiments, the "anti-parallel" polarization grating arrangement includes first and second polarization gratings having opposite birefringence, i.e., n(x) and n(-x). In such embodiments, the second polarization-selective grating has a birefringence pattern that is inverted or rotated by about 180° relative to that of the first polarization grating. Examples of birefringence patterns can be found in, for example, U.S. Pat. No. 9,195,092, the disclosure of which is hereby incorporated by reference in its entirety. In some embodiments, the plurality of polarization-selective gratings includes four polarization-selective gratings, and includes electrical switching (i.e. ON and/or OFF) and/or polarization (i.e. change in direction and/or angular displacement) settings similar to each row (i.e. State ID #1-10) of FIG. 4. In some embodiments, the plurality of polarization-selective gratings includes four polarization-selective gratings, and includes electrical switching (i.e. ON and/or OFF) and/or polarization (i.e. change in direction and/or angular displacement) settings similar one or more rows (i.e. State ID #1-10) of FIG. 4.

In some embodiments, the surface of each polarization-selective grating is aligned parallel with respect to each other. For example, in some embodiments, the surface of a polarization-selective grating is substantially parallel to the surface of an adjacent polarization-selective grating.

Devices

Aspects of the present disclosure include a device configured to attach to an optical imaging system, the device having a plurality of polarization-selective gratings each configured to selectively apply a discrete amount of angular displacement to a directed incident electromagnetic field. For example, when polarization-selective gratings are placed near or at the pupil plane (or a relayed image thereof), and under the control of appropriate sequencing electronics, the device may be configured to manipulate the direction of the incident field in directions transverse or axially to the system electromagnetic axis (i.e. or some combination thereof). In some embodiments, the plurality of polarization-selective gratings are positioned between an excitation source and an imaging lens of the optical imaging system. An example of an embodiment where the plurality of polarization-selective gratings are positioned between an excitation source and an imaging lens of the optical imaging system is shown in FIG. 1 of the present application. In some embodiments, the plurality of polarization-selective gratings are positioned at or near the pupil plane of the imaging system. In some embodiments, the device attached to an optical imaging system results in a non-mechanical, optically-efficient image panning mechanism during image acquisition.

In some embodiments, the optical imaging system comprises one or more optical adjustment components. In some embodiments, the optical imaging system includes one or more optical adjustment components. In some embodiments, an "optical adjustment" is meant that light is changed or adjusted when propagated from one photodetector array to another. For example, the optical adjustment may be to change the profile of the light beam, the focus of the light beam, the direction of the beam propagation, or to collimate the light beam. In some embodiments, optical adjustment components may be any convenient device or structure which provides the desired change to the light beam and may include, but is not limited to, lenses, mirrors, beam splitters, collimating lenses, pinholes, slits, gratings, light refractors, and any combinations thereof.

Figure 6:
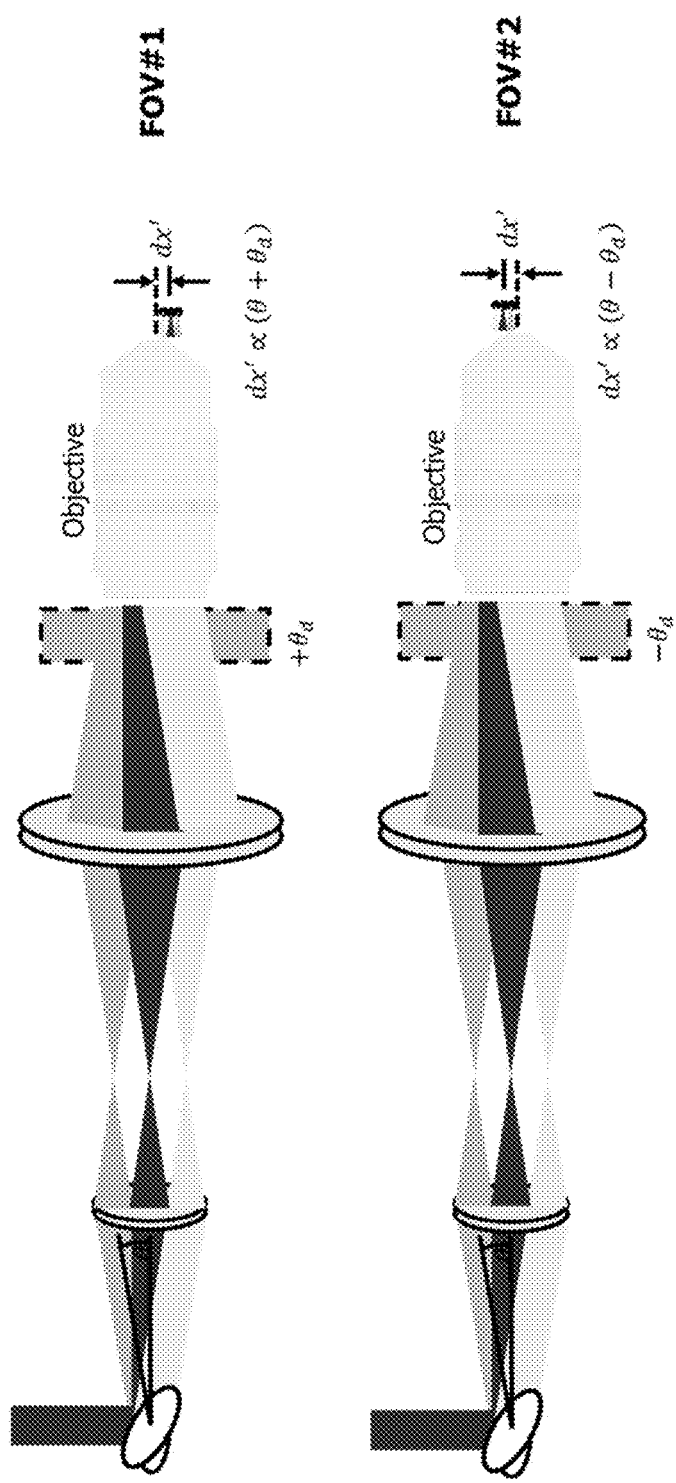
FIG. 6 depicts components of a fluorescence microscope with LCPGs integrated into the microscope, resulting in enhanced field-of-view, according to embodiments of the present disclosure.

In some embodiments, the polarization-selective gratings are attached to a raster-scanned image acquisition system. Raster scanning is a method for generating or recording a video image through a line-by-line sweep across the screen, from top to bottom. For example, the raster scanned beam sweeps across an angular range, behind the microscope objective, where the angular sweep is transformed into a spatial sweep, and the optical signal from the sample is digitized in time. In some embodiments, non-limiting examples of a raster-scanned image acquisition system is a one-photon image acquisition system. In some cases, the raster-scanned image acquisition system is a multi-photon image acquisition system. In some embodiments, the raster-scanned image acquisition system is a confocal imaging system. In some embodiments, the incident illumination is circularly polarized using right- or left-handed circular polarization (or a combination thereof) of the polarization-selective gratings and can be raster scanned. Non-limiting example embodiments of the use of polarization-selective gratings in a raster-scanned image acquisition system are shown in FIG. 1, and FIG. 3. In some embodiments, the device attached to a raster-scanned imaging acquisition allows the beam to sequentially pan each image without mechanically disturbing the sample. The resulting angular displacement captures a composite image with multiple fields of view, as shown in FIG. 3 and FIG. 6. In some embodiments, when the device is attached to a raster-scanned imaging system, the beam is sequentially displaced to alternating axial imaging planes to capture a 3D data stack acquisition free of any mechanical inertia from the sample or imaging optics.

In some embodiments, an optical imaging system includes an excitation source (i.e. light source) that passes through a pinhole aperture positioned on a conjugate plane with a scanning point on the sample. In some embodiments, the optical imaging system further includes a second pinhole aperture positioned in front of a detector. In some embodiments, the detector is a photomultiplier tube. In some embodiments, the optical imaging system includes a plurality of detectors. In some embodiments, the excitation source, such as a laser, is reflective by a dichromatic mirror and scanned across the sample in a defined focal plane. In some embodiments, fluorescence signals are emitted from points on the sample in the same focal planes that pass back through a dichromatic mirror and are focused as a focal point at the detector pinhole aperture. In some embodiments, the optical imaging system includes a focal spot size determined by the microscope design, wavelength of incident laser light, objective characteristics, scanning unit settings, and/or the sample. In some embodiments, the spot size ranges from 0-0.5 μm, 0.5-1 μm, 1-5 μm, or 5-10 μm in diameter.

In some embodiments, the optical imaging system includes a collimator. In some embodiments, the collimator includes one or more mirrors and/or curved lenses. In some embodiments, the collimator is a single collimating lens and/or mirror. In some embodiments, the collimator includes two collimating lenses and/or collimating mirrors. In some embodiments, the focal lengths of the collimating lens ranges from 5 mm to 500 mm, such as from 6 mm to 475 mm, such as from 7 mm to 450 mm, such 10 as from 8 mm to 425 mm, such as from 9 mm to 400 mm, such as from 10 mm to 375 mm, such as from 12.5 mm to 350 mm and including a focal length ranging from 15 mm to 300 mm. In certain embodiments, the focal length ranges from 400 mm to 500 mm, such as from 405 mm to 475 mm, such as from 410 mm to 450 mm and including from 410 mm to 425 mm, such as 410 mm or 420 mm.

In some embodiments, the light source generates a laser beam that has a wavelength ranging from 360 nm to 1000 nm. In some embodiments, the light source generates a laser beam that has a wavelength ranging from 380 nm to 800 nm. In some embodiments, the light source generates a laser beam that has a wavelength ranging from 360 nm to 700 nm. In some embodiments, the light source has a wavelength ranging from 10 nm to 380 nm. In some embodiments, the light source generates a laser beam that has a wavelength of 405 nm. In some embodiments, the light source generates a laser beam that has a wavelength of 488 nm. In some embodiments, the light source generates a laser beam that has a wavelength of 532 nm. In some embodiments, the light source generates a laser beam that has a wavelength of 561 nm. In some embodiments, the light source generates a laser beam that has a wavelength of 588 nm. In some embodiments, the light source generates a laser beam that has a wavelength of 561 nm. In some embodiments, the light source generates a laser beam that has a wavelength of 635 nm. In some embodiments, the light source generates a laser beam that has a wavelength of 660 nm. In some embodiments, the light source generates a laser beam that has a wavelength ranging from 360 nm to 1000 nm. In some embodiments, the light source generates a laser beam that has a wavelength ranging from 380 nm to 800 nm. In some embodiments, the light source generates a laser beam that has a wavelength ranging from 360 nm to 700 nm. In some embodiments, the light source has a wavelength ranging from 10 nm to 380 nm.

In some embodiments, detectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths. In some embodiments, detectors are configured to measure collected light over a range of wavelengths (e.g., 200 nm to 1000 nm). In some embodiments, detectors are configured to collect spectra of light over a range of wavelengths. In some embodiments, an optical imaging system may include one or more detectors configured to collect spectra of light over one or more of the wavelength ranges of 200 nm to 1000 nm. In some embodiments, detectors of are configured to measure light emitted by a sample at one or more specific wavelengths. For example, the optical imaging system may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In some embodiments, one or more detectors may be configured to be paired with specific fluorophores, such as those used with the sample in a fluorescence assay.

In some embodiments, the optical imaging system comprises a light source such as excitation source that emits a light beam. In some embodiments, a light source is a non-laser light source, such as a lamp, including but not limited to a halogen lamp, deuterium arc lamp, xenon arc lamp, a light-emitting diode, such as a broadband LED with continuous spectrum, super-luminescent emitting diode, semiconductor light emitting diode, or a wide spectrum LED white light source. In some embodiments, a non-laser light source is a stabilized fiber-coupled broadband light source, white light source, or a combination thereof. In some embodiments, the excitation source is a laser. In some embodiments, the laser is an Argon laser, an Argon-krypton laser, a krypton laser, a laser diode, a helium-neon laser, a green HeNe laser, and/or a multi-photon tunable laser. In some embodiments, the light source is a solid state laser diode or any other means capable of generating light.

In some embodiments, the raster-scanned imaging acquisition system or a wide-field image acquisition system includes a detector. In some embodiments, the detector includes a photomultiplier tube. In some embodiments, the detector includes a plurality of a plurality of photomultiplier tubes. In some embodiments, the detector includes a charge-coupled device (CCD). In some embodiments, the CCD is an intensified CCD (ICCD). In some embodiments, the CCD device is a color CCD device. In some embodiments, the CCD device is a CCD camera. In some embodiments, the detector further includes a collecting lens. In some embodiments, the detector further includes a tube lens. Non-limiting examples of detectors may include, but are not limited to, optical sensors or photodetectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other photodetectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In some embodiments, one or more photodetectors may be arranged in any geometric configuration as desired. In some embodiments, non-limiting examples of such geometric configurations include, but are not limited to a linear configuration, star-shaped configuration, a triangular configuration, a square configuration, a rectangular configuration, a trapezoidal configuration, a hexagonal configuration, a heptagonal configuration, a octagonal configuration, a nonagonal configuration, a decagonal configuration, adodecagonal configuration, a circular configuration, an oval configuration, as well as irregular shaped configuration.

In some embodiments, where the collected light is measured with a detector, the active detecting surface of the detector may vary, such as from 0.01 cm$^2$ to 10 cm$^2$, such as from 0.05 cm$^2$ to 9 cm$^2$, such as from, such as from 0.1 cm$^2$ to 8 cm$^2$, such as from 0.5 cm$^2$ to 7 cm$^2$ and including from 1 cm$^2$ to 5 cm$^2$. In some embodiments, where the collected light is measured with a CCD, the active detecting surface area of the CCD may vary, such as from 0.01 cm$^2$ to 10 cm$^2$, such as from 0.05 cm$^2$ to 9 cm$^2$, such as from, such as from 0.1 cm$^2$ to 8 cm$^2$, such as from 0.5 cm$^2$ to 7 cm$^2$ and including from 1 cm$^2$ to 5 cm$^2$. In some embodiments, where the collected light is measured with a CMOS, the active detecting surface area of the CMOS may vary, such as from 0.01 cm$^2$ to 10 cm$^2$, such as from 0.05 cm$^2$ to 9 cm$^2$, such as from, such as from 0.1 cm$^2$ to 8 cm$^2$, such as from 0.5 cm$^2$ to 7 cm$^2$ and including from 1 cm$^2$ to 5 cm$^2$.

In some embodiments, the number of photodetectors in the subject systems may vary, as desired. For example, the subject systems may include one photodetector or more, such as two photodetectors or more, such as three photodetectors or more, such as four photodetectors or more, such as five photodetectors or more and including ten photodetectors or more. In certain embodiments, systems include one photodetector. In other embodiments, systems include two photodetectors.

In some embodiments, where the subject systems include more than one photodetector, each photodetector may be the same, or the collection of two or more photodetectors may be a combination of different types of photodetectors. For example, where the subject systems include two photodetectors, in some embodiments the first photodetector is a CCD-type device and the second photodetector (or imaging sensor) is a CMOS-type device. In some embodiments, both the first and second photodetectors are CCD-type devices. In some embodiments, both the first and second photodetectors are CMOS-type devices. In some embodiments, the first photodetector is a CCD-type device and the second photodetector is a photomultiplier tube (PMT). In still other embodiments, the first photodetector is a CMOS-type device and the second photodetector is a photomultiplier tube. In some embodiments, both the first and second photodetectors are photomultiplier tubes.

In embodiments, the detector is configured to measure light continuously or in discrete intervals. In some instances, detectors of interest are configured to take measurements of the collected light continuously. In other instances, detectors of interest are configured to take measurements in discrete intervals, such as measuring light every 0.001 ms, every 0.01 ms, every 0.1 ms, every 1 ms, every 10 ms, every 100 ms, and including every 1000 ms, or some other interval.

In some embodiments, an objective lens is a high numerical aperture lens. In some embodiments, the objective lens is a low numerical aperture lens. In some embodiments, the optical imaging system comprises a working distance. In some embodiments, the working distance is the distance from a front lens of the objective to the surface of the sample when the sample is in focus. In some embodiments, the optical imaging system comprises a working distance ranging from 0-0.1 mm, 0.1-0.2 mm, 0.2-0.3 mm, 0.3-0.4 mm, 0.4-0.5 mm, 0.5-0.6 mm, 0.6-0.7 mm, 0.8-0.9 mm, 0.9-1 mm In some embodiments, the optical imaging system comprises a working distance ranging from 1-2 mm, 2-3 mm, 3-4 mm, 4-5 mm. In some embodiments, the optical imaging system comprises a working distance ranging from 0-5 mm, 5-10 mm, 1-15 mm, 15-20 mm, 20-25 mm, 25-30 mm, 30-35 mm, 35-40 mm, 40-45 mm, or 45-50 mm In some embodiments, the optical imaging system comprises a numerical aperture of 0.1-0.25, 0.25-0.50, 0.5-1, 1-1.25, 1.25-1.50, 1.5-1.75, 1.75-2, 2-2.25, 2.25-2.50, 2.50-2.75, or 2.75-3. In some embodiments, the numerical aperture increases as the working distance decreases.

In some embodiments, the optical imaging system includes a filter such as a beam splitter, one or more scanning mirrors, an eyepiece, an objective, a dichroic mirror, a photon sensor, and/or a light source. In some embodiments, the optical imaging system includes a piezoelectric translator. In some embodiments, the optical imaging system includes a galvanometer-driven x-y mirror. In some embodiments, the filter is a short pass filter, a long pass filter, a bandpass filter or a dichroic filter. In some embodiments, the filter is an emission filter or an excitation filter. In some embodiments, the filter is a dichroic beam splitter. In some embodiments, the dichroic beam splitter is oriented at 45 degrees for reflected light to make an angle of 90 degrees to the incident light. In some embodiments, optical adjustment components may be any convenient device or structure which provides the desired change to the light beam and may include, but is not limited to, lenses, mirrors, beam splitters, collimating lenses, pinholes, slits, gratings, light refractors, and any combinations thereof. In some embodiments, an optical adjustment component includes wavelength separators, bandpass filters, interference filters, dichroic mirrors, diffraction gratings, monochromators, and/or combinations thereof.

In some embodiments, the objective focuses the beam to form a spot on the sample. In some embodiments, light emanating from the sample in the region passes in the reverse direction as the incoming light through a dichroic filter, a tube lens, a polarization converting grating (i.e. a linear polarizer), wave-plate retarder (i.e. quarter wave-plate retarder), and/or the plurality of polarization-selective gratings (LPSGs). In some embodiments, light emanating from the sample in the region passes in the reverse direction as the incoming light through a polarization converting grating (i.e. a linear polarizer), a wave-plate retarder (i.e. quarter wave-plate retarder), the plurality of polarization-selective gratings (LPSGs), a dichroic filter, and a tube lens.

In some embodiments, the optical imaging system includes a light source, one or more optical adjustment components, a detection system that includes at least one detector, a plurality of polarization-selective gratings, a processor, and/or a non-transitory computer-readable memory medium comprising instructions that cause the processor to: direct an incident electromagnetic field through a plurality of polarization-selective gratings; electrically switch each of the polarization-selective gratings with a voltage controller; alternate the incident polarization state upon each independent polarization-selective grating; apply a discrete amount of angular displacement to the incident electromagnetic field; and acquire an image with at least one field-of-view. In some embodiments, the computer-readable memory medium is programmed to control the microscope and to perform the steps described herein to perform image acquisition that has at least one field-of-view and/or a super-position of field-of-views. In some embodiments, the computer-readable memory medium includes instructions that cause the processer to further capture a composite image with multiple fields of view.

In some embodiments, the optical imaging system includes a light source, one or more optical adjustment components, a detection system comprising at least one detector, a plurality of polarization-selective gratings, a processor, and/or a non-transitory computer-readable memory medium comprising instructions that cause the processor to: direct an incident electromagnetic field through a plurality of polarization-selective gratings; electrically switch each of the polarization-selective-selective gratings with a voltage controller; alternate the incident polarization state upon each independent polarization-selective grating; apply a discrete amount of angular displacement to the incident electromagnetic field; and simultaneously acquire a plurality of images with a super-position of field-of views.

In some embodiments, an optical imaging system includes a light source, one or more optical adjustment components, a detection system comprising at least one detector, a plurality of polarization-selective gratings, a processor, and/or a non-transitory computer-readable memory medium comprising instructions that cause the processor to: sequentially acquire a series of images through combinations of when a voltage is applied (i.e. ON or OFF), wherein different combinations of when a voltage is applied (i.e. ON or OFF) result in composite image with a super-position of field-of-views (i.e. state 1, state 2, state 3, state 4, state 5, state 6, state 7, state 8, state 9, and/or state 10 of FIG. 4).

In some embodiments, an optical imaging system includes a light source, one or more optical adjustment components, a detection system comprising at least one detector, a plurality of polarization-selective gratings, a processor, and/or a non-transitory computer-readable memory medium comprising instructions that cause the processor to: electrically switch the polarization-selective gratings to displace the beam of light in the: a) $(+\theta_x, +\theta_y)$ direction to capture a first image with a first field-of-view; b) $(+\theta_x, -\theta_y)$ direction to capture a second image with a second field-of-view; c) $(+\theta_x, 0)$ direction to capture a third image with a third field-of-view; d) $(0, +\theta_y)$ direction to capture a fourth image with a fourth field-of-view; e) $(0, -\theta_y)$ direction to capture a fifth image with a fifth field-of-view; f) $(0,0)$ direction to capture a sixth image with a sixth field-of-view; g) $(-\theta_x, +\theta_y)$ direction to capture a seventh image with a seventh field-of-view; h) $(-\theta_x, -\theta_y)$ direction to capture a eighth image with a eighth field-of-view; i) $(-\theta_x, 0)$ direction to capture a ninth image with a ninth field-of-view; j) $(+\theta_x, 0)$ direction to capture a tenth image with a tenth field-of-view; or k) a combination thereof; and capture a composite image with multiple fields-of-view.

In some embodiments, an optical imaging system comprises a plurality of polarization-selective gratings, a voltage controller, a processor, and/or a non-transitory computer-readable memory medium comprising instructions that cause the processor to: electrically switch the polarization-selective gratings to displace the beam of light in the: a) $(+\theta_x, +\theta_y)$ direction to capture a first image with a first field-of-view; b) $(+\theta_x, -\theta_y)$ direction to capture a second image with a second field-of-view; c) $(+\theta_x, 0)$ direction to capture a third image with a third field-of-view; d) $(0, +\theta_y)$ direction to capture a fourth image with a fourth field-of-view; e) $(0, -\theta_y)$ direction to capture a fifth image with a fifth field-of-view; f) $(0,0)$ direction to capture a sixth image with a sixth field-of-view; g) $(-\theta_x, +\theta_y)$ direction to capture a seventh image with a seventh field-of-view; h) $(-\theta_x, -\theta_y)$ direction to capture a eighth image with a eighth field-of-view; i) $(-\theta_x, 0)$ direction to capture a ninth image with a ninth field-of-view; j) $(+\theta_x, 0)$ direction to capture a tenth image with a tenth field-of-view; or k) a combination thereof.

In some embodiments, an optical imaging system includes a plurality of polarization-selective gratings, a voltage controller, a processor, and/or a non-transitory computer-readable memory medium comprising instructions that cause the processor to: electrically switch the polarization-selective gratings to displace the beam of light in the: a) $(+\theta_x, +\theta_y)$ direction to capture a first image with a first field-of-view; b) $(+\theta_x, -\theta_y)$ direction to capture a second image with a second field-of-view; c) $(+\theta_x, 0)$ direction to capture a third image with a third field-of-view; d) $(0, +\theta_y)$ direction to capture a fourth image with a fourth field-of-view; e) $(0, -\theta_y)$ direction to capture a fifth image with a fifth field-of-view; f) $(0,0)$ direction to capture a sixth image with a sixth field-of-view; g) $(-\theta_x, +\theta_y)$ direction to capture a seventh image with a seventh field-of-view; h) $(-\theta_x, -\theta_y)$ direction to capture a eighth image with a eighth field-of-view; i) $(-\theta_x, 0)$ direction to capture a ninth image with a ninth field-of-view; j) $(+\theta_x, 0)$ direction to capture a tenth image with a tenth field-of-view; or k) a combination thereof; and capture a composite image with multiple fields-of-view.

In some embodiments, an optical imaging system includes a light source, one or more optical adjustment components, a detection system comprising at least one detector, a plurality of polarization-selective gratings, a processor, and/or a non-transitory computer-readable memory medium comprising instructions that cause the processor to: electrically switch the polarization-selective gratings to displace the beam of light: a) at a first angle to capture a first image with a first field-of-view; b) at a second angle to capture a second image with a second field-of-view; c) at a third angle to capture a third image with a third field-of-view; d) at a fourth angle to capture a fourth image with a fourth field-of-view; e) at a fifth angle to capture a fifth image with a fifth field-of-view; f) at a sixth angle to capture a sixth image with a sixth field-of-view; g) at a seventh angle to capture a seventh image with a seventh field-of-view; h) at an eighth angle to capture a eighth image with a eighth field-of-view; i) at a ninth angle to capture a ninth image with a ninth field-of-view; j) at a tenth angle to capture a tenth image with a tenth field-of-view; or k) a combination thereof; and capture a composite image with multiple fields-of-view.

In some embodiments, an optical imaging system includes a light source, one or more optical adjustment components, a detection system comprising at least one detector, a plurality of polarization-selective gratings, a processor, and/or a non-transitory computer-readable memory medium comprising instructions that cause the processor to: electrically switch the polarization-selective gratings to displace the beam of light in the: a) $(+\theta_x, +\theta_y)$ direction to capture a first image with a first field-of-view; b) $(+\theta_x, -\theta_x)$ direction to capture a second image with a second field-of-view; c) $(+\theta_x, 0)$ direction to capture a third image with a third field-of-view; d) $(0, +\theta_y)$ direction to capture a fourth image with a fourth field-of-view; e) $(0, -\theta_x)$ direction to capture a fifth image with a fifth field-of-view; f) $(0, 0)$ direction to capture a sixth image with a sixth field-of-view; g) $(-\theta_x, +\theta_y)$ direction to capture a seventh image with a seventh field-of-view; h) $(-\theta_x, -\theta_y)$ direction to capture a eighth image with a eighth field-of-view; i) $(-\theta_x, 0)$ direction to capture a ninth image with a ninth field-of-view; j) (+$\theta_x$, 0) direction to capture a tenth image with a tenth field-of-view; or k) a combination thereof.

In some embodiments, an optical imaging system includes a light source, one or more optical adjustment components, a detection system comprising at least one detector, a plurality of polarization-selective gratings, a processor, and/or a non-transitory computer-readable memory medium comprising instructions that cause the processor to: electrically switch the polarization-selective gratings to displace the beam of light in the: a) (−$\theta_x$, −$\theta_y$) direction to capture a first image with a first field-of-view; b) (−$\theta_x$, 0) direction to capture a second image with a second field-of-view; c) (−$\theta_x$, +$\theta_y$) direction to capture a third image with a third field-of-view; d) (0,0) direction to capture a fourth image with a fourth field-of-view; e) (0, +$\theta_y$) direction to capture a fifth image with a fifth field-of-view; f) (+$\theta_x$, −$\theta_y$) direction to capture a sixth image with a sixth field-of-view; g) (+$\theta_x$, 0) direction to capture a seventh image with a seventh field-of-view; and h) (+$\theta_x$, +$\theta_y$) direction to capture an eighth image with a eighth field-of-view; or i) a combination thereof; and compile the first, second, third, fourth, fifth, sixth, seventh, and/or eighth images to create a composite image with a super-position of field-of-views.

The storage or memory unit may include computer-readable storage medium with instructions (e.g., control logic or software) that, when executed, cause the processor(s) to perform one or more of the functions described herein. The terms "computer-readable storage medium," "computer-readable memory medium," "computer program medium," and "computer usable medium" are used to generally refer to media such as a removable storage drive, removable storage units, data transmitted via a communications interface, and/or a hard disk installed in a hard disk drive. Such computer program products provide computer software, instructions, and/or data to a computer system, which also serve to transform the computer system from a general purpose computer into a special purpose computer programmed to perform the particular functions described herein. Where appropriate, the processor, associated components, and equivalent systems and sub-systems thus serve as examples of "means for" performing select operations and functions. Such "means for" performing select operations and functions also serve to transform a general purpose computer into a special purpose computer programmed to perform said select operations and functions.

Figure 2A:
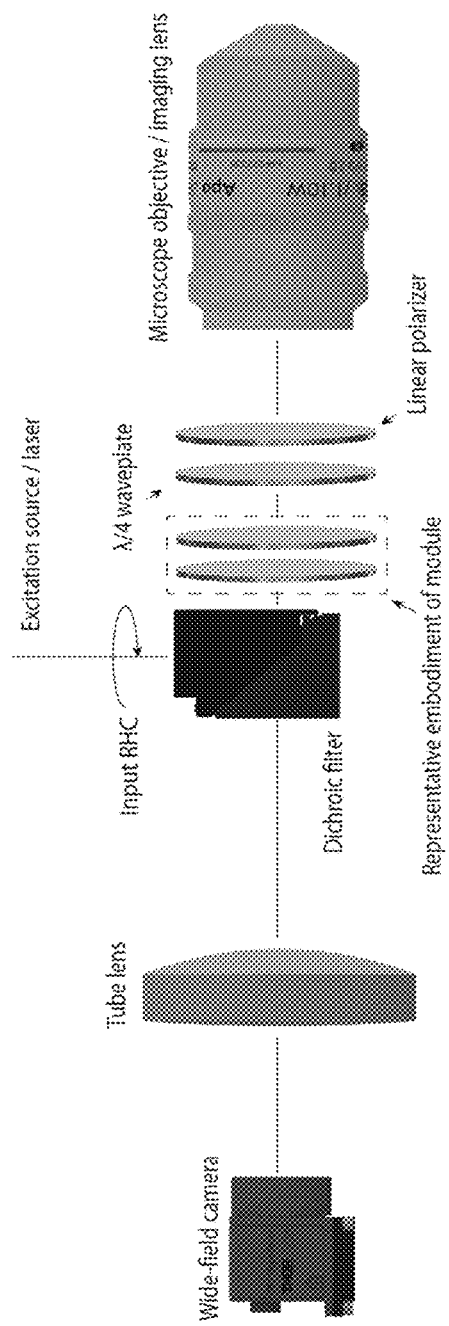
FIG. 2A-2C depicts example embodiments of a variety of placement positions of the LCPGs in a wide-field optical imaging system, according to embodiments of the present disclosure.
Figure 2B:
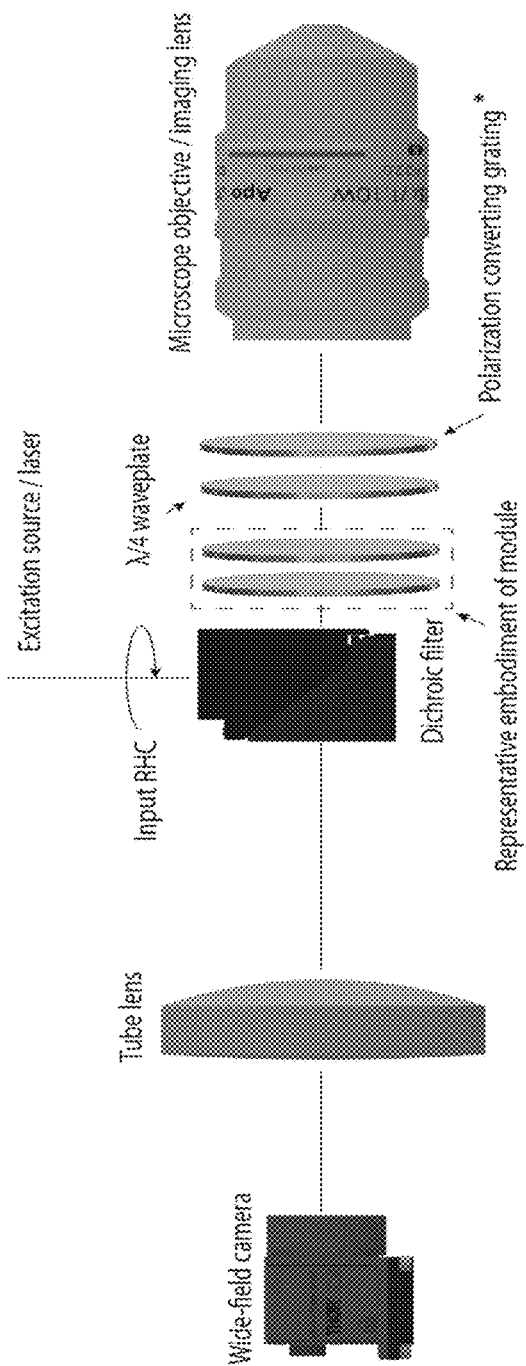
Figure 2C:
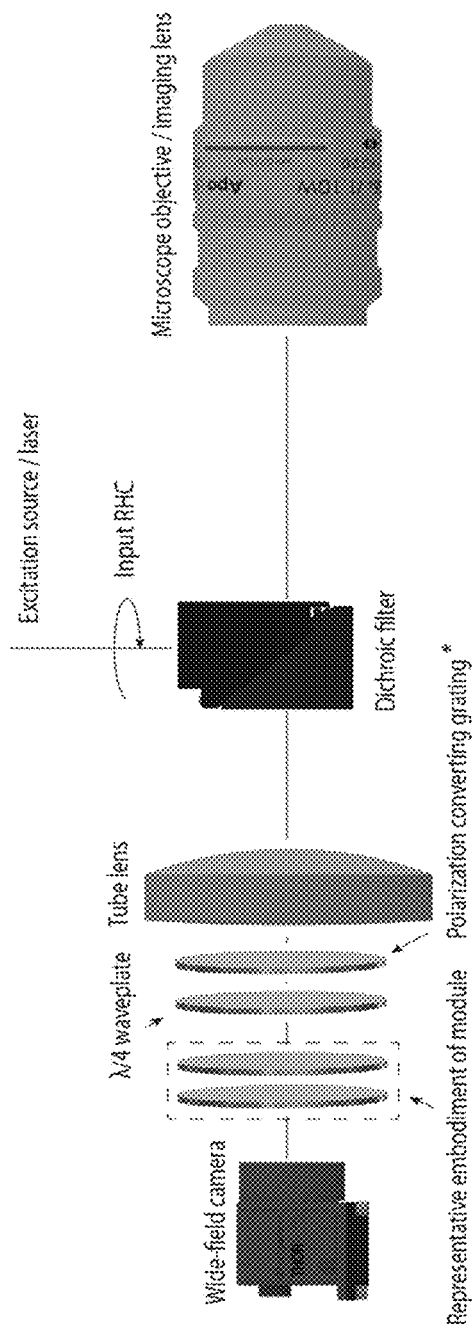

In some embodiments, the polarization-selective gratings are attached to a wide-field image acquisition system. In some embodiments, non-limiting examples of a wide-field optical imaging systems are a single lens reflex (SLR) camera, an upright microscope, or an inverted microscope. In some embodiments, the polarization-selective gratings are positioned between a tube lens and a wide-field camera of the wide-field optical imaging system. In some embodiments, the wide-field optical imaging system includes a cell-phone camera. In some cases, the polarization-selective gratings are positioned between the sensor and the lens of the cell-phone camera, similar to the layout in FIG. 2C, from the wide-field camera to the tube-lens (i.e. omitting the dichroic filter and microscope objective). Non-limiting example embodiments of the invention in wide-field image capture, using an epi-fluorescence microscope with an selective polarization grating can selectively modulate an electromagnetic field based upon the state of the incident field. Such polarization-selective gratings can be designed to encode an arbitrary field pattern upon a passing electromagnetic field.

Enhanced FOV

In some embodiments, the plurality of polarization-selective gratings each configured to selectively apply a discrete amount of angular displacement to a directed incident electromagnetic field. In some embodiments, the incident electromagnetic field is modulated in a direction transverse or axial to the optical system's electromagnetic axis, where the modulation results in an enhanced FOV during image acquisition. In some embodiments, when the polarization-selective gratings are attached to an imaging system, composite images of a greater FOV are created by sequentially selecting any or all permutations available on the sequence of polarization-selective gratings. In some embodiments, each image acquisition includes one FOV. In some embodiments, each image acquisition includes more than one field-of-view. In some embodiments, each image acquisition includes a super-position of field-of-views simultaneously acquired.

Utility

Example applications of the methods and device of the present disclosure include use in one-photon and two-photon raster scanning image acquisition systems. Such an application would increase the FOV available to the user with the addition of the thin, optically efficient modulation device and associated electronics and software. The user could use this to acquire images of different brain regions at video rate and monitor neural activity as a metric for behavior and mal-behavior states. Additionally, the random access nature of the sequential scan allows for rapidly scanning functionally distinct regions both translationally across the brain (e.g. cortex, somatosensory and motor) as well as in depth (layers II/III and IV) (i.e. more than one FOV). This invention is of utility in non-mammalian (e g rodent, zebrafish) and mammalian subjects (e.g. non-human-primate (NHP) or human subjects) where the physical size of the functionally specific areas are much greater and non-mechanical scanning has distinct advantages in terms of minimizing sampling latencies. Application of this invention to the optical stimulation of neurons allows dynamic access to a larger region of brain tissue, thus improving the number of neurons available for therapeutic modulation. Alternative applications exist in the consumer space where these thin modules can be placed on cell-phone camera lenses in order to non-mechanically scan for panoramic image scans.

The increased capacity of software algorithms to uniquely attribute temporal signal to spatially overlapped signals opens up the possibility to sample multiple field-of-view/axial planes simultaneously and de-mix them as a post-processing step. This would serve to either increase the number of FOV sampled or increase the temporal resolution of the sampling or some combination thereof. In addition, this invention could be applied to wide-field imaging raster-scanned imaging systems for both medical, industrial, and consumer applications. With regard to consumer applications, the small form factor and low-power consumption make cell-phone cameras a potential market. Increased FOV and sampling from multiple axial planes are related to extracting 3D information from scenes and could thus be tied to image acquisition modalities for virtual reality (VR) applications. Alternatively, rapid stereo-vision or 3D scene acquisition could be enhanced by these features when placed on automobiles for autonomous driving applications.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Celsius, and pressure is at or near atmospheric. Standard abbreviations may be used, e.g., bp, base pair(s); kb, kilobase(s); pl, picoliter(s); s or sec, second(s); min, minute(s); h or hr, hour(s); aa, amino acid(s); kb, kilobase(s); bp, base pair(s); nt, nucleotide(s); i.m., intramuscular(ly); i.p., intraperitoneal (ly); s.c., subcutaneous(ly); and the like.

Example 1

A representative embodiment of a device of the present disclosure is depicted in FIG. 3. FIG. 3 depicts LCPGs with one voltage-controlled variable wave-plate (S0) and four voltage-controlled polarization-selective gratings (S1-S4) integrated into a raster scanned imaging system. The LCPGs were located before the representative microscope objective. The raster scanned beam was swept across an angular range, behind the microscope objective, and the optical signal from the sample was digitized in time to create a composite image with two field-of-views. The resulting representative composite image depicts the two acquired FOVs as "FOV #1" and "FOV #2".

Example 2

FIG. 8 depicts a composite image showing the FOV of an Olympus microscope with a FOV of 480×480 µm without using the subject LCPGs (left), compared to an enhanced FOV using the subject LCPGs in an optical imaging system (right). The selective addition of the tilt behind the microscope objective, created by the LCPGs, demonstrated that the FOV may be increased by 9 times the FOV of an imaging system without integration of the subject LCPGs.

Example 3

Figure 9:
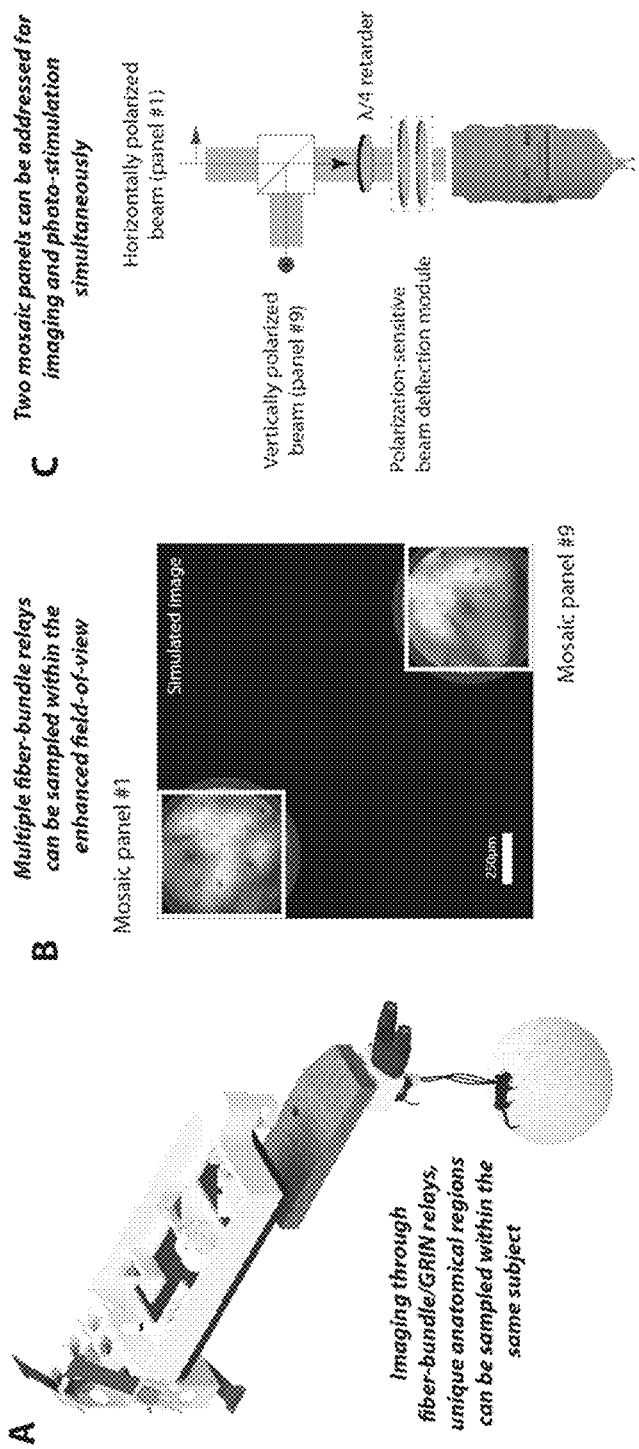
FIG. 9, panel A, depicts the addition of micro-endoscopes under the microscope objective which are imaged using the enhanced field-of-view embodiment of the present disclosure.

FIG. 9, panel A, depicts the addition of micro-endoscopes under the microscope objective which are imaged using the enhanced field-of-view embodiment of the present disclosure. FIG. 9, panel B is a simulation imaging two micro-endoscopes placed within the field-of-view of the microscope. FIG. 9, panel C, illustrates how careful manipulation of the input polarization state can result in multiple, simultaneous output beams multiplexed from the polarization-sensitive grating device. These beams can then sample multiple areas under the microscope objective simultaneously.

Additional Embodiments

Notwithstanding the appended claims, embodiments of the present disclosure may be defined by the following clauses.
1. An optical image acquisition method, the method comprising directing an incident electromagnetic field through a plurality of polarization-selective gratings to acquire an image.
2. The method of clause 1, wherein each of the polarization-selective gratings is configured to selectively apply a discrete amount of angular displacement to the incident electromagnetic field.
3. The method of any one of clauses 1 or 2, wherein the discrete amount of angular displacement to the incident electromagnetic field is configured to pan an acquired image.
4. The method of any one of clauses 1-3, wherein directing the incident electromagnetic field through the plurality of polarization-selective gratings results in an enhanced field-of-view during image acquisition.
5. The method of clause 4, wherein the field-of-view is greater than 1 time the field-of-view of optical imaging systems without the polarization-selective gratings.
6. The method of clause 1, wherein the plurality of polarization-selective gratings are arranged serially.
7. The method of clause 1, wherein the plurality of polarization-selective gratings comprise a plurality of liquid-crystal polarization gratings.
8. The method of clause 7, wherein each of the liquid-crystal polarization gratings comprises a patterned birefringent liquid crystal.
9. The method of clause 1, wherein the plurality of polarization-selective gratings comprise a plurality of lithographic plates.
10. The method of clause 9, wherein each of the lithographic plates comprises a transparent substrate having a sub-wavelength feature on the transparent substrate.
11. The method of clause 1, wherein each of the polarization-selective gratings are electrically switchable.
12. The method of clause 11, wherein each of the polarization-selective gratings comprises a voltage controller.
13. A device configured to attach to an optical imaging system, the device comprising a plurality of polarization-selective gratings each configured to selectively apply a discrete amount of angular displacement to a directed incident electromagnetic field.
14. The device of clause 13, wherein the optical imaging system is a raster-scanned or a wide-field image acquisition system.
15. The device of clause 13, wherein the raster-scanned optical image acquisition system comprises a one-photon, a multi-photon, or a confocal imaging system.
16. The device of clause 13, wherein wide-field optical image acquisition system comprise a single lens reflex (SLR) camera, an upright microscope, or an inverted microscope.
17. The device of clause 13, wherein wide-field optical image acquisition system comprise a cell-phone camera.
18. The device of clause 13, wherein the plurality of polarization-selective gratings are positioned between an excitation source and an imaging lens of the optical imaging system.
19. The device of clause 13, wherein the plurality of polarization-selective gratings are positioned at or near the pupil plane of the imaging system.
20. The device of clause 16, wherein the plurality of polarization-selective gratings are positioned between a tube lens and a wide field camera of the wide field optical imaging system.
21. The device of clause 17, wherein the plurality of polarization-selective gratings are positioned between an imaging lens and an image sensor of the cell-phone camera.

22. The device of clauses 13, wherein the incident electromagnetic field is modulated through the plurality of polarization-selective gratings.
23. The device of clause 22, wherein the incident electromagnetic field modulated through the plurality of polarization-selective gratings results in a polarization incident for each independent polarization-selective grating.
24. The device of clause 22, wherein the incident electromagnetic field is modulated in a direction transverse or axial to the optical system's electromagnetic axis, wherein the modulation results in an enhanced field-of-view during image acquisition.
25. The device of clause 13, wherein the discrete amount of angular displacement to the incident electromagnetic field is scanned to acquire an image.
26. The device of clause 24, wherein the image acquisition has at least one field-of-view.
27. The device of clause 24, wherein the image acquisition has a super-position of field-of-views simultaneously acquired.
28. The device of clause 13, wherein the plurality of polarization-selective gratings is arranged serially.
29. The device of clause 13, wherein the plurality of polarization-selective gratings comprise a plurality of liquid-crystal polarization gratings.
30. The device of clause 29, wherein each of the liquid-crystal polarization gratings comprises a patterned birefringent liquid crystal.
31. The device of clause 13, wherein the plurality of polarization-selective gratings comprise a plurality of lithographic plates.
32. The device of clause 31, wherein each of the lithographic plates comprises a transparent substrate having a sub-wavelength feature engraved thereon.
33. The device of clause 13, wherein each of the polarization-selective gratings are electrically switchable.
34. The device of clause 33, wherein each of the polarization-selective gratings comprise a voltage controller.
35. The device of clause 23, wherein the polarization incident upon each independent polarization-selective grating is directly modulated by a voltage across each the polarization-selective gratings.
36. The device of clause 34, further comprising a variable wave-plate retarder.
37. The device of clause 36, wherein the polarization incident upon each independent polarization-selective grating is indirectly modulated by a voltage across the variable wave-plate retarder.
38. The device of clause 37, wherein the voltage across the variable wave-plate retarder is configured to alternate the incident polarization state upon each independent polarization-selective grating.
39. The device of clause 38, wherein alternating the incident polarization state upon each independent polarization-selective grating comprises electrically switching each independent polarization-selective grating.
40. The device of clause 23, wherein a polarization incident upon each independent polarization-selective grating is modulated by:
    a) a voltage across each the polarization-selective grating;
    b) a voltage across the variable wave-plate retarder; or
    c) a combination of a) and b).
41. An optical imaging system comprising:
    1) a light source;
    2) a plurality of polarization-selective gratings;
    3) a processor; and
    4) a non-transitory computer-readable memory medium comprising instructions that cause the processor to:
        a) electrically switch the polarization-selective gratings to displace the beam of light in a:
            i) first direction to capture a first image with a first field-of-view,
            ii) second direction to capture second image with a second field-of-view,
            iii) third direction to capture a third image with a third field-of-view,
            iv) fourth direction to capture a fourth image with a fourth field-of-view, or
            v) a combination thereof; and
        b) capture a panned, time-sequential composite image with a super-position of a combination of field-of-views as in step a).
42. The optical imaging system of clause 41, wherein the non-transitory computer-readable memory medium further comprises instructions that cause the processor to electrically switch the polarization-selective gratings to displace the beam of light in a:
    a) fifth direction to capture fifth image with a fifth field-of-view,
    b) sixth direction to capture a sixth image with a sixth field-of-view, or
    c) a combination thereof.
43. The optical imaging system of clause 41, wherein the non-transitory computer-readable memory medium further comprises instructions that cause the processor to electrically switch the polarization-selective gratings to displace the beam of light in a:
    a) seventh direction to capture a seventh image with a seventh field-of-view,
    b) eighth direction to capture eighth image with a eighth field-of-view,
    c) ninth direction to capture a ninth image with a ninth field-of-view,
    d) tenth direction to capture a tenth image with a tenth field-of-view, or
    e) a combination thereof.
44. The optical imaging system of clause 41, further comprising a variable wave-plate retarder.
45. The optical imaging system of clause 41, wherein electrically switching the polarization-selective gratings is configured to produce a polarization incident upon each independent polarization-selective grating.
46. The optical imaging system of clause 45, wherein the polarization incident upon each independent polarization-selective grating is modulated by:
    a) a voltage across each the polarization-selective grating;
    b) a voltage across the variable wave-plate retarder; or
    c) a combination of a) and b).
47. The optical imaging system of clause 46, wherein the voltage is applied across:
    a) a first polarization-selective grating;
    b) a second polarization-selective grating;
    c) a third polarization-selective grating;
    d) a fourth polarization-selective grating; or
    e) a combination thereof.
48. The optical imaging system of clause 46, wherein the voltage is not applied across:
    a) a first polarization-selective grating;
    b) a second polarization-selective grating;
    c) a third polarization-selective grating;
    d) a fourth polarization-selective grating; or
    e) a combination thereof.

49. An optical imaging system comprising:
   1) a light source;
   2) a plurality of polarization-selective gratings;
   3) a processor; and
   4) a non-transitory computer-readable memory medium comprising instructions that cause the processor to:
      a) electrically switch the polarization-selective gratings to displace the beam of light in a:
         i) first angle to capture a first image with a first field-of-view,
         ii) second angle to capture second image with a second field-of-view,
         iii) third angle to capture a third image with a third field-of-view,
         iv) fourth angle to capture a fourth image with a fourth field-of-view, or
         v) a combination thereof; and
      b) capture a panned, time-sequential composite image with a super-position of a combination of field-of-views as in step a).
50. The optical imaging system of clause 49, wherein the non-transitory computer-readable memory medium further comprises instructions that cause the processor to electrically switch the polarization-selective gratings to displace the beam of light in a:
   a) fifth angle to capture fifth image with a fifth field-of-view,
   b) sixth angle to capture a sixth image with a sixth field-of-view, or
   c) a combination thereof.
51. The optical imaging system of clause 49, wherein the non-transitory computer-readable memory medium further comprises instructions that cause the processor to electrically switch the polarization-selective gratings to displace the beam of light in a:
   a) seventh angle to capture a seventh image with a seventh field-of-view,
   b) eighth angle to capture eighth image with a eighth field-of-view,
   c) ninth angle to capture a ninth image with a ninth field-of-view,
   d) tenth angle to capture a tenth image with a tenth field-of-view, or
   e) a combination thereof.
52. The optical imaging system of clause 49, further comprising a variable wave-plate retarder.
53. The optical imaging system of clause 49, wherein electrically switching the polarization-selective gratings is configured to produce a polarization incident upon each independent polarization-selective grating.
54. The optical imaging system of clause 53, wherein the polarization incident upon each independent polarization-selective grating is modulated by:
   a) a voltage across each the polarization-selective grating;
   b) a voltage across the variable wave-plate retarder; or
   c) a combination of a) and b).
55. The optical imaging system of clause 54, wherein the voltage is applied across:
   a) a first polarization-selective grating;
   b) a second polarization-selective grating;
   c) a third polarization-selective grating;
   d) a fourth polarization-selective grating; or
   e) a combination thereof.
56. The optical imaging system of clause 54, wherein the voltage is not applied across:
   a) a first polarization-selective grating;
   b) a second polarization-selective grating;
   c) a third polarization-selective grating;
   d) a fourth polarization-selective grating; or
   e) a combination thereof.
57. An optical image acquisition method for capturing a panned composite image with an enhanced field-of-view, the method comprising:
   directing an incident electromagnetic field through a plurality of polarization-selective gratings;
   electrically switching the polarization-selective gratings to displace the beam of light at a:
      i) first angle to capture a first image with a first field-of-view,
      ii) second angle to capture second image with a second field-of-view,
      iii) third angle to capture a third image with a third field-of-view,
      iv) fourth angle to capture a fourth image with a fourth field-of-view, or
      v) a combination thereof; and
   capturing a panned, time-sequential composite image with a super-position of a combination of field-of-views.
58. The optical image acquisition method of clause 57, wherein electrically switching further comprises electrically switching the polarization-selective gratings to displace the beam of light at a:
   a) fifth angle to capture fifth image with a fifth field-of-view,
   b) sixth angle to capture a sixth image with a sixth field-of-view, or
   c) a combination thereof.
59. The optical image acquisition method of clause 58, wherein electrically switching further comprises electrically switching the polarization-selective gratings to displace the beam of light at a:
   a) seventh angle to capture a seventh image with a seventh field-of-view,
   b) eighth angle to capture eighth image with a eighth field-of-view,
   c) ninth angle to capture a ninth image with a ninth field-of-view,
   d) tenth angle to capture a tenth image with a tenth field-of-view, or
   e) a combination thereof.
60. The optical imaging acquisition method of clause 57, wherein electrically switching the polarization-selective gratings is configured to produce a polarization incident upon each independent polarization-selective grating.
61. The optical imaging acquisition method of clause 60, wherein the method further comprises modulating the polarization incident upon each independent polarization-selective grating by:
   a) a voltage across each the polarization-selective grating;
   b) a voltage across the variable wave-plate retarder; or
   c) a combination of a) and b).
62. The optical imaging acquisition method of clause 61, wherein the method further comprises applying a voltage across:
   a) a first polarization-selective grating;
   b) a second polarization-selective grating;
   c) a third polarization-selective grating;
   d) a fourth polarization-selective grating; or
   e) a combination thereof.
63. The optical imaging acquisition method of clause 62, wherein the voltage is not applied across:
   a) a first polarization-selective grating;
   b) a second polarization-selective grating;
   c) a third polarization-selective grating;

d) a fourth polarization-selective grating; or
e) a combination thereof.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. An optical image acquisition method, the method comprising:
   directing an incident light beam through an optical imaging acquisition device, the optical imaging acquisition device comprising:
   a voltage-controlled variable wave plate configured to receive the incident light beam, to modulate the polarization thereof, and to receive a zeroth voltage across the wave plate;
   four liquid crystal polarization-selective gratings, wherein the liquid crystal polarization gratings are configured to encode arbitrary optical field patterns upon the incident light beam, the liquid crystal polarization-selective gratings comprising:
   a first liquid crystal polarization-selective grating configured to receive a first light beam corresponding to an output of the voltage-controlled wave plate and to receive a first voltage across the grating, wherein application of the first voltage across the first polarization-selective grating controls displacement of the first light beam by a first angle ($-\theta_x$), wherein the first angle corresponds to displacing incident light by a first magnitude in a negative direction along an x-axis that is co-planer with the first polarization-selective grating;
   a second liquid crystal polarization-selective grating configured to receive a second light beam corresponding to an output of the first polarization-selective grating and to receive a second voltage, wherein application of the second voltage across the second polarization-selective grating controls displacement of the second light beam by a second angle ($+\theta_x$), wherein the second angle corresponds to displacing incident light by the first magnitude in a positive direction along the x-axis;
   a third liquid crystal polarization-selective grating configured to receive a third light beam corresponding to an output of the second polarization-selective grating and to receive a third voltage, wherein application of the third voltage across the third polarization-selective grating controls displacement of the third light beam by a third angle ($-\theta_y$), wherein the third angle corresponds to displacing incident light by a second magnitude in a negative direction along a y-axis that is co-planer with the third polarization-selective grating and perpendicular to the x-axis; and
   a fourth liquid crystal polarization-selective grating configured to receive a fourth light beam corresponding to an output of the third polarization-selective grating and to receive a fourth voltage, wherein application of the fourth voltage across the fourth polarization-selective grating controls displacement of the fourth light beam by a fourth angle ($+\theta_y$), wherein the fourth angle corresponds to displacing incident light by the second magnitude in a positive direction along the y-axis; and
   a voltage controller configured to apply combinations of the zeroth, first, second, third and fourth voltages across the voltage-controlled variable wave plate and the liquid crystal polarization-selective gratings;
   applying, by the voltage controller, different combinations of voltages across the voltage-controlled variable wave plate and the polarization-selective gratings to acquire a plurality of images by sweeping the incident light beam across an angular range by modulating the incident light beam through the polarization-selective gratings, wherein the plurality of images corresponds to sweeping the incident light beam through a plurality of:
   a lower left position corresponding to displacing the incident light beam by $-\theta_x$ along the x-axis and $-\theta_y$ along the y-axis ($-\theta_x$, $-\theta_y$);
   a middle left position corresponding to displacing the incident light beam by $-\theta_x$ along the x-axis and no displacement along the y-axis ($-\theta_x$, 0);
   an upper left position corresponding to displacing the incident light beam by $-\theta_x$ along the x-axis and $+\theta_y$ along the y-axis ($-\theta_x$, $+\theta_y$);
   a lower middle position corresponding to no displacement of the incident light beam along the x-axis and displacing the incident light beam by $-\theta_y$ along the y-axis (0, $-\theta_y$);
   a middle position corresponding to no displacement of the incident light beam along the x-axis and no displacement of the incident light beam along the y-axis (0, 0);
   an upper middle position corresponding to no displacement of the incident light beam along the x-axis and displacing the incident light beam by $+\theta_y$ along the y-axis (0, $+\theta_y$);
   a lower right position corresponding to displacing the incident light beam by $+\theta_x$ along the x-axis and $-\theta_y$ along the y-axis ($+\theta_x$, $-\theta_y$);
   a middle right position corresponding to displacing the incident light beam by $+\theta_x$ along the x-axis and no displacement of the incident light beam along the y-axis ($+\theta_x$, 0); and
   an upper right position corresponding to displacing the incident light beam by $+\theta_x$ along the x-axis and $+\theta_y$ along the y-axis ($+\theta_x$, $+\theta_y$); and
   generating a composite image comprised of the plurality of acquired images, wherein the composite image exhibits a larger field-of-view than each of the plurality of acquired images.

2. The method of claim 1, wherein each discrete amount of angular displacement to the incident light beam is configured to pan an acquired image.

3. The method of claim 1, wherein the four polarization-selective gratings are arranged serially.

4. The method of claim 1, wherein modulating the incident light beam through the plurality of polarization-selective gratings results in a polarization incident for each independent polarization-selective grating.

5. The method of claim 4, further comprising modulating the polarization incident upon each independent polarization-selective grating by:
a) a voltage across each polarization-selective grating;
b) a voltage across a variable wave-plate retarder; or
c) a combination of a) and b).

6. A device attached to an optical imaging system, the device comprising:
- a voltage-controlled variable wave plate configured to receive the incident light beam, to modulate the polarization thereof, and to receive a zeroth voltage across the wave plate;
- four liquid crystal polarization-selective gratings, wherein the liquid crystal polarization gratings are configured to encode arbitrary optical field patterns upon the incident light beam, the liquid crystal polarization-selective gratings comprising:
  - a first liquid crystal polarization-selective grating configured to receive a first light beam corresponding to an output of the voltage-controlled wave plate and to receive a first voltage across the grating, wherein application of the first voltage across the first polarization-selective grating controls displacement of the first light beam by a first angle ($-\theta_x$), wherein the first angle corresponds to displacing incident light by a first magnitude in a negative direction along an x-axis that is co-planer with the first polarization-selective grating;
  - a second liquid crystal polarization-selective grating configured to receive a second light beam corresponding to an output of the first polarization-selective grating and to receive a second voltage, wherein application of the second voltage across the second polarization-selective grating controls displacement of the second light beam by a second angle ($+\theta_x$), wherein the second angle corresponds to displacing incident light by the first magnitude in a positive direction along the x-axis;
  - a third liquid crystal polarization-selective grating configured to receive a third light beam corresponding to an output of the second polarization-selective grating and to receive a third voltage, wherein application of the third voltage across the third polarization-selective grating controls displacement of the third light beam by a third angle ($-\theta_y$), wherein the third angle corresponds to displacing incident light by a second magnitude in a negative direction along a y-axis that is co-planer with the third polarization-selective grating and perpendicular to the x-axis; and
  - a fourth liquid crystal polarization-selective grating configured to receive a fourth light beam corresponding to an output of the third polarization-selective grating and to receive a fourth voltage, wherein application of the fourth voltage across the fourth polarization-selective grating controls displacement of the fourth light beam by a fourth angle ($+\theta_y$), wherein the fourth angle corresponds to displacing incident light by the second magnitude in a positive direction along the y-axis; and
- a voltage controller configured to apply combinations of the zeroth, first, second, third and fourth voltages across the voltage-controlled variable wave plate and the liquid crystal polarization-selective gratings;
- wherein the device is configured to apply, by the voltage controller, different combinations of voltages across the voltage-controlled variable wave plate and the polarization-selective gratings to acquire a plurality of images by selectively applying a discrete amount of angular displacement to a directed incident light beam, wherein the plurality of images corresponds to sweeping the incident light beam through a plurality of:
  - a lower left position corresponding to displacing the incident light beam by $-\theta_x$ along the x-axis and $-\theta_y$ along the y-axis ($-\theta_x$, $-\theta_y$);
  - a middle left position corresponding to displacing the incident light beam by $-\theta_x$ along the x-axis and no displacement along the y-axis ($-\theta_x$, 0);
  - an upper left position corresponding to displacing the incident light beam by $-\theta_x$ along the x-axis and $+\theta_y$ along the y-axis ($-\theta_x$, $+\theta_y$);
  - a lower middle position corresponding to no displacement of the incident light beam along the x-axis and displacing the incident light beam by $-\theta_y$ along the y-axis (0, $-\theta_y$);
  - a middle position corresponding to no displacement of the incident light beam along the x-axis and no displacement of the incident light beam along the y-axis (0, 0);
  - an upper middle position corresponding to no displacement of the incident light beam along the x-axis and displacing the incident light beam by $+\theta_y$ along the y-axis (0, $+\theta_y$);
  - a lower right position corresponding to displacing the incident light beam by $+\theta_x$ along the x-axis and $-\theta_y$ along the y-axis ($+\theta_x$, $-\theta_y$);
  - a middle right position corresponding to displacing the incident light beam by $+\theta_x$ along the x-axis and no displacement of the incident light beam along the y-axis ($+\theta_x$, 0); and
  - an upper right position corresponding to displacing the incident light beam by $+\theta_x$ along the x-axis and $+\theta_y$ along the y-axis ($+\theta_x$, $+\theta_y$); and
- wherein the device is further configured to generate a composite image from the plurality of acquired images so that the composite image comprised of the plurality of acquired images exhibits a larger field-of-view than each acquired image.

7. The device of claim 6, wherein the optical imaging system is a raster-scanned or a wide-field image acquisition system.

8. The device of claim 6, wherein the plurality of polarization-selective gratings are positioned between an excitation source and an imaging lens of the optical imaging system.

9. The device of claim 6, wherein the plurality of polarization-selective gratings are positioned at or near the pupil plane of the imaging system.

10. The device of claim 6, wherein the incident light beam is modulated through the plurality of polarization-selective gratings and results in a polarization incident for each independent polarization-selective grating.

11. The device of claim 10, wherein the incident light beam is modulated in a direction transverse or axial to the optical system's electromagnetic axis, wherein the modulation results in an enhanced field-of-view during image acquisition.

12. The device of claim 11, wherein the image acquisition has at least one field-of-view.

13. The device of claim 11, wherein the image acquisition has a super-position of field-of-views simultaneously acquired.

14. The device of claim 10, wherein the polarization incident upon each independent polarization-selective grating is modulated by:
  a) a voltage across each polarization-selective grating;
  b) a voltage across a variable wave-plate retarder; or
  c) a combination of a) and b).

15. The device of claim 14, wherein the voltage across the variable wave-plate retarder is configured to alternate the incident polarization state upon each independent polarization-selective grating.

16. An optical imaging system comprising:
1) a light source;
2) a plurality of polarization-selective gratings configured to encode an arbitrary optical field pattern upon an incident light beam;
3) a processor; and
4) a non-transitory computer-readable memory medium comprising instructions that cause the processor to:
   a) electrically switch the polarization-selective gratings to displace the beam of light in a:
      i) first direction to capture a first image with a first field-of-view, wherein the first field-of-view corresponds to a lower left position corresponding to displacing the beam of light by $-\theta_x$ along an x-axis and $-\theta_y$ along a y-axis ($-\theta_x$, $-\theta_y$), wherein the x and y-axes are co-planer with a first polarization-selective grating,
      ii) second direction to capture a second image with a second field-of-view, wherein the second field-of-view corresponds to a middle left position corresponding to displacing the beam of light by $-\theta_x$ along the x-axis and no displacement along the y-axis ($-\theta_x$, 0),
      iii) third direction to capture a third image with a third field-of-view, wherein the third field-of-view corresponds to an upper left position corresponding to displacing the beam of light by $-\theta_x$ along the x-axis and $+\theta_y$ along the y-axis ($-\theta_x$, $+\theta_y$),
      iv) fourth direction to capture a fourth image with a fourth field-of-view, wherein the fourth field-of-view corresponds to a lower middle position corresponding to no displacement of the beam of light along the x-axis and displacing the beam of light by $-\theta_y$ along the y-axis (0, $-\theta_y$),
      v) fifth direction to capture a fifth image with a fifth field-of-view, wherein the fifth field-of-view corresponds to a middle position corresponding to no displacement of the beam of light along the x-axis and no displacement of the beam of light along the y-axis (0, 0),
      vi) sixth direction to capture a sixth image with a sixth field-of-view, wherein the sixth field-of-view corresponds to an upper middle position corresponding to no displacement of the beam of light along the x-axis and displacing the beam of light by $+\theta_y$ along the y-axis (0, $+\theta_y$),
      vii) seventh direction to capture a seventh image with a seventh field-of-view, wherein the seventh field-of-view corresponds to a lower right position corresponding to displacing the beam of light by $+\theta_x$ along the x-axis and $-\theta_y$ along the y-axis ($+\theta_x$, $-\theta_y$),
      viii) eighth direction to capture an eighth image with an eighth field-of-view, wherein the eighth field-of-view corresponds to a middle right position corresponding to displacing the beam of light by $+\theta_x$ along the x-axis and no displacement of the beam of light along the y-axis ($+\theta_x$, 0),
      ix) ninth direction to capture an eighth image with an eighth field-of-view, wherein the eighth field-of-view corresponds to an upper right position corresponding to displacing the beam of light by $+\theta_x$ along the x-axis and $+\theta_y$ along the y-axis ($+\theta_x$, $+\theta_y$), or
      x) a combination thereof; and
   b) capture a panned, time-sequential composite image with a super-position of a combination of field-of-views as in step a), wherein the composite image exhibits a larger field-of-view than each field-of-view as in step a).

17. The optical imaging system of claim 16, wherein a voltage is applied across:
   a) a first polarization-selective grating;
   b) a second polarization-selective grating;
   c) a third polarization-selective grating;
   d) a fourth polarization-selective grating; or
   e) a combination thereof.

18. The optical imaging system of claim 17, wherein the voltage is not applied across:
   a) a first polarization-selective grating;
   b) a second polarization-selective grating;
   c) a third polarization-selective grating;
   d) a fourth polarization-selective grating; or
   e) a combination thereof.

19. The method of claim 1, wherein the method further comprises modulating the incident light beam in a direction transverse or axial to an electromagnetic axis of an imaging acquisition system, wherein the modulation results in an enhanced field-of-view during image acquisition.

20. The method of claim 1, wherein one polarization-selective grating of the polarization-selective gratings is configured so that directly applying a voltage across the polarization-selective grating renders the polarization-selective grating transparent.

21. The method of claim 1, further comprising directing the incident light beam through a variable waveplate retarder.

22. The method of claim 1, wherein the polarization-selective gratings are positioned behind an objective.

* * * * *